United States Patent
Hongo et al.

(10) Patent No.: US 11,352,515 B2
(45) Date of Patent: Jun. 7, 2022

(54) MANUFACTURING METHOD OF DISPERSION, PIGMENT DISPERSION FOR INK JET RECORDING, MANUFACTURING METHOD OF PIGMENT DISPERSION FOR INK JET RECORDING, INK COMPOSITION FOR INK JET, AND MANUFACTURING METHOD OF INK COMPOSITION FOR INK JET

(71) Applicant: FUJIFILM CORPORATION, Tokyo (JP)

(72) Inventors: Yushi Hongo, Kanagawa (JP); Koji Naoe, Kanagawa (JP); Toshiyuki Makuta, Kanagawa (JP); Misato Sasada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 730 days.

(21) Appl. No.: 16/358,664

(22) Filed: Mar. 19, 2019

(65) Prior Publication Data
US 2019/0211221 A1    Jul. 11, 2019

Related U.S. Application Data

(63) Continuation of application No. PCT/JP2017/033607, filed on Sep. 15, 2017.

(30) Foreign Application Priority Data

Sep. 30, 2016 (JP) .............................. JP2016-195142
Sep. 30, 2016 (JP) .............................. JP2016-195143
(Continued)

(51) Int. Cl.
*C09D 11/00* (2014.01)
*C09D 11/322* (2014.01)
(Continued)

(52) U.S. Cl.
CPC .......... *C09D 11/322* (2013.01); *C09D 11/328* (2013.01); *C08K 3/013* (2018.01);
(Continued)

(58) Field of Classification Search
USPC .................................. 106/31.01, 31.13, 31.6
See application file for complete search history.

(56) References Cited

U.S. PATENT DOCUMENTS 4,167,587 A * 9/1979 Danforth .................... A23L 5/47
426/540
2001/0016249 A1* 8/2001 Kitamura ............. B41M 5/5218
428/32.34
(Continued)

FOREIGN PATENT DOCUMENTS

CN 103275560 A * 9/2013
CN 106634195 A * 5/2017
(Continued)

OTHER PUBLICATIONS

English language translation of the following: Office action dated Dec. 3, 2019 from the JPO in a Japanese patent application No. 2018-542411 corresponding to the instant patent application.
(Continued)

*Primary Examiner* — James E McDonough
(74) *Attorney, Agent, or Firm* — Solaris Intellectual Property Group, PLLC

(57) ABSTRACT

Provided are a manufacturing method of a dispersion including a step A of preparing a mixture containing an edible pigment, an edible dispersant, and water, a step B of applying a hydrostatic pressure equal to or higher than 30 MPa to the mixture, and a step C of performing a dispersion treatment on the mixture to which the hydrostatic pressure is applied; a pigment dispersion for ink jet recording and a
(Continued)

manufacturing method thereof; and an ink composition for an ink jet and a manufacturing method thereof.

13 Claims, 2 Drawing Sheets

(30) Foreign Application Priority Data

Sep. 30, 2016 (JP) ............................. JP2016-195144
Mar. 30, 2017 (JP) ............................. JP2017-068885

(51) Int. Cl.
*C09D 11/328* (2014.01)
*C09D 1/00* (2006.01)
*C09D 4/00* (2006.01)
*C09D 5/00* (2006.01)
*C09K 3/00* (2006.01)
*C08K 3/22* (2006.01)
*C08K 3/013* (2018.01)
*C08K 5/00* (2006.01)

(52) U.S. Cl.
CPC .............. *C08K 3/22* (2013.01); *C08K 5/0041* (2013.01); *C08K 2003/2265* (2013.01); *C08K 2003/2272* (2013.01)

(56) References Cited

U.S. PATENT DOCUMENTS

| | | |
|---|---|---|
| 2009/0069473 A1 | 3/2009 | Kusano et al. |
| 2010/0326321 A1 | 12/2010 | Enomura |
| 2013/0005874 A1 | 1/2013 | Nakajima et al. |

FOREIGN PATENT DOCUMENTS

| | | | |
|---|---|---|---|
| CN | 106675190 A | * 5/2017 | |
| CN | 106752364 A | * 5/2017 | ............. C09D 11/03 |
| EP | 2169010 A2 | 3/2010 | |
| JP | H10-265710 A | 10/1998 | |
| JP | 2003-093916 A | 4/2003 | |
| JP | 2009-149719 A | 7/2009 | |
| JP | 2010-013562 A | 1/2010 | |
| JP | 2010-083982 A | 4/2010 | |
| JP | 2015-00968 A | 1/2015 | |
| JP | 2015-140414 A | 8/2015 | |
| JP | 2015-224270 A | 12/2015 | |
| WO | 2006/121016 A1 | 11/2006 | |
| WO | 2009/008388 A1 | 1/2009 | |
| WO | 2011/114689 A1 | 9/2011 | |
| WO | 2011/114691 A1 | 9/2011 | |
| WO | 2016/031438 A1 | 3/2016 | |
| WO | 2016/117518 A1 | 7/2016 | |

OTHER PUBLICATIONS

International Search Report issued in International Application No. PCT/JP2017/033607 dated Dec. 19, 2017.

Written Opinion of the ISA issued in International Application No. PCT/JP2017/033607 dated Dec. 19, 2017.

English language translation of the following: Office action dated Apr. 28, 2020 from the JPO in a Japanese patent application No. 2018-542411 corresponding to the instant patent application.

* cited by examiner

MANUFACTURING METHOD OF DISPERSION, PIGMENT DISPERSION FOR INK JET RECORDING, MANUFACTURING METHOD OF PIGMENT DISPERSION FOR INK JET RECORDING, INK COMPOSITION FOR INK JET, AND MANUFACTURING METHOD OF INK COMPOSITION FOR INK JET

CROSS-REFERENCE TO RELATED APPLICATIONS

This application is a continuation application of International Application No. PCT/JP2017/033607, filed Sep. 15, 2017, the disclosure of which is incorporated herein by reference in its entirety. Further, this application claims priority from Japanese Patent Application No. 2016-195142, filed Sep. 30, 2016, Japanese Patent Application No. 2016-195143, filed Sep. 30, 2016, Japanese Patent Application No. 2016-195144, filed Sep. 30, 2016, and Japanese Patent Application No. 2017-068885 filed Mar. 30, 2017, the disclosures of which are incorporated herein by reference in their entireties.

BACKGROUND OF THE INVENTION

1. Field of the Invention

The present disclosure relates to a manufacturing method of a dispersion, a pigment dispersion for ink jet recording, a manufacturing method of the pigment dispersion, an ink composition for an ink jet, and a manufacturing method of the ink composition.

2. Description of the Related Art

In recent years, regarding the manufacturing method of a pigment dispersion, it has been increasingly required that the pigment concentration is heightened. In a case where the pigment concentration can be heightened, it is possible to reduce the amount of the dispersion used for coating for reproducing a desired color density. For example, in a case where an ink composition, in which the content of a pigment as a coloring material with respect to a dispersion medium is increased such that the pigment concentration is heightened, is used for forming an image, it is possible to reduce the amount of the ink composition applied for reproducing a desired color density.

Generally, as the manufacturing method of a pigment dispersion, manufacturing methods using a beads mill, a roll mill, a sand mill, a homogenizer, and the like are known.

For example, as a manufacturing method of a pigment composition used in a printing ink for pharmaceutical products, a manufacturing method using a high-pressure homogenizer is known (for example, see WO2011/114689A).

Furthermore, as a manufacturing method of a pigment-containing ink composition for ink jet printing that can be clearly printed as letters on the surface of a solid preparation of a pharmaceutical product such as a tablet or a capsule, a manufacturing method using a high-pressure shear homogenizer, a beads mill, or the like is known (for example, see JP2015-140414A).

In addition, as a preparation method of an ink jet ink using edible materials, a preparation method using a beads mill is known (for example, see JP2015-224270A).

Moreover, regarding a manufacturing method of a pigment-containing dispersion, for example, as a pigment dispersing method for incorporating a pigment such as red oxide into an ink composition used in an ink jet recording method, a method is suggested in which the pigment is ultrasonically dispersed and then dispersed by a high-pressure homogenizer that does not use media (for example, see JP1998-265710A (JP-H10-265710A)).

The ink jet recording method is widely used because this method makes it possible to easily record images on various materials in a non-contact manner. The ink jet recording method is used for performing printing on packages containing foods, pharmaceutical products, and the like and for printing letters directly on foods, pharmaceutical products, and the like. Examples of coloring materials used in the ink jet recording ink include dyes and pigments.

As the ink using edible materials (hereinafter, referred to as "edible ink" as well) for printing letters or images directly on foods, pharmaceutical products, and the like that will be orally ingested, various edible inks are known.

As the edible ink used in the ink jet recording method, for example, an ink jet ink is known which contains, as essential components, iron oxide, hydroxypropyl cellulose having a molecular weight of 10,000 to 150,000, and a water-containing solvent mainly constituted with ethanol (for example, see JP2015-000968A).

Furthermore, a yellow ink for an ink jet containing $Fe_2O_3 \cdot H_2O$ and $Fe_2O_3$ as yellow pigments is known (for example, see JP2009-149719A).

In addition, an ink composition is known which contains at least an edible pigment (that is, an orally ingestible pigment), water, a lower alcohol, a dispersant, and a plasticizer (for example, see JP2015-140414A).

The ink jet recording method has an advantage of capable of easily performing printing on a non-planar recording medium.

Therefore, for example, on a solid preparation such as a tablet having a non-planar surface, letters or images are printed by applying an edible ink to the surface of the solid preparation by means of the ink jet recording method. That is, because some tablets have a split line, with the printing methods of the related art such as roll-type offset printing or gravure printing, printing should be performed avoiding the split line, and hence the steps become complicated. In contrast, in a case where the ink jet recording method is used, it is possible to easily read the shape and the disposition of the tablets and to perform printing avoiding the split line, and a step of accurately arranging the directions of the tablets at the same time as in the printing method of the related art can be simplified.

SUMMARY OF THE INVENTION

However, it has been revealed that in a case where an attempt is made to manufacture a dispersion with a higher pigment concentration by using the manufacturing method of the related art described in WO2011/114689A, JP2015-140414A, or JP2015-224270A, as the pigment concentration increases, the proportion of coarse particles in the dispersion tends to increase. In a case where the proportion of coarse particles in the dispersion increases and the dispersion is used, for example, in an ink jet recording ink, the problems such as clogging of a nozzle of an ink jet recording device and deterioration of ink jetting properties can occur.

For performing printing directly on foods or pharmaceutical products, the edible ink used for printing letters or images should be orally ingestible. Accordingly, considering that the edible ink is used for printing letters or images on foods, pharmaceutical products, and the like that will be orally ingested, it is desirable that the edible ink can reproduce a sufficient color density with a smaller amount of coating. In order to obtain such properties, an edible pigment needs to be dispersed at a high concentration in a liquid. Regarding this point, it is hard to say that the concentration of the edible pigment in the edible ink described in JP2015-140414A, JP2009-149719A, or JP2015-140414A is high enough for the ink to be able to reproduce a sufficient color density with a small amount.

Generally, the raw material powder of an edible pigment has a large particle diameter, and an edible dispersant used for dispersing the edible pigment is not sufficiently adsorbed onto the surface of the edible pigment. Therefore, in a case where the edible pigment is incorporated into an edible ink at a high concentration, the edible pigment tends to be present as a large number of coarse particles. In a case where such an ink is used in an ink jet recording ink, the ink jetting properties deteriorate. Accordingly, it has been difficult to realize an edible ink containing an edible pigment at a high concentration.

In addition, in a case where a generally used dispersion method such as ultrasonic dispersion or a high-pressure homogenizer applying a high shear force similarly to the technique described in JP1998-265710A (JP-H10-265710A) is used for an edible pigment, the smaller the intended particle diameter, the easier it is for the pigment to be crushed, and fine particles increase. As the fine particles increase, even though a dispersion treatment is performed, dispersion does not sufficiently proceed, and the particles are not sufficiently coated with a dispersant. As a result, the viscosity of the dispersion tends to increase with the lapse of time, or coarse particles tend to be formed. The increase in viscosity of the dispersion with the lapse of time or the formation of coarse particles is not preferable because such a phenomenon may lead to the decrease in jetting properties in a case where the dispersion is used in an ink composition for ink jet recording.

For example, in pharmaceutical products, as pharmaceutical additives, approved materials that can be orally ingested need to be used. Therefore, the types of usable coloring materials are limited. In a case where a dye is used as a coloring material, it is easy to prepare an aqueous ink because the dye is soluble in water. However, the dye easily undergoes fading or discoloration by being affected by light, humidity, or the like, and accordingly, the fastness of the dye needs to be improved. Particularly, in the field of pharmaceutical products, on the assumption that sometimes the pharmaceutical products may be orally ingested after several years instead of being orally ingested immediately after manufacturing, it is desirable to select pigments which are approved materials for pharmaceutical use and have further improved fastness. The coloring materials having excellent fastness are desirable not only for the pharmaceutical products but also for preserved foods and the like.

However, in a case where a pigment is used as a coloring material having excellent fastness, and a content ratio of the pigment as a solid content contained in a dispersion to a dispersion medium is increased as described above, as the concentration of the dispersion is heightened, unfortunately, the viscosity is heightened as well.

Among edible pigments, black iron oxide useful for reproducing black has magnetism and is strongly aggregated. Therefore, it is extremely difficult to make this pigment have a particle size, which is equal to or smaller than 500 nm for example and preferably equal to or smaller than 200 nm, allowing the pigment to be capable of being jetted by an ink jet recording method. Particularly, in a case where the particle size after dispersion is equal to or greater than 250 nm, and the dispersibility is not excellent, precipitation easily occurs. Furthermore, in a case where the particle diameter after dispersion is equal to or smaller than 100 nm, sometimes the pigment particles are crushed, and hence the stability of the dispersion deteriorates.

In addition to the black iron oxide pigment, an iron sesquioxide pigment, a yellow iron sesquioxide pigment, a Blue No. 2 Lake pigment, and the like known as edible pigments are also strongly aggregated, and these pigments are easily crushed.

Therefore, there is a demand for an ink composition as a stable dispersion containing an edible pigment at a high concentration.

One of the examples of the purpose of printing performed on a tablet is to prevent accidental ingestion by printing letters. In order to prevent accidental ingestion, it is preferable that different colors of letters are printed on tablets having similar shapes. Furthermore, it is desirable that the printed letters are clear and have excellent visibility.

An object of an embodiment of the present invention is to provide a manufacturing method of a dispersion that makes it possible to obtain a dispersion containing fewer coarse particles compared to a dispersion obtained by the method of the related art.

An object of another embodiment of the present invention is to provide a pigment dispersion for ink jet recording that contains an edible pigment at a higher concentration and fewer coarse particles compared to the pigment dispersion of the related art and results in excellent jetting properties of an ink in a case where the pigment dispersion is used in an ink jet recording ink.

An object of still another embodiment of the present invention is to provide a manufacturing method of a pigment dispersion for ink jet recording that makes it possible to manufacture the pigment dispersion for ink jet recording.

An object of still another embodiment of the present invention is to provide an ink composition for an ink jet that contains two or more kinds of edible pigments and exhibits excellent jetting properties even in a case where the content of the pigments is large.

An object of still another embodiment of the present invention is to provide a manufacturing method of an ink composition for an ink jet that exhibits excellent jetting properties.

Means for achieving the above objects include the following aspects.

<1> A manufacturing method of a dispersion comprising a step A of preparing a mixture containing an edible pigment, an edible dispersant, and water, a step B of applying a hydrostatic pressure equal to or higher than 30 MPa to the mixture, and a step C of performing a dispersion treatment on the mixture to which the hydrostatic pressure is applied.

<2> The manufacturing method of a dispersion described in <1>, in which the step B is a step of applying a hydrostatic pressure equal to or higher than 100 MPa to the mixture for 6 hours or longer.

<3> The manufacturing method of a dispersion described in <1>, in which the step B is a step of applying a hydrostatic pressure equal to or higher than 100 MPa to the mixture for 15 hours or longer while applying heat equal to or higher than 70° C. to the mixture.

<4> The manufacturing method of a dispersion described in any one of <1> to <3>, in which the step C is a step of performing a dispersion treatment on the mixture, to which the hydrostatic pressure is applied, by using a media mill.

<5> The manufacturing method of a dispersion described in any one of <1> to <4>, in which the step B is a step of applying the hydrostatic pressure to the mixture by using a cold isostatic pressing method.

<6> The manufacturing method of a dispersion described in any one of <1> to <5>, in which the step A includes a step of mixing together the edible pigment, the edible dispersant, and water filling an airtight container by vibrating the airtight container under conditions that a vibration frequency is within a range of 50 Hz to 70 Hz and a vibration acceleration is within a range of 98 m/s² to 1,962 m/s² so as to obtain the mixture.

<7> The manufacturing method of a dispersion described in any one of <1> to <6>, in which the edible pigment is at least one kind of pigment selected from the group consisting of black iron oxide, iron (III) oxide, yellow iron sesquioxide, and Food Blue No. 2 Aluminum Lake.

<8> The manufacturing method of a dispersion described in any one of <1> to <7>, in which a concentration of the edible pigment in the mixture prepared by the step A is equal to or higher than 1.0% by volume with respect to a total volume of the mixture.

<9> The manufacturing method of a dispersion described in any one of <1> to <8> further comprising a step D of adjusting a pH at 25° C. of a dispersion obtained after the step C to be equal to or lower than 6.3.

<10> The manufacturing method of a dispersion described in <9>, in which the step D is a step of adjusting the pH of the dispersion by using salts of an acid and a weak acid.

<11> The manufacturing method of a dispersion described in any one of <1> to <10> further comprising a step E of removing a portion of the edible dispersant at a point in time when the step A is not yet finished or at a point in time when the step A has finished but the step B is not yet started.

<12> The manufacturing method of a dispersion described in <11>, in which the step A is a step of obtaining the mixture by mixing together the edible pigment, the edible dispersant, and water and includes a step a2 of mixing together the edible pigment, the edible dispersant, and water filling the airtight container by vibrating the airtight container under conditions that a vibration frequency is within a range of 50 Hz to 70 Hz and a vibration acceleration is within a range of 98 m/s² to 1,962 m/s² so as to obtain the mixture and a step a3 of performing a dispersion treatment on the mixture obtained by the step a2, and the step E is performed midway through the step a3 or performed at a point in time when the step a3 has finished but the step B is not yet started.

<13> The manufacturing method of a dispersion described in any one of <1> to <12>, in which in the step A, a ratio P of a content of the edible dispersant to a content of the edible pigment satisfies Expression I based on mass, and after the step A, a ratio Q of the content of the edible dispersant to the content of the edible pigment satisfies Expression II based on mass.

$$0.25 < \text{Ratio } P < 1.2 \qquad \text{Expression I}$$

$$0.05 < \text{Ratio } Q < 0.40 \qquad \text{Expression II}$$

<14> The manufacturing method of a dispersion described in any one of <1> to <13>, in which the edible dispersant is an alkyl (meth)acrylate copolymer containing a quaternary ammonium group.

<15> A pigment dispersion for ink jet recording comprising an edible pigment at a concentration equal to or higher than 1.0% by volume, an edible dispersant, and water, in which in a particle size distribution of the pigment dispersion measured using a laser diffraction/scattering-type particle size distribution measurement apparatus and an optical path length variable cell comprising a spacer having a thickness of 5 μm, a particle diameter $D_{10}$ at which a volume-based cumulative detection frequency becomes 10%, a particle diameter $D_{50}$ at which a volume-based cumulative detection frequency becomes 50%, and a particle diameter $D_{90}$ at which a volume-based cumulative detection frequency becomes 90% satisfy Expression (A1) and Expression (B1).

$$D_{50} \leq 0.5 \text{ μm} \qquad \text{Expression (A1)}$$

$$(D_{90}-D_{10})/D_{50} \leq 1.0 \qquad \text{Expression (B1)}$$

<16> The pigment dispersion for ink jet recording described in <15>, in which the particle diameter $D_{10}$, the particle diameter $D_{50}$, and the particle diameter $D_{90}$ satisfy Expression (A2) and Expression (B2).

$$D_{50} \leq 0.1 \text{ μm} \qquad \text{Expression (A2)}$$

$$(D_{90}-D_{10})/D_{50} \leq 0.5 \qquad \text{Expression (B2)}$$

<17> The pigment dispersion for ink jet recording described in <15> or <16>, in which the edible pigment is at least one kind of pigment selected from the group consisting of black iron oxide, iron (III) oxide, yellow iron sesquioxide, and Food Blue No. 2 Aluminum Lake.

<18> The pigment dispersion for ink jet recording described in any one of <15> to <17> that has a viscosity equal to or lower than 10 mPa·s at 23° C.

<19> A manufacturing method for manufacturing the pigment dispersion for ink jet recording described in any one of <15> to <18>, comprising a step of mixing together the edible pigment, the edible dispersant, and water filling an airtight container by vibrating the airtight container under conditions that a vibration frequency is within a range of 50 Hz to 70 Hz and a vibration acceleration is within a range of 98 m/s² to 1,962 m/s² so as to obtain a mixture, a step of performing a first dispersion treatment on the mixture, a step of applying a hydrostatic pressure equal to or higher than 30 MPa to the mixture having undergone the first dispersion treatment, and a step of performing a second dispersion treatment on the mixture to which the hydrostatic pressure is applied.

<20> An ink composition for an ink jet comprising two or more kinds of edible pigments selected from black iron oxide, iron (III) oxide, yellow iron sesquioxide, and Food Blue No. 2 Aluminum Lake, an edible dispersant which contains at least one of an amino group or a quaternary ammonium group and coats at least a portion of the edible pigments, and water, in which a concentration of the edible pigments is 3% by mass to 20% by mass, and an average particle diameter of the edible pigments measured using a laser diffraction/scattering-type particle size distribution measurement apparatus and an optical path length variable cell is equal to or smaller than 500 nm.

<21> The ink composition for an ink jet described in <20>, in which the average particle diameter of the edible pigments is equal to or smaller than 200 nm.

<22> The ink composition for an ink jet described in <20> or <21>, in which in a case where particle diameters of the edible pigments are measured using the laser diffraction/scattering-type particle size distribution measurement apparatus and the optical path length variable cell, a content of coarse particles having a particle diameter equal to or greater than 500 nm with respect to a total amount of the edible pigments is less than 1 frequency.

<23> the ink composition for an ink jet described in any one of <20> to <22>, in which the edible dispersant is at least one kind of dispersant selected from dispersants that are orally administrable as pharmaceutical additives.

<24> The ink composition for an ink jet described in any one of <20> to <23> further comprising a high-boiling-point solvent.

<25> The ink composition for an ink jet described in any one of <20> to <24>, in which two or more kinds of the edible pigments are dispersed using the same edible dispersant.

<26> The ink composition for an ink jet described in any one of <20> to <25>, in which the edible pigments contain at least one kind of pigment between the iron (III) oxide and the black iron oxide and the Food Blue No. 2 Aluminum Lake.

<27> The ink composition for an ink jet described in <26>, in which provided that a total content of the iron (III) oxide and the black iron oxide is A and a content of the Food Blue No. 2 Aluminum Lake is B, A/B is within a range of 2/3 to 1/10.

<28> The ink composition for an ink jet described in any one of <20> to <25>, in which the edible pigments contain the yellow iron sesquioxide and the Food Blue No. 2 Aluminum Lake.

<29> The ink composition for an ink jet described in <28>, in which provided that a content of the yellow iron sesquioxide is C and the content of the Food Blue No. 2 Aluminum Lake is B, C/B is within a range of 2/3 to 1/5.

<30> The ink composition for an ink jet described in any one of <20> to <25>, in which the edible pigments contain the iron (III) oxide and the yellow iron sesquioxide.

<31> The ink composition for an ink jet described in <30>, in which provided that a content of the iron (III) oxide is D and the content of the yellow iron sesquioxide is C, D/C is within a range of 1/2 to 1/5.

<32> A manufacturing method of an ink composition for an ink jet, comprising a step of filling an airtight container with two or more kinds of edible pigments selected from black iron oxide, iron (III) oxide, yellow iron sesquioxide, and Food Blue No. 2 Aluminum Lake, an edible dispersant which contains at least one of an amino group or a quaternary ammonium group and coats at least a portion of the edible pigments, and water and mixing together two or more kinds of the edible pigments, the edible dispersant, and water while vibrating the airtight container so as to obtain a mixture, and a step of grinding at least a portion of the edible pigments contained in the obtained mixture and dispersing the pigments so as to obtain a dispersion, in which a total mass of the edible pigments filling the airtight container with respect to a total mass of the materials filling the airtight container is 3% by mass to 20% by mass.

<33> The manufacturing method of an ink composition for an ink jet described in <32>, further comprising a step of performing a high pressure treatment on the mixture or the dispersion.

According to an embodiment of the present invention, there is provided a manufacturing method of a dispersion that makes it possible to obtain a dispersion containing fewer coarse particles compared to a dispersion obtained by the method of the related art.

According to another embodiment of the present invention, there is provided a pigment dispersion for ink jet recording that contains an edible pigment at a higher concentration and fewer coarse particles compared to the pigment dispersion of the related art and results in excellent jetting properties of an ink in a case where the pigment dispersion is used in an ink jet recording ink.

According to still another embodiment of the present invention, there is provided a manufacturing method of a pigment dispersion for ink jet recording that makes it possible to manufacture the pigment dispersion for ink jet recording.

According to still another embodiment of the present invention, it is possible to provide an ink composition for an ink jet that contains two or more kinds of edible pigments and exhibits excellent jetting properties even in a case where the content of the pigments is large.

According to still another embodiment of the present invention, it is possible to provide a manufacturing method of an ink composition for an ink jet that exhibits excellent jetting properties.

DESCRIPTION OF THE PREFERRED EMBODIMENTS

Figure 1:
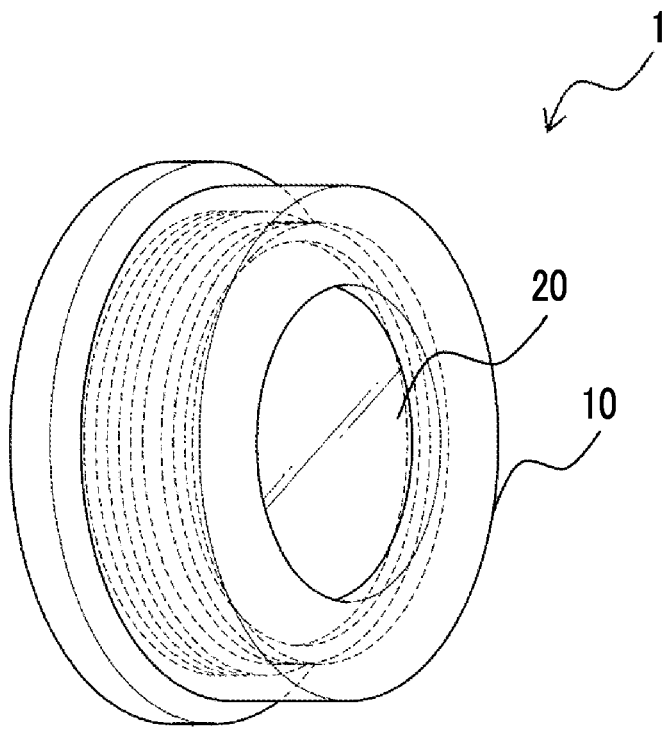
FIG. 1 is a perspective view of an optical path length variable cell used for measuring a particle size distribution of a pigment dispersion for ink jet recording according to an embodiment of the present invention.

Hereinafter, embodiments of a manufacturing method of a dispersion, a pigment dispersion for ink jet recording, a manufacturing method of the pigment dispersion, an ink composition for an ink jet, and a manufacturing method of the ink composition of the present disclosure will be described, but the present invention is not limited to the following embodiments. Within the intended scope of the present invention, the present invention can be embodied by being appropriately modified.

In the present specification, a range of numerical values described using "to" means a range including the numerical values listed before and after "to" as a minimum value and a maximum value respectively.

In the present specification, the upper limit or the lower limit of a range of numerical values that is gradationally described may be substituted with the upper limit or the lower limit of another range of numerical values that is gradationally described. Furthermore, in the present specification, the upper limit or the lower limit of a range of numerical values may be substituted with the values shown in examples.

In the present specification, in a case where there is a plurality of kinds of substances corresponding to each component, unless otherwise specified, the concentration or the content rate of each component means the total concentration or the total content rate of the plurality of kinds of substances.

In the present specification, the term "step" includes not only an independent step but also a step which cannot be clearly distinguished from other steps as long as the intended goal of the step is accomplished.

In the present specification, "(meth)acrylic acid" is a concept including both of acrylic acid and methacrylic acid, and "(meth)acrylate" is a concept including both of acrylate and methacrylate.

In the present specification, a dispersion medium used for dispersing an object to be dispersed is also referred to as "dispersion media" or "beads".

In a case where the dispersion media are spherical media (for example, spherical beads), "media diameter" of the dispersion media means the diameter of the dispersion media (for example, beads). In a case where the dispersion media are non-spherical media (for example, non-spherical beads), "media diameter" of the dispersion media refers to a diameter determined by measuring the equivalent circle diameters of a plurality of media (for example, beads) from an image for observation captured using a transmission electron microscope (TEM) or a scanning electron microscope (SEM) and calculating an arithmetic mean of the measured diameters. The equivalent circle diameter refers to the diameter of a circle equivalent to the same area as the area of the two-dimensional shape of the dispersion media to be observed.

In the present specification, "food additives" refer to the food additives described in "Japan's Specifications and Standards for Food Additives, $8^{th}$ Edition". Furthermore, in the present specification, "pharmaceutical additives" refer to the pharmaceutical additives described in "Dictionary of Pharmaceutical Additives 2007 (editor: IPEC JAPAN, $1^{st}$ printing issued on Jul. 25, 2007)" and "Dictionary of Pharmaceutical Additives 2016 (editor: IPEC JAPAN, $1^{st}$ printing issued in February, 2016)".

In the present specification, the term "printing" means performing recording on a recording medium by using an ink composition for an ink jet. This term also means an operation of recording pictures of a person, a building, a pattern, a mark, and the like in addition to letters and numbers.

In the present specification, a pH is a value measured using a pH meter "WM-50EG (manufactured by DKK-TOA CORPORATION) in an environment at 25° C. in a state where the temperature of a test liquid is controlled to be 25° C.

[Manufacturing Method of Dispersion]

A first embodiment according to the present disclosure is a manufacturing method of a dispersion, including a step A of preparing a mixture containing an edible pigment, an edible dispersant, and water, a step B of applying a hydrostatic pressure equal to or higher than 30 MPa to the mixture, and a step C of performing a dispersion treatment to the mixture to which the hydrostatic pressure is applied.

Hereinafter, the manufacturing method of the embodiment will be simply referred to as "manufacturing method A" as well.

In recent years, regarding the manufacturing method of a dispersion, it has been increasingly required that the pigment concentration is heightened. In a case where the pigment concentration can be heightened, it is possible to reduce the amount of the dispersion used for coating for reproducing a desired color density.

In the related art, in the manufacturing method of a dispersion, a beads mill, a roll mill, a sand mill, a homogenizer, and the like have been generally used. For example, in WO2011/114689A, JP2015-140414A, and JP2015-224270A described above, a dispersion is manufactured using a high-pressure homogenizer (for example, a high-pressure shear homogenizer), a beads mill, and the like.

However, it has been revealed that in a case where an attempt is made to manufacture a dispersion with a higher pigment concentration by using the manufacturing method of the related art described in WO2011/114689A, JP2015-140414A, or JP2015-224270A, as the pigment concentration increases, the proportion of coarse particles in the dispersion tends to increase. In a case where the proportion of coarse particles in the dispersion increases and the dispersion is used, for example, in an ink jet recording ink, the problems such as clogging of a nozzle of an ink jet recording device and deterioration of ink jetting properties can occur.

The above tendency becomes marked particularly in a case where an edible pigment is used as a pigment. The raw material powder of an edible pigment has a large particle diameter, and an edible dispersant used for dispersing the edible pigment tends not to be easily sufficiently adsorbed onto the surface of the edible pigment. Therefore, compared to general pigments, the edible pigment is not easily dispersed and easily forms coarse particles.

However, according to the manufacturing method A of the present disclosure, it is possible to obtain a dispersion containing fewer coarse particles compared to a dispersion obtained by the method of the related art.

It is unclear why such an effect is brought about by the manufacturing method A of the present disclosure, but the inventors of the present invention guess the reason as below.

The inventors consider that in the manufacturing method A of the present disclosure, a hydrostatic pressure equal to or higher than 30 MPa is applied to the mixture containing the edible pigment, the edible dispersant, and water, and as a result, the edible dispersant may be enforced to permeate the interior of particles (so-called coarse particles) formed by the aggregation of the edible pigment (including the edible pigment insufficiently coated with the edible dispersant in a case where the aforementioned components are simply mixed together), that is, a space between particles. Presumably, because the coarse particles having undergone the permeation of the edible dispersant to the interior thereof are disintegrated by the dispersion treatment in the next step, edible pigment particles perfectly coated with the edible dispersant may be formed, and hence the number of coarse particles in the dispersion may be reduced.

However, the manufacturing method A of the present disclosure is not limited to the reason described above.

Hereinafter, each of the steps in the manufacturing method A of the present disclosure will be specifically described.

<Step A>

The step A is a step of preparing a mixture containing an edible pigment, an edible dispersant, and water. The step A may be a step of simply preparing a mixture which has already been mixed or a step of obtaining a mixture by mixing together the edible pigment, the edible dispersant, and water.

The content rate of the edible pigment in the mixture is not particularly limited. For example, from the viewpoint of easily obtaining a coloring density suitable for printing letters or forming images, the content rate of the edible pigment with respect to the total mass of the mixture is preferably equal to or higher than 5% by mass, more preferably equal to or higher than 8% by mass, even more preferably equal to or higher than 10% by mass, and particularly preferably equal to or higher than 12% by mass.

The upper limit of the content rate of the edible pigment in the mixture is not particularly limited. For example, from the viewpoint of making it easy for the finally obtained dispersion to be in a stable dispersion state and making it easy to adjust the viscosity to a value suitable for jetting the dispersion by an ink jet method, the upper limit of the content rate of the edible pigment with respect to the total mass of the mixture is preferably equal to or lower than 20% by mass.

The concentration of the edible pigment in the mixture is not particularly limited. For example, from the viewpoint of easily obtaining a coloring density suitable for printing letters or forming images, the concentration of the edible pigment with respect to the total volume of the mixture is preferably equal to or higher than 1.0% by volume, more preferably equal to or higher than 1.5% by volume, and even more preferably equal to or higher than 2.0% by volume.

The upper limit of the concentration of the edible pigment in the mixture is not particularly limited. For example, from the viewpoint of making it easy for the finally obtained dispersion to be in a stable dispersion state and making it easy to adjust the viscosity to a value suitable for jetting the dispersion by an ink jet method, the upper limit of the concentration of the edible pigment with respect to the total volume of the mixture is preferably equal to or lower than 10% by volume.

The content rate of the edible dispersant in the mixture is not particularly limited. For example, the content rate of the edible dispersant with respect to the total mass of the mixture is preferably equal to or higher than 1% by mass, more preferably equal to or higher than 2% by mass, and even more preferably equal to or higher than 3% by mass.

The upper limit of the content rate of the edible dispersant in the mixture is not particularly limited. For example, the upper limit of the content rate of the edible dispersant with respect to the total mass of the mixture is preferably equal to or lower than 15% by mass, more preferably equal to or lower than 10% by mass, and even more preferably equal to or lower than 8% by mass.

In a case where the content rate of the edible dispersant in the mixture is equal to or higher than 1% by mass and equal to or lower than 15% by mass with respect to the total mass of the mixture, the finally obtained dispersion tends to be in a stable dispersion state, and it is easy to adjust the viscosity to a value suitable for jetting the dispersion by an ink jet method.

The ratio of the content of the edible dispersant to the content of the edible pigment in the mixture (that is, content of edible dispersant/content of edible pigment) expressed as a mass ratio is preferably equal to or higher than 0.10 and equal to or lower than 1.2, more preferably equal to or higher than 0.20 and equal to or lower than 0.90, and even more preferably equal to or higher than 0.30 and equal to or lower than 0.85.

"Content of edible dispersant" mentioned herein refers to the total amount of the edible dispersant, which coats the edible pigment, and the edible dispersant, which is free in the liquid without coating the edible pigment, in the pigment dispersion.

In a case where the ratio of the content of the edible dispersant to the content of the edible pigment in the mixture (that is, content of edible dispersant/content of edible pigment) expressed as a mass ratio is equal to or higher than 0.10, the amount of the edible dispersant with respect to the amount of the edible pigment becomes a quantity appropriate for dispersing the edible pigment. Accordingly, the edible pigment can be more stably dispersed.

Generally, the larger the amount of a dispersant, the easier it is to reduce the particle diameter of dispersed particles. However, as the amount of a dispersant increases, dispersed particles tend not to be easily dispersed. From this point of view, the ratio of the content of the edible dispersant to the content of the edible pigment in the mixture (that is, content of edible dispersant/content of edible pigment) expressed as a mass ratio is preferably reduced to become equal to or lower than 1.2.

The content rate of water in the mixture is not particularly limited. For example, from the viewpoint of manufacturing suitability of the dispersion, the content rate of water with respect to the total mass of the mixture is preferably equal to or higher than 60% by mass and equal to or lower than 95% by mass, more preferably equal to or higher than 65% by mass and equal to or lower than 90% by mass, and even more preferably equal to or higher than 70% by mass and equal to or lower than 85% by mass.

In a case where the step A is a step of obtaining a mixture by mixing together an edible pigment, an edible dispersant, and water, the step A preferably includes a step a1 and a step a2 described below, and more preferably includes the step a2.

Step a1: A step of mixing together an edible pigment, an edible dispersant, and water by stirring so as to obtain a mixture Step a2: A step of mixing together an edible pigment, an edible dispersant, and water filling an airtight container by vibrating the airtight container under conditions that a vibration frequency is within a range of 50 Hz to 70 Hz and a vibration acceleration is within a range of 98 $m/s^2$ to 1,962 $m/s^2$ so as to obtain a mixture (Step a1)

The step a1 is a step of mixing together an edible pigment, an edible dispersant, and water by stirring so as to obtain a mixture.

The edible pigment, the edible dispersant, and water may be simply mixed together. These components may be mixed together at the same time or mixed separately by being split into several groups.

For example, from the viewpoint of dispersibility, it is preferable that the edible pigment and the edible dispersant are mixed together first, and then water is added thereto and mixed together.

(Step a2)

The step a2 is a step of mixing together an edible pigment, an edible dispersant, and water filling an airtight container by vibrating the airtight container under conditions that a vibration frequency is within a range of 50 Hz to 70 Hz and a vibration acceleration is within a range of 98 $m/s^2$ to 1,962 $m/s^2$ so as to obtain a mixture.

Hereinafter, in the present specification, an operation of mixing together contents of an airtight container by means of vibration under the conditions that a vibration frequency is within a range of 50 Hz to 70 Hz and a vibration acceleration is within a range of 98 $m/s^2$ to 1,962 $m/s^2$ will be referred to as "low frequency treatment" in some cases.

In the step a2, the edible pigment, the edible dispersant, and water filling the airtight container are mixed together by vibrating the airtight container under the conditions that a vibration frequency is within a range of 50 Hz to 70 Hz and a vibration acceleration is within a range of 98 $m/s^2$ to 1,962 $m/s^2$. As a result, at least a portion of the surface of the edible pigment is coated with the edible dispersant.

In the step a2, a vertical vibration width of the components in the airtight container is adjusted by resonance according to the natural frequency of the components (the edible pigment, the edible dispersant, and the like) filling the airtight container such that acoustic pressure waves are propagated to the contents. In this way, in a state where the mixture contains the edible pigment at a high concentration, the edible pigment can be dispersed by coating at least a portion of the surface of the edible pigment with the edible dispersant.

In the mixture obtained by the step a2, the high-concentration edible pigment is present in a coarsely dispersed state.

As the airtight container, known airtight containers can be used without limitation as long as the containers have airtightness, hardness, durability, and the like which prevent the leakage of contents or the breakage of the containers in a case where the containers are filled with the edible pigment, the edible dispersant, and water and vibrated.

The material of the airtight container can be appropriately selected from a synthetic resin, a metal, and the like. As the material of the airtight container, from the viewpoint of visibility of contents, a synthetic resin is preferable.

Examples of the synthetic resin include a polyester resin such as polypropylene (PP), polyethylene terephthalate (PET), or polyethylene naphthalate (PEN), polyethylene (PE), and the like.

Among these, as the synthetic resin, from the viewpoint of visibility of contents and versatility, PP or PE is preferable.

From the viewpoint of ease of handling and easily obtaining a homogeneous mixture, the volume of the airtight container is preferably equal to or greater than 10 mL and less than 500 mL, more preferably equal to or greater than 50 mL and equal to or smaller than 400 mL, and even more preferably equal to or greater than 100 mL and equal to or smaller than 300 mL.

As the airtight container, commercial products may also be used.

Examples of the commercial products of the airtight container include CLEAR JAR made of PP (trade name: CJ-250, CJ-400, volume: 250 mL, 400 mL) manufactured by Nikko Hansen & Co., Ltd.

The PP CLEAR JAR is an airtight container comprising a container made of PP, an inner stopper made of linear low density polyethylene (LLDPE), and a screw cap made of PP which can seal the container made of PP by being screwed on.

The filling rate of the contents in the airtight container is not particularly limited. For example, from the viewpoint of efficiency of dispersion by the collision of the contents with the inner wall, the filling rate is preferably 50% by volume to 90% by volume.

The vibration frequency is within a range of 50 Hz to 70 Hz, and preferably within a range of 55 Hz to 65 Hz.

In a case where the vibration frequency is within a range of 50 Hz to 70 Hz, the vibration frequency becomes close to the resonance frequency of the contents of the airtight container, and hence the dispersion efficiency by the vibration is improved.

The vibration acceleration is within a range of 98 $m/s^2$ to 1,962 $m/s^2$, preferably within a range of 98 $m/s^2$ to 981 $m/s^2$, more preferably within a range of 687 $m/s^2$ to 981 $m/s^2$, and even more preferably within a range of 785 $m/s^2$ to 981 $m/s^2$.

In a case where the vibration acceleration is equal to or higher than 98 $m/s^2$, the contents of the airtight container are homogeneously mixed together, and at least a portion of the surface of the edible pigment is coated with the edible dispersant. Accordingly, the edible pigment can exhibits dispersibility.

In a case where the vibration acceleration is equal to or lower than 1,962 $m/s^2$, the aggregation of crushed substances of the edible pigment that is caused in a case where the contents of the airtight container are excessively dispersed hardly occurs. Accordingly, the occurrence of coarse particles can be inhibited.

The optimal vibration time varies with the concentration of the edible pigment, the type of the edible dispersant, the vibration acceleration, and the like. Therefore, the vibration time cannot be generalized.

For example, the vibration time can be set to be equal to or longer than 30 seconds and equal to or shorter than 5 minutes.

The low frequency treatment can be performed using, for example, a low-frequency resonant acoustic mixer (trade name: LabRAM-MIXER, Resodyn Acoustic Mixers, Inc.).

The order of filling the container with the edible pigment, the edible dispersant, and water is not particularly limited.

For example, from the viewpoint of dispersibility, it is preferable that the container is filled with the edible pigment first, then with the edible dispersant, and finally with water.

In a case where the step A includes the step a2, it is preferable that the step A further includes a step of performing a dispersion treatment on the mixture obtained by the step a2 (hereinafter, referred to as "step a3" as well) after the step a2.

(Step a3)

The step a3 is a step of performing a dispersion treatment on the mixture obtained by the step a2.

In the step a3, by performing the dispersion treatment on the mixture obtained by the step a2 by means of the low frequency treatment, the edible pigment coated with the edible dispersant is disintegrated and dispersed.

The method of the dispersion treatment performed in the step a3 on the mixture obtained by the step a2 is not particularly limited, and examples thereof include a method using a dispersion apparatus.

Examples of the dispersion apparatus include dispersion apparatuses such as a ball mill, a beads mill, a sand mill, a salt mill, an attritor, a roll mill (for example, a three-roll mill), a tower mill, an agitator, a Henschel mixer, a colloid mill, an ultrasound homogenizer, a pearl mill, a wet-type jet mill, and a paint shaker.

As the method of the dispersion treatment in the step a3, from the viewpoint of dispersing the edible pigment better, a method using a mill (so-called grinder) is preferable, a method using dispersion media (so-called dispersion medium), that is, a method using a ball mill or a beads mill (particularly, a circulation-type beads mill) is more preferable, and a method using a ball mill is particularly preferable.

The dispersion media are a dispersion medium used for dispersing an object to be dispersed.

In the dispersion treatment in the step a3, as the dispersion media, for example, it is possible to use grains which are so-called beads having a size (that is, a media diameter) that is 0.01 mm to 3.0 mm, preferably 0.05 mm to 1.5 mm, and more preferably 0.1 mm to 1.0 mm.

The dispersion media are not particularly limited, and can be appropriately selected from known dispersion media such as glass beads and zirconia beads. As described above, hereinafter, the dispersion media will be referred to as "beads" as well.

For example, for the dispersion performed using a ball mill or a beads mill, a container made of stainless steel (SUS) is used as a dispersion container in many cases. From the viewpoint of edibility, it is hard to say that the use of the container made of stainless steel is preferable because chromium, which is one of the components of stainless steel, can be eluted into the dispersion.

From this point of view, in a case where a ball mill is used in the method of the dispersion treatment in the step a3, as the material of the dispersion container, a synthetic resin is preferable.

Examples of the synthetic resin include a polyester resin such as PP, PET, or PEN, PE, and the like. Among these, from the viewpoint of versatility, as the synthetic resin, PP or PE is preferable.

The rotation speed at the time of dispersion may be appropriately selected according to the apparatus to be used, and is not particularly limited.

For example, in a case where a ball mill is used as a dispersion apparatus, the rotation speed of the dispersion container (preferably the rotation speed of the outer peripheral portion of the container) is preferably equal to or higher than 100 rpm (rounds per minute; the same shall be applied hereinafter), more preferably equal to or higher than 200 rpm, and even more preferably equal to or higher than 300 rpm.

In a case where the rotation speed of the dispersion container is equal to or higher than 100 rpm, the edible pigment can be ground by the micro-vibration of the dispersion media in a state where the dispersion media stick to the wall surface of the container. As a result, the aggregation resulting from the collision between the edible pigments can be inhibited as far as possible, and it is possible to grind the edible pigment while coating the edible pigment with the edible dispersant. Therefore, a dispersion containing fewer coarse particles can be obtained. Furthermore, provided that the rotation speed of the dispersion container is low, in a case where zirconia beads are used as dispersion media, the impact that the zirconia beads exert on the dispersion becomes strong. Consequently, zirconium is likely to be eluted into the dispersion. However, it is considered that in a case where the rotation speed of the dispersion container is equal to or higher than 100 rpm, the impact that the zirconia beads exert on the dispersion may be reduced, and accordingly, zirconium may be hardly eluted into the dispersion.

The upper limit of the rotation speed of the dispersion container is not particularly limited. For example, from the viewpoint of preventing the breakage of the container and the leakage of a liquid, the upper limit of the rotation speed is preferably equal to or lower than 500 rpm.

The optimal dispersion time varies with the concentration of the edible pigment, the type of the edible dispersant, the media diameter of the dispersion media, and the like. Therefore, the dispersion time cannot be generalized.

For example, the dispersion time can be set to be equal to or longer than 3 hours and equal to or shorter than 150 hours.

It is preferable that the manufacturing method A further includes a step E of removing a portion of the edible dispersant at a point in time when the step A is not yet finished or at a point in time when the step A has finished but the step B, which will be described below, is not yet started.

That is, in a case where the edible pigment, the edible dispersant, and water are mixed together in the step A so as to obtain a mixture, it is preferable to adopt an aspect in which an excess of edible dispersant is added in advance, and at a point in time when the step A is not yet finished or at a point in time when the step A has finished but the step B, which will be described below, is not yet started, the step E of removing a portion of the edible dispersant is performed so as to remove, for example, an unnecessary edible dispersant that does not contribute to the dispersion of the edible pigment.

In a case where an excess of edible dispersant is added in advance, the adsorption of the edible dispersant onto the surface of the edible pigment can be promoted. In contrast, after the step A in which the dispersion is finished, for example, in a case where a large amount of free edible dispersant, which does not contribute to the dispersion, is present in the mixture prepared by the step A during the storage of the mixture, the edible pigment particles are crosslinked and aggregated by the edible dispersant, and accordingly, sometimes the storage stability of the mixture easily deteriorates. From this point of view, by promoting the stabilization of the dispersion by means of adding an excess of edible dispersant at the time of dispersion in the step A and by removing the unnecessary edible dispersant after the end of dispersion, the temporal stability of the mixture after dispersion can be improved.

The step E will be specifically described later.

In a case where an excess of edible dispersant is added, it is preferable that a ratio P of the content of the edible dispersant to the content of the edible pigment (=content of edible dispersant/content of edible pigment) in the step A satisfies Expression I based on mass.

$$0.25 < \text{Ratio } P < 1.2 \qquad \text{Expression I}$$

In a case where the ratio of the content of the edible dispersant in the step A is higher than 0.25, the amount of the edible dispersant with respect to the amount of the edible pigment becomes more suitable for stabilizing the dispersion of the edible pigment, and hence the edible pigment can be more stably dispersed.

Particularly, the ratio P in the step A is more preferably equal to or higher than 0.40 based on mass. The upper limit of the ratio P of the content of the edible dispersant in the step A is preferably equal to or lower than 1.2 as described above, more preferably equal to or lower than 0.90, and even more preferably equal to or lower than 0.85.

In the step A, it is preferable that an excess of edible dispersant is added in at least one of the step a1, the step a2, or the step a3. Particularly, an aspect is more preferable in which an excess of edible dispersant is added in at least one of the step a2 or the step a3, and an aspect is even more preferable in which an excess of edible dispersant is added in the step a3.

<Step B>

The step B is a step of applying a hydrostatic pressure equal to or higher than 30 MPa to the mixture prepared by the step A.

Hereinafter, the operation of applying a hydrostatic pressure equal to or higher than 30 MPa in the step B, will be referred to as "high pressure treatment" in some cases.

In the step B, by applying a hydrostatic pressure equal to or higher than 30 MPa to the mixture prepared by the step A, the edible dispersant is enforced to permeate the interior of particles (so-called coarse particles) formed by the aggregation of the edible pigment (including the edible pigment insufficiently coated with the edible dispersant), that is, a space between particles. The coarse particle having undergone the permeation of the edible dispersant to the interior thereof is disintegrated by the dispersion treatment in the step C which is the next step. As a result, edible pigment particles perfectly coated with the edible dispersant are formed.

In contrast, in a state where the edible dispersant does not permeate the interior of the coarse particles, even though the coarse particles are disintegrated in the step C, the disintegrated fine particles are immediately reaggregated. Accordingly, it is difficult to reduce the coarse particles.

In the step B, a hydrostatic pressure equal to or higher than 30 MPa is applied to the mixture prepared by the step A. As a result, fine particles present in the mixture contact each other and are solidified, and accordingly, the overall size of the particles tends to become uniform. In a case where the overall size of the particles becomes uniform, the stability of the dispersion becomes excellent.

From the viewpoint of reducing the coarse particles in the dispersion, the hydrostatic pressure applied to the mixture prepared by the step A is preferably equal to or higher than 50 MPa, more preferably equal to or higher than 75 MPa, and even more preferably equal to or higher than 100 MPa.

The upper limit of the hydrostatic pressure is not particularly limited, but is preferably equal to or lower than 200 MPa, for example.

The optimal time (referred to as "treatment time" as well) for which a hydrostatic pressure equal to or higher than 30 MPa is applied to the mixture prepared by the step A varies with the intensity of the hydrostatic pressure, the temperature of water, and the like. Therefore, the treatment time cannot be generalized. However, for example, the treatment time is preferably equal to or longer than 6 hours, more preferably equal to or longer than 15 hours, even more preferably equal to or longer than 18 hours, and particularly preferably equal to or longer than 24 hours.

The upper limit of the treatment time is not particularly limited, but is preferably equal to or shorter than 72 hours, for example.

The high pressure treatment may be performed at room temperature (23° C.), or may be performed while heat is being applied to the mixture prepared by the step A.

For example, from the viewpoint of further reducing the coarse particles in the dispersion, the high pressure treatment is performed preferably by applying heat to the mixture prepared by the step A, more preferably by applying heat with a temperature equal to or higher than 50° C., and even more preferably by applying heat with a temperature equal to or higher than 70° C.

As the step B, an aspect is preferable in which the step B is a step of applying a hydrostatic pressure equal to or higher than 100 MPa to the mixture prepared by the step A for 6 hours or longer, and an aspect is more preferable in which the step B is a step of applying a hydrostatic pressure equal to or higher than 100 MPa to the mixture prepared by the step A for 15 hours or longer while applying heat with a temperature equal to or higher than 70° C. to the mixture.

As the method for applying hydrostatic pressure to the mixture prepared by the step A, a cold isostatic pressing method is suitable. In the cold isostatic pressing method, in a state where the mixture prepared by the step A stands still without being stirred, it is possible to apply pressure to the mixture by using water from 360° directions while controlling the temperature of the mixture.

Examples of commercial products of devices, which can apply a hydrostatic pressure equal to or higher than 30 MPa to the mixture prepared by the step A by the cold isostatic pressing method, include an ultrahigh pressure treatment device (trade name: MARUGOTO EKISU, Toyo Koatsu Inc.).

In the step B, from the viewpoint of further reducing the coarse particles, it is desirable to perform the high pressure treatment by further adding the edible dispersant to the mixture prepared by the step A.

<Step C>

The step C is a step of performing a dispersion treatment on the mixture to which the hydrostatic pressure is applied by the step B.

In the step C, by performing the dispersion treatment to the mixture to which the hydrostatic pressure is applied by the step B, the coarse particles having undergone the permeation of the edible dispersant to the interior thereof by the step B are disintegrated, and the edible pigment particles perfectly coated with the edible dispersant are formed.

In the step C, the method of the dispersion treatment performed on the mixture to which the hydrostatic pressure is added by the step B is not particularly limited, and examples thereof include a method using a dispersion apparatus.

Examples of the dispersion apparatus include dispersion apparatuses such as a ball mill, a beads mill, a sand mill, a salt mill, an attritor, a roll mill (for example, a three-roll mill), a tower mill, an agitator, a Henschel mixer, a colloid mill, an ultrasound homogenizer, a pearl mill, a wet-type jet mill, and a paint shaker.

As the method of the dispersion treatment in the step C, from the viewpoint of dispersing the edible pigment better, a method using a mill (so-called grinder) is preferable, a method using dispersion media (so-called dispersion medium), that is, a method using a media mill is more preferable, and a method using a ball mill or a beads mill (particularly, a circulation-type beads mill) is even more preferable, and a method using a ball mill is particularly preferable.

In the dispersion treatment in the step C, as the dispersion media, for example, it is possible to use grains which are so-called beads having a size (that is, a media diameter) that is 0.01 mm to 3.0 mm, preferably 0.05 mm to 1.5 mm, and more preferably 0.1 mm to 1.0 mm.

The dispersion media are not particularly limited, and can be appropriately selected from known dispersion media such as glass beads and zirconia beads.

In a case where the method of the dispersion treatment in the step C is a method using a ball mill, as the material of the dispersion container, a synthetic resin is preferable. As described above, in a case where a container made of SUS, which is generally used as a dispersion container in a ball mill or the like, is used, chromium as one of the components of stainless steel can be eluted into the dispersion. Accordingly, from the viewpoint of edibility, it is hard to say that the use of the container made of SUS is preferable.

Examples of the synthetic resin include a polyester resin such as PP, PET, or PEN, PE, and the like. Among these, from the viewpoint of versatility, as the synthetic resin, PP or PE is preferable.

The rotation speed at the time of dispersion may be appropriately selected according to the apparatus to be used, and is not particularly limited.

For example, in a case where a ball mill is used as a dispersion apparatus, the rotation speed of the dispersion container (preferably the rotation speed of the outer peripheral portion of the container) is preferably equal to or higher than 50 rpm, and more preferably equal to or higher than 100 rpm.

In a case where the rotation speed of the dispersion container is equal to or greater than 50 rpm, even in a state where the viscosity of the material to be dispersed is reduced, the dispersion media excellently stick to the wall surface of the container. Accordingly, the edible pigment can be ground by the micro-vibration of the dispersion media in a state where the dispersion media stick to the wall surface of the container. As a result, the aggregation resulting from the collision between the edible pigments can be inhibited as far as possible, and it is possible to grind the edible pigment while coating the edible pigment with the edible dispersant.

Therefore, a dispersion containing fewer coarse particles can be obtained. Furthermore, provided that the rotation speed of the dispersion container is low, in a case where zirconia beads are used as dispersion media, the impact that the zirconia beads exert on the dispersion becomes strong. Consequently, zirconium is likely to be eluted into the dispersion. However, it is considered that in a case where the rotation speed of the dispersion container is equal to or higher than 50 rpm, the impact that the zirconia beads exert on the dispersion may be reduced, and accordingly, zirconium may be hardly eluted into the dispersion.

The upper limit of the rotation speed of the dispersion container is not particularly limited. For example, from the viewpoint of preventing the breakage of the container and preventing the leakage of a liquid, the upper limit of the rotation speed is preferably equal to or lower than 500 rpm.

The optimal dispersion time varies with the concentration of the edible pigment, the type of the edible dispersant, the media diameter of the dispersion media, and the like. Therefore, the dispersion time cannot be generalized.

For example, the dispersion time can be equal to or longer than 3 hours and equal to or shorter than 48 hours.

It is desirable that the dispersion treatment is performed under normal pressure, for example.

In a case where the step A includes the step a3, the dispersion conditions (for example, the conditions such as the dispersion apparatus, the dispersion media, the type of the dispersion container, the media diameter, the rotation speed of the dispersion container, and the dispersion time) of the dispersion treatment in the step a3 may be the same as or different from the dispersion conditions of the dispersion treatment in the step C.

<Step D>

It is preferable that the manufacturing method A further has a step D of adjusting a pH at 25° C. of the dispersion, which is obtained after the end of the step C, to be equal to or lower than 6.3.

In a case where iron oxide (for example, iron (III) oxide) is used as an edible pigment in the step A, as dispersion proceeds, the pH of the dispersion tends to increase. Presumably, this is because the surface area of the iron oxide increases, and accordingly, the compound may easily accept protons. In contrast, in a case where the pH of the dispersion exceeds 6.3 and becomes too high, the particle diameter of the particles in the dispersion easily increases with the lapse of time, and the stability of the dispersion easily deteriorates. Accordingly, in a case where the pH of the dispersion is adjusted to be equal to or lower than 6.3, dispersed particles having a small particle diameter are easily obtained, and the stability of the dispersion can be improved.

The dispersion mentioned herein refers to a dispersion obtained after the step C is finished, and may be a dispersion finally prepared by the manufacturing method A. The dispersion refers to a liquid containing water in an amount equal to or greater than 50% by mass with respect to the total mass of the dispersion.

As long as the step D of adjusting pH can adjust the pH of the finally prepared dispersion to be within a range of equal to or lower than 6.3, the step D may be performed at any time during the step A, the step B, and the step C described above. The pH of the finally obtained dispersion can be adjusted to be within a range of equal to or lower than 6.3 preferably before and after the step C of performing a dispersion treatment. Particularly, in view of making it difficult for the particle diameter after dispersion to change and making it easy to stabilize the dispersion, it is more preferable to adjust the pH at a point in time when the step B has finished but the step C is not yet started.

It is preferable that the pH is adjusted to be within a range suitable for dispersion at the time when a dispersion treatment is performed as in the step C, because then the particle diameter of the dispersed particles in the dispersion can be further reduced after the dispersion treatment is finished, and the dispersion can be stabilized.

The range of the pH at 25° C. of the dispersion obtained at least after the step C is even more preferably equal to or lower than 6.2.

Furthermore, the lower limit of the pH at 25° C. of the dispersion obtained at least after the step C is preferably equal to or higher than 5.0.

Examples of the method for adjusting the pH to be equal to or lower than 6.3 in the step D include a method of adding, for example, an acid agent, a buffer, or a proton-releasing compound to the mixture or the dispersion whose pH is to be reduced.

The acid agent may be any of inorganic and organic acids. Examples of the organic acids include acetic acid, citric acid, malic acid, succinic acid, and the like. Examples of the inorganic acids include carbonic acid and the like. As the acid agent, in view of jetting stability required in a case where an ink jet ink is prepared, an organic acid is preferable.

As the buffer, a salt of a weak acid is suitable, and examples thereof include a salt of citric acid, a salt of malic acid, a salt of acetic acid, and the like. As the salt, for example, an alkali metal (for example, potassium or sodium) salt or an alkali earth metal (for example, calcium) salt is preferable. The buffer plays a role of suppressing a sudden change of pH by mitigating a change of pH of the dispersion. Therefore, the buffer can more stably maintain the pH of the mixture or the dispersion.

Examples of the proton-releasing compound include propylene glycol, glycerin, and the like.

As the method for adjusting the pH to be equal to or lower than 6.3 in the step D, among the above, from the viewpoint of stably maintaining a low pH, a method of adding an acid or a method of adding an acid and a buffer is suitable. Particularly, a method of adding salts of an acid and a weak acid (particularly, salts of an organic acid and a weak organic acid) is more preferable.

pH is a value measured by the measurement method described above.

<Step E>

It is preferable that the manufacturing method A further has a step E of removing a portion of the edible dispersant at a point in time when the step A is not yet finished or at a point in time when the step A has finished but the step B is not yet started. In a case where the manufacturing method A has the step E, even though the manufacturing method does not have the step D, the final pH can be adjusted to be equal to or lower than 6.3.

In the manufacturing method A, in view of adjusting pH, an aspect in which the manufacturing method has both the step E and the step D may be adopted as a suitable method.

In a case where the manufacturing method A has the step E, the free dispersant in the dispersion liquid is removed, and hence the temporal change resulting from crosslinking, aggregation, and the like is inhibited. Consequently, an effect of improving stability is obtained. Therefore, it is preferable that the manufacturing method A has the step E.

The step B is a step of performing a high pressure treatment on the mixture prepared by the step A. In a case where the high pressure treatment is performed in the step B, the edible dispersant permeates the space between the aggregated edible pigment particles, and accordingly, it is difficult to remove the edible dispersant. Therefore, the step E is preferably performed before the step B.

"Point in time when the step A is not yet finished" means that the step E may be performed at any time during the step A. For example, the step E may be performed simultaneously with the step a1, the step a2, or the step a3, performed between the step a1 and the step a2, performed between the step a2 and the step a3, or performed between the step a3 and the step b.

Particularly, it is preferable that the manufacturing method A has the step E of removing a portion of the edible dispersant while the step a3 is being performed or at a point in time when the step a3 has finished but the step B is not yet started (that is, between the step a3 and the step b).

In a case where an excess of edible dispersant is added in the step A as described above, the ratio P of the content of the edible dispersant to the content of the edible pigment in the step A preferably satisfies Expression I based on mass.

$$0.25 < \text{Ratio } P < 1.2 \qquad \text{Expression I}$$

In this case, provided that the content of the free edible dispersant, which does not contribute to the dispersion of the edible pigment, is large, for example, in the step B, the edible pigment particles are crosslinked and aggregated by the edible dispersant, and hence the storage stability of the mixture easily deteriorates. Therefore, it is preferable to promote the stabilization of dispersion by adding an excess of edible dispersant at the time of dispersion in step A and to remove the unnecessary edible dispersant after the dispersion is finished. In this way, the temporal stability of the mixture after dispersion can be further improved.

That is, after the step A, a ratio Q of the content of the edible dispersant to the content of the edible pigment preferably satisfies Expression II based on mass.

$$0.05 < \text{Ratio } Q < 0.40 \qquad \text{Expression II}$$

In a case where the ratio Q of the content of the edible dispersant is higher than 0.05, it is possible to maintain the dispersibility of the edible pigment better while securing the amount of the edible dispersant necessary for dispersing the edible pigment. Furthermore, in a case where the ratio Q of the content of the edible dispersant is less than 0.40, the temporal stability of the mixture after dispersion is further improved.

Especially, the ratio Q of the content of the edible dispersant based on mass is more preferably equal to or lower than 0.35, even more preferably equal to or lower than 0.30, and particularly preferably equal to or lower than 0.25.

<Other Steps>

If necessary, the manufacturing method A of the present disclosure may have other steps in addition to the step A, the step B, and the step C.

Examples of those other steps include a step of preparing an ink by using the dispersion obtained through the steps such as the step A, the step B, and the step C of the present disclosure.

Hereinafter, the components used in each of the steps in the manufacturing method A of the present disclosure will be specifically described.

[Edible Pigment]

As the edible pigment used in the manufacturing method A, for example, pigments known as food additives and orally administrable pigments known as pharmaceutical additives can be used without particular limitation.

The definitions of "food additives" and "pharmaceutical additives" mentioned herein are as described above.

Specific examples of the edible pigment include black iron oxide (IUPAC name: iron (II.III) oxide, $Fe_3O_4$), iron sesquioxide (IUPAC name: iron (III) oxide, $Fe_2O_3$), yellow iron sesquioxide (IUPAC name: iron (III) oxide•monohydrate, $Fe_2O_3.H_2O$), Food Red No. 2 Aluminum Lake, Food Red No. 3 Aluminum Lake, Food Red No. 40 Aluminum Lake, Food Yellow No. 4 Aluminum Lake, Food Yellow No. 5 Aluminum Lake, Food Green No. 3 Aluminum Lake, Food Blue No. 1 Aluminum Lake, Food Blue No. 2 Aluminum Lake, titanium oxide, calcium carbonate, white charcoal, bamboo charcoal, and the like.

Among these, as the edible pigment used in the manufacturing method A, at least one kind of pigment selected from the group consisting of black iron oxide, iron (III) oxide, yellow iron sesquioxide, and Food Blue No. 2 Aluminum Lake is preferable.

As the edible pigment used in the manufacturing method A, commercial products can be used.

Examples of commercial products of the edible pigment include iron sesquioxide (trade name, shape: powder shape, use: pharmaceutical grade, standard: Japanese Pharmaceutical Excipients, KISHI KASEI CO., LTD.), black iron oxide (trade name, shape: powder shape, use: pharmaceutical grade, standard: Japanese Pharmaceutical Excipients, KISHI KASEI CO., LTD.), yellow iron sesquioxide (trade name, shape: powder shape, use: pharmaceutical grade, standard: Japanese Pharmaceutical Excipients, KISHI KASEI CO., LTD.), Food Blue No. 2 Aluminum Lake (trade name, shape: powder shape, use: food additives, DaiwaKasei Co., Ltd.), and the like.

In the manufacturing method A of the present disclosure, only one kind of edible pigment or two or more kinds of edible pigments may be used.

[Edible Dispersant]

As the edible dispersant used in the manufacturing method A, for example, dispersants known as food additives and orally administrable dispersants known as pharmaceutical additives can be used without particular limitation.

The definitions of "food additives" and "pharmaceutical additives" mentioned herein are as described above.

As the edible dispersant used in the manufacturing method A, a resin is preferable.

The resin is not limited to the substance generally used as a dispersed resin, and may be a resin used as a coating agent for pharmaceutical products, for example.

As the resin used as the edible dispersant, a resin containing at least one of an amino group or a quaternary ammonium group is preferable, because such a resin stably disperses the edible pigment and improves the jetting properties of an ink in a case where the dispersion is used in an ink jet recording ink.

The amino group means a monovalent functional group obtained in a case where one hydrogen atom is removed from ammonia, a primary amine, or a secondary amine.

As the quaternary ammonium group, a quaternary ammonium cation or a quaternary ammonium salt is preferable.

Both the resin having an amino group and the resin having a quaternary ammonium group may be a copolymer of a plurality of monomers. In a case where the resin having an amino group and the resin having a quaternary ammonium group are copolymers, they may be copolymers obtained by copolymerizing a (meth)acrylic acid ester, an alkyl ammonium (meth)acrylate salt, dimethylaminoethyl methacrylate, and the like as monomers.

Specific examples of the monomers include a (meth) acrylic acid alkyl ester such as methyl (meth)acrylate, ethyl (meth)acrylate, n-propyl (meth)acrylate, or n-butyl (meth) acrylate, a salt of trimethylammonium ethyl acrylate or trimethylammonium ethyl methacrylate, a salt of triethyl-ammonium ethyl acrylate or triethylammonium ethyl methacrylate, dimethylaminoethyl methacrylate, and the like.

Examples of the resin having an amino group include gelatin, an aminoalkyl methacrylate copolymer, and the like.

Examples of the gelatin include acid-treated gelatin, alkali-treated gelatin, and the like.

In a case where the aforementioned edible pigment is iron oxide such as black iron oxide or iron (III) oxide, as the gelatin, alkali-treated gelatin is preferable.

Examples of commercial products of the gelatin include alkali-treated gelatin from Nitta Gelatin Inc., and the like.

Examples of commercial products of the aminoalkyl methacrylate copolymer include EUDRAGIT (registered trademark) E100 and EUDRAGIT (registered trademark) EPO (all of these are methyl methacrylate/butyl methacrylate/dimethylaminoethyl methacrylate copolymers) from Evonik Nutrition & Care GmbH, and the like.

As the resin having a quaternary ammonium group, a (meth)acrylic copolymer containing a quaternary ammonium group is preferable, and an alkyl methacrylate copolymer containing a quaternary ammonium group (that is, an ammonioalkyl (meth)acrylate copolymer) is more preferable.

As the alkyl (meth)acrylate copolymer containing a quaternary ammonium group (ammonioalkyl (meth)acrylate copolymer), a copolymer is preferable which contains at least a structural unit derived from an (meth)acrylic acid alkyl ester and a structural unit derived from a (meth)acrylic acid alkyl ammonium salt, and a copolymer is more preferable which contains a structural unit derived from at least one monomer selected from methyl (meth)acrylate or ethyl (meth)acrylate and a structural unit derived from trimethylammonium ethyl (meth)acrylate chloride.

Specific examples of the alkyl (meth)acrylate copolymer containing a quaternary ammonium group include an ethyl acrylate/methyl methacrylate/trimethylammonium ethyl methacrylate chloride copolymer and the like.

Examples of the ethyl acrylate/methyl methacrylate/trimethylammonium ethyl methacrylate chloride copolymer include commercial products such as EUDRAGIT (registered trademark) RLPO, EUDRAGIT (registered trademark) RSPO, EUDRAGIT (registered trademark) RL100, EUDRAGIT (registered trademark) RS100, and the like.

Examples of the edible dispersant also include polymer compounds such as lignocellulose, hydroxypropyl cellulose, methyl cellulose, polyethylene glycol, and beet saponin silanol.

In the manufacturing method A of the present disclosure, only one kind of edible dispersant or two or more kinds of edible dispersants may be used.

[Water]

In the manufacturing method A of the present disclosure, water functions as a dispersion medium. From the viewpoint of safety, it is preferable to use water as a dispersion medium.

As water, natural water, purified water, distilled water, deionized water, pure water, ultrapure water, and the like can be used without particular limitation.

Among these, purified water, distilled water, deionized water, pure water, or ultrapure water is preferable as water, because these contain few impurities.

[Other Components]

In the manufacturing method A of the present disclosure, as long as the effects of the present invention are not impaired, other components may be used in addition to the edible pigment, the edible dispersant, and water.

Those other components can be appropriately selected from orally ingestible compounds. Specific examples of those other components are the same as other components which will be described later. Therefore, the specific examples will not be described herein.

[Use of Dispersion Obtained by Manufacturing Method A]

Compared to the dispersion obtained by the method of the related art, the dispersion obtained by the manufacturing method A of the present disclosure (hereinafter, referred to as dispersion A as well) contains fewer coarse particles. For example, in a case where the dispersion A containing few coarse particles is used as an ink jet recording ink, a nozzle is hardly clogged, and jetting properties from an ink jet head are excellent. Accordingly, the dispersion A obtained by the manufacturing method A of the present disclosure is suitable for being used in ink jet recording, for example.

In a case where the dispersion A obtained by the manufacturing method A of the present disclosure is used for ink jet recording, the dispersion itself may be used as an ink jet recording ink.

Furthermore, the dispersion A obtained by the manufacturing method A of the present disclosure may be used as an ink jet recording ink after components other than the aforementioned components are further added thereto.

In a case where the dispersion A obtained by the manufacturing method A of the present disclosure is used for ink jet recording, other components which may be further added to the dispersion A can be appropriately selected from orally ingestible compounds.

Examples of those other components include known edible additives which can be orally ingested among a water-soluble organic solvent, a surfactant, a chelating agent, a fungicide, an emulsion stabilizer, an antifading agent, a preservative, a pH adjuster, a surface tension adjuster, an antifoaming agent, a viscosity adjuster, a dispersion stabilizer, and the like.

The water-soluble organic solvent can function as an anti-drying agent preventing clogging which can occur in a case where an ink sticks to and is dried on an ink jet opening of an injection nozzle in an ink jet recording device.

In the present specification, "water-soluble organic solvent" means an organic solvent dissolves by an amount equal to or greater than 5 g (preferably equal to or greater than 10 g) in 100 g of water at 25° C.

As the water-soluble organic solvent, from the viewpoint of preventing drying, a water-soluble organic solvent having a vapor pressure lower than that of water is preferable. Examples thereof include edible alcohols such as glycerin and propylene glycol. It is preferable to use propylene glycol and glycerin because these alcohols are easily available and make it possible to prepare an ink having excellent moisture retaining properties.

The surfactant can improve ink jetting properties because this substance can adjust the surface tension of the dispersion A obtained by the manufacturing method A to be within an appropriate range.

Examples of the surfactant include edible surfactants such as succinic acid monoglyceride, soybean saponin, erythritol, Quillaja saponin, barium chloride hydrate, a propylene glycol fatty acid ester, lecithin, enzyme-treated lecithin, a glycerin fatty acid ester, organic acid monoglyceride, a sucrose fatty acid ester, and a sorbitan fatty acid ester (polysorbate 20, polysorbate 60, polysorbate 65, polysorbate 80, or the like).

In a case where the dispersion A obtained by the manufacturing method A of the present disclosure is used for ink jet recording, the dispersion may contain edible additives such as a flavonoid compound, propylene glycol laurate, a rosemary compound, propylene glycol dioleate, a glycerin diacetic acid ester, disodium hydrogen phosphate, stearyl monoglyceridyl, a citric acid ester, tetrasodium pyrophosphate, sodium polyphosphate, guar gum, amylopectin, pectin, Kumarindo gum, xanthan gum, potassium metaphosphate, enzyme-treated soybean saponin, animal sterol, sodium carboxymethyl cellulose, and citric acid.

One kind of these edible additives may be used singly, or two or more kinds of these edible additives may be used in combination.

The dispersion A obtained by the manufacturing method A of the present disclosure can be particularly suitably used for printing letters or images on articles such as orally ingested solid foods and pharmaceutical products (for example, solid preparations such as a tablet and a capsule) by using an ink jet method.

According to the printing of letters or images by using an ink jet method, letters or images can be printed on foods or pharmaceutical products without the contact with the surface of the foods or the pharmaceutical products. Therefore, the letters or images can be stably recorded regardless of the formulation or the shape of the foods or the pharmaceutical products.

Examples of the solid preparations include pharmaceutical products such as a plain tablet (uncoated tablet), a sugar-coated tablet, an enteric tablet, an orally disintegrating tablet, and a film-coated tablet in which a water-soluble surface layer is formed as the outermost surface of a tablet.

The dispersion obtained by the manufacturing method A of the present disclosure can be used for ink jet recording performed not only on foods or pharmaceutical products but also on solids such as solid fertilizers or hygiene items which are not for oral ingestion.

[Pigment Dispersion for Ink Jet Recording]

A second embodiment according to the present disclosure is a pigment dispersion for ink jet recording containing an edible pigment at a concentration equal to or higher than 1.0% by volume, an edible dispersant, and water, in which in a particle size distribution of the pigment dispersion measured using a laser diffraction/scattering-type particle size distribution measurement apparatus and an optical path length variable cell comprising a spacer having a thickness of 5 μm, a particle diameter $D_{10}$ at which a volume-based cumulative detection frequency becomes 10% (hereinafter, simply referred to as "$D_{10}$" as well), a particle diameter $D_{50}$ at which a volume-based cumulative detection frequency becomes 50% (hereinafter, simply referred to as "$D_{50}$" as well), and a particle diameter $D_{90}$ at which a volume-based cumulative detection frequency becomes 90% (hereinafter, simply referred to as "$D_{90}$" as well) satisfy Expression (A1) and Expression (B1).

$$D_{50} \leq 0.5 \text{ μm} \qquad \text{Expression (A1)}$$

$$(D_{90}-D_{10})/D_{50} \leq 1.0 \qquad \text{Expression (B1)}$$

Hereinafter, the pigment dispersion for ink jet recording of the embodiment will be simply referred to as "pigment dispersion B" as well.

Considering that an edible ink is used for printing letters or images on foods, pharmaceutical products, and the like that will be orally ingested, it is desirable that the edible ink can reproduce a sufficient color density with a smaller amount. In order to obtain an edible ink which can reproduce a sufficient color density with a small amount of coating, an edible pigment needs to be dispersed in a liquid at a high concentration.

However, generally, the raw material powder of an edible pigment has a large particle diameter, and an edible dispersant used for dispersing the edible pigment is not sufficiently adsorbed onto the surface of the edible pigment. Therefore, in a case where the concentration of the edible pigment in the edible ink is high, the edible pigment tends to be present as a large number of coarse particles. In a case where such an ink is used as an ink jet recording ink, ink jetting properties deteriorate. Accordingly, it has been difficult to realize an edible ink containing an edible pigment at a high concentration.

In contrast, the inventors of the present invention have realized a pigment dispersion (that is, a pigment dispersion B) suitable as an edible ink which contains an edible pigment at a concentration equal to or higher than 1.0% by volume which is a higher concentration compared to the related art, has few coarse particles, and results in excellent ink jetting properties in a case where the pigment dispersion is used in an ink jet recording ink.

Incidentally, in the related art, for a pigment dispersion having a pigment concentration equal to or higher than 1.0% by volume, it has been difficult to measure the particle size distribution of the undiluted solution of the pigment dispersion without diluting the pigment dispersion. The inventors of the present invention have made it possible to measure the particle size distribution of the pigment dispersion having a high pigment concentration without diluting the dispersion.

As measurement methods of a particle size distribution, measurement methods by a dynamic light scattering method, a laser diffraction/scattering method, and the like are known. For example, in the dynamic light scattering method, unless particles perform the Brownian motion, the particle size distribution cannot be measured. Furthermore, in principle, the dynamic light scattering method is affected by viscosity. Therefore, in the dynamic light scattering method, in a case where the pigment dispersion has a high pigment concentration, the pigment dispersion needs to be diluted before measuring the particle size distribution. However, in a case where the pigment dispersion is diluted, for reasons such as difficulty in observing coarse particles, an accurate particle size distribution in a high-concentration state cannot be measured. Furthermore, in the laser diffraction/scattering method, groups of particles are irradiated with laser light, and from an intensity distribution pattern of diffracted/scattered light emitted from the particles, a particle size distribution is determined by calculation. In the laser diffraction/scattering method, data on wide-angle back-scattered light and wide-angle front-scattered light (light transmitted through and scattered by a cell) is necessary. Therefore, a sample solution needs to be diluted until transmitted light is obtained, and needs to be continuously sheared while being measured. Accordingly, it is difficult to measure the pigment dispersion having a high pigment concentration.

In contrast, the inventors of the present invention combined the measurement method by the laser diffraction/scattering method using a laser diffraction/scattering-type particle size distribution measurement apparatus with an optical path length variable cell having a specific structure. In this way, the inventors have made it possible to measure the particle size distribution in the pigment dispersion having a high pigment concentration without diluting the pigment dispersion.

The optical path length variable cell is a cell which is developed by the inventors of the present invention and can adjust the optical path length of a sample solution. By shortening the optical path length, it is possible to obtain transmitted laser light with sufficient intensity without diluting the pigment dispersion having a high pigment concentration.

[Optical Path Length Variable Cell]

Figure 2:
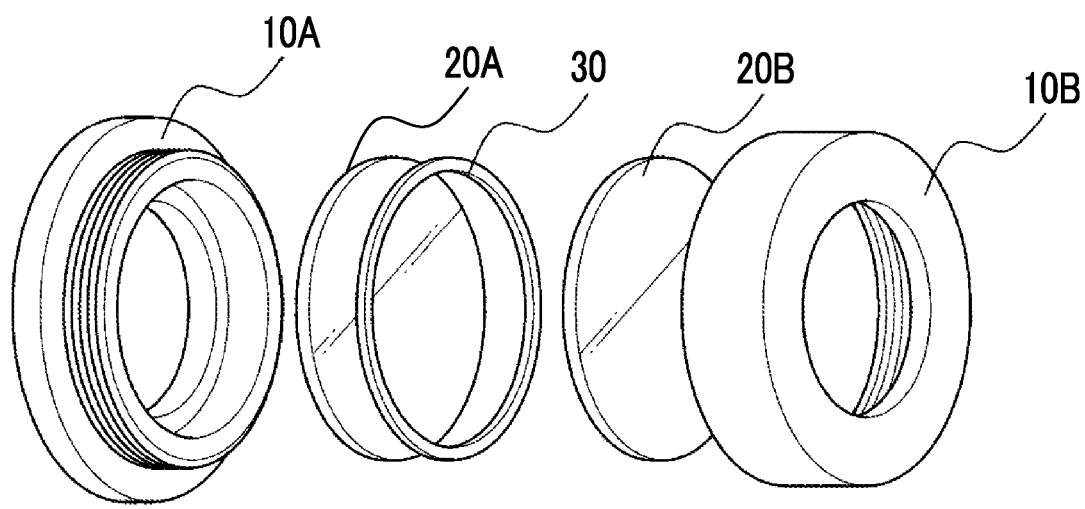
FIG. 2 is an exploded view showing the constitution of the optical path length variable cell in FIG. 1.
Figure 3:
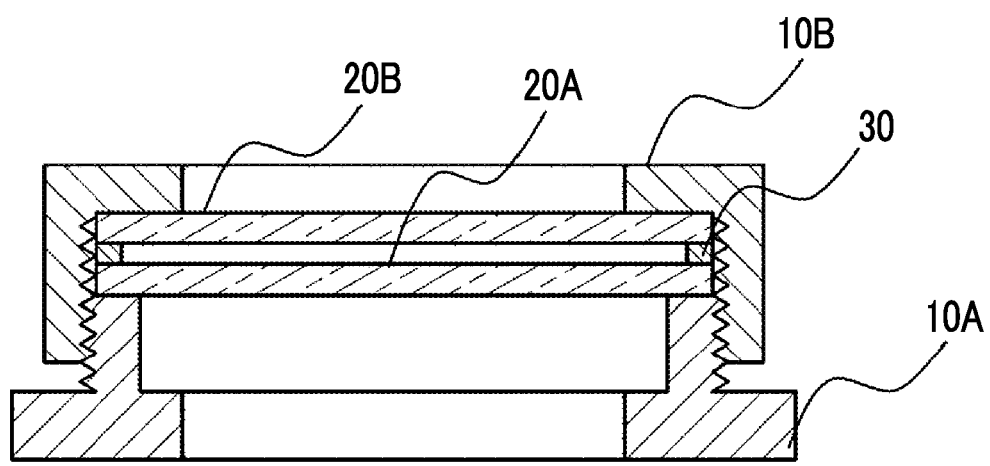
FIG. 3 is a cross-sectional view of the optical path length variable cell in FIG. 1.

Hereinafter, the optical path length variable cell of the present disclosure will be schematically described with reference to drawings (FIG. 1 to FIG. 3).

FIG. 1 is a perspective view of the optical path length variable cell of the present disclosure. FIG. 2 is an exploded view showing the constitution of the optical path length variable cell in FIG. 1. FIG. 3 is a cross-sectional view of the optical path length variable cell in FIG. 1.

As shown in FIG. 1 to FIG. 3, an optical path length variable cell 1 comprises a holding device 10 (constituted with 10A and 10B) made of a metal, two sheets of glass plates 20 (20A and 20B), and a spacer 30. The optical path length variable cell 1 is formed by interposing the spacer 30 between the two sheets of glass plates 20A and 20B, and fixing the two sheets of glass plates 20A and 20B, between which the spacer 30 is interposed, by using the holding devices 10A and 10B which are screw fixing-type devices. The glass plate 20B has two small holes (not shown in the drawing). After the glass plate 20B is fixed by the holding device 10 (10A and 10B), a sample solution is injected through one of the holes. The injected sample solution spreads over the space formed by the two sheets of glass plates 20 (20A and 20B) and the spacer 30.

In the optical path length variable cell 1, by changing the thickness of the spacer, the optical path length can be adjusted. Accordingly, even though the pigment concentration is high, by reducing the thickness of the spacer 30, transmitted laser light can be obtained with sufficient intensity, and the particle size distribution can be measured by the laser diffraction/scattering method. For measuring the particle size distribution in the pigment dispersion of the present disclosure, the spacer 30 having a thickness of 5 μm is used.

The material of the spacer 30 is not particularly limited, and examples thereof include materials such as a metal and a resin.

In the particle size distribution of the pigment dispersion B of the present disclosure that is measured using the laser diffraction/scattering-type particle size distribution measurement apparatus and the optical path length variable cell comprising the spacer having a thickness of 5 μm, $D_{10}$, $D_{50}$, and $D_{90}$ satisfy Expression (A1) and Expression (B1), preferably satisfy Expression (A1) and Expression (B2) or Expression (A2) and Expression (B1), and more preferably satisfy Expression (A2) and Expression (B2).

$$D_{50} \leq 0.5 \text{ μm} \quad \text{Expression (A1)}$$

$$D_{50} \leq 0.1 \text{ μm} \quad \text{Expression (A2)}$$

$$(D_{90}-D_{10})/D_{50} \leq 1.0 \quad \text{Expression (B1)}$$

$$(D_{90}-D_{10})/D_{50} \leq 0.5 \quad \text{Expression (B2)}$$

The value of $(D_{90}-D_{10})/D_{50}$ represents a value which is reduced as the particle size distribution becomes narrower. $D_{10}$ refers to a particle diameter showing that 10% of particles have a diameter smaller than $D_{10}$ in a volume-based cumulative particle size distribution (%) measured by laser diffraction/scattering. $D_{50}$ refers to a particle diameter showing that 50% of particles have a diameter smaller than $D_{50}$ in the same volume-based cumulative particle size distribution (%). $D_{90}$ refers to a particle diameter showing that 90% of particles have a diameter smaller than $D_{90}$ in the same volume-based cumulative particle size distribution (%).

The pigment dispersion B of the present disclosure satisfies Expression (A1) and Expression (B1). That is, the pigment dispersion B contains dispersed particles having a small particle diameter and has a narrow particle size distribution. Therefore, even though the pigment dispersion B has a high edible pigment concentration which is equal to or higher than 1.0% by volume, the pigment dispersion B results in excellent ink jetting properties in a case where the dispersion is used in an ink jet recording ink.

In the pigment dispersion B of the present disclosure, the edible pigment is dispersed by being mixed with the edible dispersant. Therefore, the edible pigment is present by being dispersed in the pigment dispersion B in a state where at least a portion of the surface of the edible pigment is coated with the edible dispersant.

Satisfying Expression (A1) and Expression (B1) means that the edible dispersant of the quantity necessary for dispersing the edible pigment perfectly coats the surface of the edible pigment, and the number of coarse particles of the edible pigment and the amount of the free edible dispersant are small.

Hereinafter, each of the components of the pigment dispersion B of the present disclosure will be specifically described.

[Edible Pigment]

The pigment dispersion B of the present disclosure contains an edible pigment.

As the edible pigment, for example, pigments known as food additives and orally administrable pigments known as pharmaceutical additives can be used without particular limitation.

The definitions of "food additives" and "pharmaceutical additives" mentioned herein are as described above.

Specific examples of the edible pigment contained in the pigment dispersion B include the edible pigments exemplified in the description of the manufacturing method A of the present disclosure, and a preferable aspect thereof is also the same as that of the edible pigment used in the manufacturing method A.

As the edible pigment contained in the pigment dispersion B, it is possible to use the commercial products exemplified in the description of the edible pigment used in the manufacturing method A of the present disclosure.

The pigment dispersion B of the present disclosure may contain only one kind of edible pigment or two or more kinds of edible pigments.

The content rate of the edible pigment in the pigment dispersion B of the present disclosure is not particularly limited. For example, from the viewpoint of easily obtaining a coloring density suitable for printing letters or forming images, the content rate of the edible pigment with respect to the total mass of the pigment dispersion B is preferably equal to or higher than 0.5% by mass, more preferably equal to or higher than 1.0% by mass, and even more preferably equal to or higher than 3.0% by mass.

The upper limit of the content rate of the edible pigment in the pigment dispersion B of the present disclosure is not particularly limited. For example, from the viewpoint of making it easy to stabilize the dispersion state and to adjust the viscosity to a value suitable for jetting the dispersion by an ink jet method, the upper limit of the content rate of the edible pigment with respect to the total mass of the pigment dispersion is preferably equal to or lower than 20% by mass.

The concentration of the edible pigment in the pigment dispersion B of the present disclosure with respect to the total volume of the pigment dispersion B is equal to or higher than 1.0% by volume, preferably equal to or higher than 1.5% by volume, more preferably equal to or higher than 2.0% by volume, even more preferably equal to or higher than 2.5% by volume, and particularly preferably 3.0% by volume.

The upper limit of the concentration of the edible pigment in the pigment dispersion B of the present disclosure is not particularly limited. For example, from the viewpoint of making it easy for the finally obtained dispersion to be in a stable dispersion state and making it easy to adjust the viscosity to a value suitable for jetting the dispersion by an ink jet method, the upper limit of the concentration of the edible pigment with respect to the total volume of the pigment dispersion B is preferably equal to or lower than 10% by volume.

[Edible Dispersant]

The pigment dispersion B of the present disclosure contains an edible dispersant.

As the edible dispersant, for example, dispersants known as food additives and orally administrable dispersants known as pharmaceutical additives can be used without particular limitation.

The definitions of "food additives" and "pharmaceutical additives" mentioned herein are as described above.

As the edible dispersant contained in the pigment dispersion B, a resin is preferable.

As the edible dispersant contained in the pigment dispersion B, the edible dispersant used in the manufacturing method A can be used, and a preferable aspect thereof is also the same as that of the edible dispersant used in the manufacturing method A.

The pigment dispersion B of the present disclosure may contain only one kind of edible dispersant or two or more kinds of edible dispersants.

The content rate of the edible dispersant in the pigment dispersion B of the present disclosure is not particularly limited. For example, the content rate of the edible dispersant with respect to the total mass of the pigment dispersion is preferably equal to or higher than 0.1% by mass, more preferably equal to or higher than 0.5% by mass, and even more preferably equal to or higher than 1% by mass.

The upper limit of the content rate of the edible dispersant in the pigment dispersion B of the present disclosure is not particularly limited. For example, the upper limit of the content rate of the edible dispersant with respect to the total mass of the pigment dispersion is preferably equal to or lower than 15% by mass, more preferably equal to or lower than 12% by mass, and even more preferably equal to or lower than 10% by mass.

In a case where the content rate of the edible dispersant in the pigment dispersion B of the present disclosure is equal to or higher than 0.1% by mass and equal to or lower than 15% by mass with respect to the total mass of the pigment dispersion B, the dispersion state of the finally obtained dispersion is easily stabilized, and it is easy to adjust the viscosity to a value suitable for jetting the dispersion by an ink jet method.

The ratio of the content of the edible dispersant to the content of the edible pigment (content of edible dispersant/content of edible pigment) in the pigment dispersion B of the present disclosure that is expressed as a mass ratio is preferably equal to or higher than 0.1 and equal to or lower than 1.5, more preferably equal to or higher than 0.2 and equal to or lower than 1.2, and even more preferably equal to or higher than 0.3 and equal to or lower than 1.0.

"Content of edible dispersant" mentioned herein refers to the total amount of the edible dispersant, which coats the edible pigment, and the edible dispersant, which is free in the liquid without coating the edible pigment, in the pigment dispersion B.

In a case where the ratio of the content of the edible dispersant to the content of the edible pigment (content of edible dispersant/content of edible pigment) in the pigment dispersion B of the present disclosure that is expressed as a mass ratio is equal to or higher than 0.1, the amount of the edible dispersant with respect to the amount of the edible pigment becomes a quantity appropriate for dispersing the edible pigment. Accordingly, the edible pigment can be more stably dispersed, and in a case where the pigment dispersion B is used in an ink jet recording ink, ink jetting properties can be further improved.

Generally, the larger the amount of a dispersant, the easier it is to reduce the particle diameter of dispersed particles. However, as the amount of a dispersant increases, dispersed particles tend not to be easily dispersed. From this point of view, the ratio of the content of the edible dispersant to the content of the edible pigment (content of edible dispersant/content of edible pigment) in the pigment dispersion of the present disclosure that is expressed as a mass ratio is preferably reduced to become equal to or lower than 1.5. In a case where the ratio is reduced to become equal to or lower than 1.5, the edible pigment can be dispersed better. Furthermore, in a case where such a pigment dispersion B is used in an ink jet recording ink, ink jetting properties can be further improved.

[Water]

The pigment dispersion B of the present disclosure contains water.

In the pigment dispersion B of the present disclosure, water functions as a dispersion medium. From the viewpoint of safety, it is preferable to use water as a dispersion medium.

As the water contained in the pigment dispersion B, natural water, purified water, distilled water, deionized water, pure water, ultrapure water, and the like can be used without particular limitation.

Among these, as the water contained in the pigment dispersion, purified water, distilled water, deionized water, pure water, or ultrapure water is preferable, because these contain few impurities.

The content rate of water in the pigment dispersion B is not particularly limited. For example, from the viewpoint of storage stability of the pigment dispersion B, the content rate of water with respect to the total mass of the pigment dispersion B is preferably equal to or higher than 60% by mass and equal to or lower than 95% by mass, more preferably equal to or higher than 65% by mass and equal to or lower than 90% by mass, and even more preferably equal to or higher than 70% by mass and equal to or lower than 85% by mass.

As long as the effects of the present invention are not impaired, the pigment dispersion B of the present disclosure may contain other solvents (for example, an organic solvent) in addition to water.

<Use of Pigment Dispersion B>

The pigment dispersion B of the present disclosure is used for ink jet recording.

The pigment dispersion B of the present disclosure has a pigment concentration higher than that of the related art. Therefore, the pigment dispersion B can reproduce a sufficient color density with a small amount. Furthermore, the pigment dispersion B of the present disclosure contains few coarse particles. Therefore, in a case where the pigment dispersion B is used in an ink jet recording ink, jetting properties from an ink jet head are excellent. In addition, the pigment dispersion B of the present disclosure has excellent dispersion stability, and the dispersion state of the particles hardly deteriorates with the lapse of time after dispersion. Accordingly, the jetting properties from an ink jet head hardly deteriorate.

In a case where the pigment dispersion B of the present disclosure is used for ink jet recording, the pigment dispersion itself may be used as an ink jet recording ink.

Furthermore, the pigment dispersion B of the present disclosure may be used as an ink jet recording ink after components other than the aforementioned components are further added thereto.

In a case where the pigment dispersion B of the present disclosure is used for ink jet recording, those other components which may be further added to the pigment dispersion B can be selected from orally ingestible compounds.

Examples of those other components include known edible additives which can be orally ingested among a water-soluble organic solvent, a surfactant, a chelating agent, a fungicide, an emulsion stabilizer, antifading agent, a preservative, a pH adjuster, a surface tension adjuster, an antifoaming agent, a viscosity adjuster, a dispersion stabilizer, and the like.

The water-soluble organic solvent can function as an anti-drying agent preventing clogging which can occur in a case where an ink sticks to and is dried on an ink jet opening of an injection nozzle in an ink jet recording device.

In the present specification, "water-soluble organic solvent" means an organic solvent dissolves by an amount equal to or greater than 5 g (preferably equal to or greater than 10 g) in 100 g of water at 25° C.

As the water-soluble organic solvent which may be further added to the pigment dispersion B, from the viewpoint of preventing drying, a water-soluble organic solvent having a vapor pressure lower than that of water is preferable. Examples thereof include edible alcohols such as glycerin and propylene glycol. It is preferable to use propylene glycol and glycerin because these alcohols are easily available and make it possible to prepare an ink having excellent moisture retaining properties.

In a case where the pigment dispersion B of the present disclosure contains the water-soluble organic solvent, the content rate of the water-soluble organic solvent in the pigment dispersion is preferably equal to or higher than 10% by mass and equal to or lower than 50% by mass with respect to the total mass of the pigment dispersion.

The surfactant can adjust the surface tension of the pigment dispersion B to be within an appropriate range. Therefore, the surfactant can improve ink jetting properties.

Examples of the surfactant which may be further added to the pigment dispersion B include edible surfactants such as succinic acid monoglyceride, soybean saponin, erythritol, Quillaja saponin, barium chloride hydrate, a propylene glycol fatty acid ester, lecithin, enzyme-treated lecithin, a glycerin fatty acid ester, organic acid monoglyceride, a sucrose fatty acid ester, and a sorbitan fatty acid ester (polysorbate 20, polysorbate 60, polysorbate 65, polysorbate 80, or the like).

In a case where the pigment dispersion B of the present disclosure contains a surfactant, the content rate of the surfactant in the pigment dispersion is preferably equal to or higher than 0.05% by mass and equal to or lower than 0.5% by mass with respect to the total mass of the pigment dispersion B.

The pigment dispersion B of the present disclosure may contain edible additives such as a flavonoid compound, propylene glycol laurate, a rosemary compound, propylene glycol dioleate, a glycerin diacetic acid ester, disodium hydrogen phosphate, stearyl monoglyceridyl, a citric acid ester, tetrasodium pyrophosphate, sodium polyphosphate, guar gum, amylopectin, pectin, Kumarindo gum, xanthan gum, potassium metaphosphate, enzyme-treated soybean saponin, animal sterol, sodium carboxymethyl cellulose, and citric acid.

One kind of these edible additives may be used singly, or two or more kinds of these edible additives may be used in combination.

The pigment dispersion B of the present disclosure can be particularly suitably used for printing letters or images on articles such as solid foods, pharmaceutical products (for example, solid preparations such as a tablet and a capsule), and the like that will be orally ingested by using an ink jet method.

According to the printing of letters or images using an ink jet method, letters or images can be printed on foods or pharmaceutical products without the contact with the surface of the foods or the pharmaceutical products. Therefore, the letters or images can be stably recorded regardless of the formulation or the shape of the foods or the pharmaceutical products.

Examples of the solid preparations include pharmaceutical products such as a plain tablet (uncoated tablet), a sugar-coated tablet, an enteric tablet, an orally disintegrating tablet, and a film-coated tablet in which a water-soluble surface layer is formed as the outermost surface of a tablet.

The pigment dispersion of the present disclosure can be used for ink jet recording performed not only on foods or pharmaceutical products but also on solids such as solid fertilizers or hygiene items which are not for oral ingestion.

<Preferable Physical Properties of Pigment Dispersion B>

The semiconductor laser light (wavelength: 650 nm) transmittance of the pigment dispersion B of the present disclosure that is measured at a concentration of the edible pigment of equal to or higher than 1.0% by volume by using a laser diffraction/scattering-type particle size distribution measurement apparatus and the aforementioned optical path length variable cell (spacer thickness: 5 μm) is preferably equal to or higher than 40%, more preferably equal to or higher than 50%, even more preferably equal to or higher than 70%, and particularly preferably equal to or higher than 80%.

The smaller the number of coarse particles in the pigment dispersion B and the smaller the particle diameter overall, the higher the transmittance of the pigment dispersion B measured by the aforementioned method tends to be. In a case where the transmittance of the pigment dispersion B measured by the aforementioned method is equal to or higher than 40%, and such a pigment dispersion B is used in an ink jet recording ink, it is easy to realize excellent ink jetting properties.

As the laser diffraction/scattering-type particle size distribution measurement apparatus, for example, Partica LA-960 (trade name) manufactured by HORIBA, Ltd. is used.

The viscosity at 23° C. of the pigment dispersion B of the present disclosure is preferably equal to or lower than 10 mPa·s.

In a case where the edible pigment in the pigment dispersion B is perfectly coated with the edible dispersant, and the amount of leftover edible dispersant (so-called free edible dispersant) which does not coat the edible pigment is small, the viscosity of the pigment dispersion B tends to be low. In a case where the viscosity at 23° C. of the pigment dispersion B is equal to or lower than 10 mPa·s, filterability becomes excellent. Therefore, the productivity is improved, and in a case where the pigment dispersion is used in an ink jet recording ink, it is easy to realize excellent ink jetting properties.

The viscosity of the pigment dispersion B is a value measured using a vibro viscometer. As the vibro viscometer, for example, VM-10A (trade name) manufactured by CBC Group is used.

The pH of the pigment dispersion B of the present disclosure is not particularly limited. For example, from the viewpoint of dispersion stability of the edible pigment, the pH is preferably equal to or higher than 4 and equal to or lower than 9, and more preferably equal to or higher than 5 and equal to or lower than 7.

The pH of the pigment dispersion is a value measured by the aforementioned measurement method.

[Manufacturing Method of Pigment Dispersion for Ink Jet Recording]

A manufacturing method of a pigment dispersion for ink jet recording as a third embodiment of the present disclosure is not particularly limited as long as the aforementioned pigment dispersion B can be manufactured.

Hereinafter, an example of a preferable manufacturing method of the pigment dispersion B of the present disclosure will be described.

The manufacturing method of a pigment dispersion for ink jet recording as an embodiment of the present disclosure (hereinafter, referred to as "manufacturing method B of the present disclosure" as well) includes a step of mixing together an edible pigment, an edible dispersant, and water filling an airtight container under conditions that a vibration frequency is within a range of 50 Hz to 70 Hz and a vibration acceleration is within a range of 98 m/s$^2$ to 1,962 m/s$^2$ by vibrating the airtight container so as to obtain a mixture (hereinafter, referred to as "step X1" as well), a step of performing a first dispersion treatment on the mixture (hereinafter, referred to as "step X2" as well), a step of applying a hydrostatic pressure equal to or higher than 30 MPa to the mixture having undergone the first dispersion treatment (hereinafter, referred to as "step X3" as well), and a step of performing a second dispersion treatment on the mixture to which the hydrostatic pressure is applied (hereinafter, referred to as "step X4" as well).

In the related art, in the manufacturing method of an edible ink in which edible materials for printing letters or images directly on foods, pharmaceutical products, and the like that will be orally ingested are used, generally, a beads mill, a roll mill, a sand mill, a homogenizer, and the like have been used. For example, in JP2015-000968A, JP2009-149719A, and JP2015-140414A described above, a beads mill is used for manufacturing an edible ink. Considering that the edible ink is used for printing letters or images on foods, pharmaceutical products, and the like that will be orally ingested, it is desirable that the edible ink can reproduce a sufficient color density with a small amount of coating. In order to obtain an edible ink which can reproduce a sufficient color density with a smaller amount, an edible pigment needs to be dispersed at a high concentration in a liquid. However, generally, the raw material powder of an edible pigment has a large particle diameter, and an edible dispersant used for dispersing the edible pigment is not sufficiently adsorbed onto the surface of the edible pigment. Therefore, in a case where the concentration of the edible pigment in the edible ink is high, the edible pigment tends to be present as a large number of coarse particles. In a case where such an ink is used in an ink jet recording ink, the ink jetting properties deteriorate. Furthermore, in a case where an edible pigment is dispersed at a high concentration in a liquid, the dispersed edible pigment tends to be aggregated with the lapse of time.

In contrast, by combining specific dispersion methods, the manufacturing method B of the present disclosure makes it possible to easily manufacture the aforementioned pigment dispersion B which contains an edible pigment at a concentration higher than that in the related art, contains few coarse particles, results in excellent ink jetting properties in a case where the pigment dispersion B is used in an ink jet recording ink, and is suitable as an edible ink.

Hereinafter, each of the steps in the manufacturing method B of the present disclosure will be specifically described.

Specific examples and preferable aspects of the components used in each of the steps and are as described above regarding the pigment dispersion B. Therefore, the specific examples and the preferable aspects will not be described herein.

<Step X1>

The step X1 is a step of mixing together the edible pigment, the edible dispersant, and water filling an airtight container under conditions that a vibration frequency is within a range of 50 Hz to 70 Hz and a vibration acceleration is within a range of 98 m/s$^2$ to 1,962 m/s$^2$ by vibrating the airtight container so as to obtain a mixture. As described above, an operation of mixing together the contents of the airtight container by means of vibration under the conditions that a vibration frequency is within a range of 50 Hz to 70 Hz and a vibration acceleration is within a range of 98 m/s$^2$ to 1,962 m/s$^2$ will be referred to as "low frequency treatment" in some cases.

Details of the step X1 are the same as details of the step a2 in the manufacturing method A, and the matters described regarding the step a2 are also applied to the step X1.

The amount of the components mixing together in the step X1 can be set to be equivalent to the amount of the components contained in the aforementioned pigment dispersion B. From the viewpoint of further reducing the coarse particles in the pigment dispersion B, it is desirable that the edible dispersant is divided so as to be used in the step X1 and the step X3.

<Step X2>

The step X2 is a step of performing a first dispersion treatment on the mixture obtained by the step X1.

In the step X2, by performing the first dispersion treatment on the mixture obtained by the step X1 through the low frequency treatment, the edible pigment coated with the edible dispersant is disintegrated and dispersed.

Details of the step X2 are the same as details of the step a3 in the manufacturing method A, and the matters described regarding the step a3 of the manufacturing method A are also applied to the step X2 of the manufacturing method B.

<Step X3>

The step X3 is a step of applying a hydrostatic pressure equal to or higher than 30 MPa to the mixture having undergone the first dispersion treatment by the step X2.

As in the step (B) in the manufacturing method A, the operation of applying a hydrostatic pressure equal to or higher than 30 MPa in the step X3 will be referred to as "high pressure treatment" in some cases.

In the step X3, by applying a hydrostatic pressure equal to or higher than 30 MPa to the mixture having undergone the first dispersion treatment by the step X2, the edible dispersant is enforced to permeate the interior of particles (so-called coarse particles) formed by the aggregation of the edible pigment (including an edible pigment insufficiently coated with the edible dispersant), that is, the space between particles. The coarse particles having undergone the permeation of the edible dispersant to the interior thereof are disintegrated by a second dispersion treatment in a step X4 as the next step. As a result, edible pigment particles perfectly coated with the edible dispersant are formed.

In contrast, in a state where the edible dispersant has not permeated the interior of the coarse particles, even though the coarse particles are disintegrated in the step X4, the disintegrated fine particles are immediately reaggregated. Therefore, it is difficult to realize a pigment dispersion containing few coarse particles.

In the step X3, due to the application of a hydrostatic pressure equal to or higher than 30 MPa to the mixture having undergone the first dispersion treatment by the step X2, fine particles present in the mixture contact each other and are solidified, and hence the overall particle size tends to become uniform. In a case where the overall particle size is uniform, the stability of the dispersion becomes excellent.

Details of the step X3 are the same as details of the step B in the manufacturing method A, and the matters described regarding the step B of the manufacturing method A are also applied to the step X3 of the manufacturing method B.

In the step X3, from the viewpoint of further reducing the coarse particles, it is desirable that the high pressure treatment is performed after the edible dispersant is further added to the mixture having undergone the first dispersion treatment by the step X2.

<Step X4>

The step X4 is a step of performing a second dispersion treatment on the mixture to which the hydrostatic pressure is applied by the step X3.

In the step X4, by performing the second dispersion treatment on the mixture to which the hydrostatic pressure is applied by the step X3, the coarse particles having undergone the permeation of the edible dispersant to the interior thereof by the step X3 are disintegrated, and edible pigment particles perfectly coated with the edible dispersant are formed.

Details of the step X4 are the same as details of the step C in the manufacturing method A, and the matters described regarding the step C of the manufacturing method A are also applied to the step X4 of the manufacturing method B.

The dispersion conditions (for example, the conditions such as the dispersion apparatus, the dispersion media, the type of the dispersion container, the media diameter, the rotation speed of the dispersion container, and the dispersion time) of the first dispersion treatment in the step X2 may be the same as or different from and the dispersion conditions of the second dispersion treatment in the step X4.

<Other Steps>

If necessary, the manufacturing method B of the present disclosure may have other steps in addition to the step X1, the step X2, the step X3, and the step X4.

Examples of those other steps include a step of preparing an ink by using the pigment dispersion B of the present disclosure.

[Ink Composition for Ink Jet]

A fourth embodiment according to the present disclosure is an ink composition for an ink jet containing two or more kinds of edible pigments selected from black iron oxide, iron (III) oxide, yellow iron sesquioxide, and Food Blue No. 2 Aluminum Lake, an edible dispersant (hereinafter, referred to as specific dispersant in some cases) which contains at least one of an amino group or a quaternary ammonium group and coats at least a portion of the edible pigment, and water and has a pigment concentration of 3% by mass to 20% by mass, in which an average particle diameter of the edible pigment measured using a laser diffraction/scattering-type particle size distribution measurement apparatus and an optical path length variable cell is equal to or smaller than 500 nm.

The mechanism of action of the ink composition for an ink jet (hereinafter, simply referred to as "ink composition C" in some cases) is unclear but is assumed to be as below.

The ink composition C contains at least two kinds of edible pigments among edible pigments selected from iron (III) oxide, yellow iron sesquioxide, and Food Blue No. 2 Aluminum Lake.

As described above, it is difficult to improve the dispersibility of an edible pigment and to inhibit the occurrence of coarse particles. However, it is considered that even though the ink composition C of the present disclosure contains two or more kinds of different edible pigments, in a case where the ink composition C contains the dispersant (specific dispersant) which contains at least one of an amino group or a quaternary ammonium group and coats at least a portion of the edible pigment, the dispersibility of two or more kinds of the pigments having different physical properties in the ink composition C may become excellent, and the deterioration of the dispersibility with the lapse of time resulting from the aggregation of the pigments and the generation of coarse particles resulting from the aggregation of the pigments may be inhibited.

Accordingly, in the ink composition C, even though the pigment concentration is 3% by mass to 20% by mass, the average particle diameter of the pigments contained in the ink composition that is measured using a laser diffraction/scattering-type particle size distribution measurement apparatus, specifically, for example, a laser diffraction/scattering-type particle size distribution measurement apparatus, LA-960 (manufactured by HORIBA, Ltd.) and an optical path length variable cell is kept to be equal to or smaller than 500 nm.

In the related art, for an ink composition with a high pigment content, in order to measure the particle diameter of the pigment, generally, the ink composition is diluted and fills a cell for measurement, and it is difficult to measure the particle size distribution without diluting the ink composition containing the pigment. However, the inventors of the present invention found a method for measuring the particle size distribution without dilution and measured the ink composition C of the present disclosure. As a result, the inventors confirmed that coarse particles resulting from flocculation or the like are not observed in the undiluted solution of the ink composition. That is, it was confirmed that even though the ink composition C of the present disclosure contains two or more kinds of edible pigments and is in a state of an undiluted solution containing the pigments at a high concentration, flocculation does not occur. The measurement method of the average particle diameter will be described later.

Hereinafter, each of the components contained in the ink composition for an ink jet (ink composition C) as an embodiment of the present invention will be specifically described.

—Two or More Kinds of Edible Pigments Selected from Black Iron Oxide, Iron (iii) Oxide, Yellow Iron Sesquioxide, and Food Blue No. 2 Aluminum Lake—

The ink composition C of the present disclosure contains, as materials to be dispersed, two or more kinds of edible pigments selected from black iron oxide, iron (III) oxide, yellow iron sesquioxide, and Food Blue No. 2 Aluminum Lake. Hereinafter, the edible pigments selected from black iron oxide, iron (III) oxide, yellow iron sesquioxide, and Food Blue No. 2 Aluminum Lake will be collectively referred to as "specific edible pigments" in some cases.

Furthermore, hereinafter, regarding the four kinds of pigments included in the specific edible pigments, the black iron oxide will be referred to as "edible black iron oxide pigment" or simply referred to as "black iron oxide pigment", the iron sesquioxide will be referred to as "edible iron sesquioxide pigment" or simply referred to as "iron sesquioxide pigment", the yellow iron sesquioxide will be referred to as "edible yellow iron sesquioxide pigment" or simply referred to as "yellow iron sesquioxide pigment", and the Food Blue No. 2 Aluminum Lake will be referred to as "edible Blue No. 2 Lake pigment" or simply referred to as "Blue No. 2 Lake pigment".

In a case where the ink composition C contains two or more kinds of specific edible pigments, the range of choice of color of the ink composition C widens, and hence the ink composition C becomes an ink composition having better color and appearance.

The specific edible pigments in the present disclosure will be described.

(Edible Black Iron Oxide Pigment)

The edible black iron oxide pigment (IUPAC name: iron (II.III) oxide, $Fe_3O_4$) is an oxide of iron appearing black in a state of dry powder, and preferably contains iron (II.III) oxide ($Fe_3O_4$) as a main component. The black iron oxide pigment can have a plurality of compositions. Therefore, in the present specification, "main component" means that the proportion of $Fe_3O_4$ in the total amount of the iron oxide is equal to or higher than 50% by mass. Particularly, the proportion of $Fe_3O_4$ in the total amount of the iron oxide is preferably equal to or higher than 80% by mass, more preferably equal to or higher than 90% by mass, and particularly preferably equal to or higher than 95% by mass. As the black iron oxide pigment, black iron oxide commercially available as pharmaceutical products may be used. Examples of the commercial products include black iron oxide (trade name, shape: powder shape, use: pharmaceutical grade, standard: Japanese Pharmaceutical Excipients, KISHI KASEI CO., LTD.).

(Edible Iron Sesquioxide Pigment)

The edible iron sesquioxide pigment (IUPAC name: iron (III) oxide, $Fe_2O_3$) is a reddish brown pigment which is a main component of red iron ore as a natural mineral and known as red oxide by another name. This pigment is approved as a pharmaceutical additive, and examples of commercial products thereof include iron sesquioxide (trade name, shape: powder shape, use: pharmaceutical grade, standard: Japanese Pharmaceutical Excipients, KISHI KASEI CO., LTD.).

(Edible Yellow Iron Sesquioxide Pigment)

The edible yellow iron sesquioxide pigment (IUPAC name: iron (III) oxide•monohydrate, $Fe_2O_3.H_2O$) is a yellowish brown pigment which is a main component of red iron ore as a natural mineral. This pigment is approved as a pharmaceutical additive, and examples of commercial products thereof include KISHI yellow iron sesquioxide (trade name, shape: powder shape, average particle diameter: 0.3 µm, maximum diameter: 0.7 µm, use: pharmaceutical grade, standard: Japanese Pharmaceutical Excipients, KISHI KASEI CO., LTD.), and the like.

(Edible Blue No. 2 Lake Pigment)

The edible Blue No. 2 Lake pigment is an insoluble pigment obtained by reacting Blue No. 2 as a food coloring with an aluminum salt, and is referred to as indigo carmine aluminum lake as well. This pigment is approved as a food additive, and examples of commercial products thereof include Blue No. 2 AL Lake (trade name, shape: powder shape, use: food additive, DaiwaKasei Co., Ltd.), and the like.

The ink composition C contains two or more kinds of pigments among the aforementioned specific edible pigments.

Two or more kinds of the specific edible pigments are randomly combined. For example, by combining the black iron oxide pigment with another pigment, it is possible to make the color of the black pigment look more beautiful. Furthermore, by combining two or more kinds of specific edible pigments having different colors, it is possible to adjust the color to be a desired color.

Hereinafter, examples of the combination of preferable edible pigments will be described, but the combination is not limited to the following examples.

The ink composition C can contain, as edible pigments, at least one kind of pigment between an iron sesquioxide pigment and a black iron oxide pigment and a Blue No. 2 Lake pigment, for example.

In a case where the ink composition C contains at least one kind of pigment between an iron sesquioxide pigment and a black iron oxide pigment and a Blue No. 2 Lake pigment, regarding the content ratio between the pigments, provided that the total content of the iron sesquioxide pigment and the black iron oxide pigment is A and the content of the Blue No. 2 Lake pigment is B, A/B is preferably within a range of 2/3 to 1/10 from the viewpoint of making it possible to reproduce black that looks beautiful to human sight, more preferably within a range of 2/5 to 1/8, and even more preferably within a range of 2/7 to 1/6.

Furthermore, the ink composition C can contain, as edible pigments, a yellow iron sesquioxide pigment and a Blue No. 2 Lake pigment, for example.

In a case where the ink composition C contains the yellow iron sesquioxide pigment and the Blue No. 2 Lake pigment, regarding content ratio between the pigments, provided that the content of the yellow iron sesquioxide pigment is C and the content of the Blue No. 2 Lake pigment is B, C/B is preferably within a range of 2/3 to 1/5 from the viewpoint of making it possible to reproduce green that looks beautiful to human sight, more preferably within a range of 2/3.5 to 1/4, and even more preferably within a range of 1/2 to 1/3.

In addition, the ink composition can contain, as edible pigments, an iron sesquioxide pigment, and a yellow iron sesquioxide pigment, for example.

In a case where the ink composition C contains the iron sesquioxide pigment and the yellow iron sesquioxide pigment, regarding the content ratio between the pigments, provided that the content of the iron sesquioxide pigment is D and the content of the yellow iron sesquioxide pigment is C, D/C is preferably within a range of 1/2 to 1/5 from the viewpoint of making it possible to reproduce orange that looks beautiful to human sight, more preferably within a range of 1/2.5 to 1/4.5, and even more preferably within a range of 1/3 to 1/4.

(Other Edible Pigments)

As long as the effects are not impaired, the ink composition C can contain other edible pigments in addition to the aforementioned specific edible pigments.

Those other edible pigments that the ink composition C can contain are not particularly limited, and examples thereof include pigments known as food additives and orally administrable pigments known as pharmaceutical additives. These can be appropriately selected and used according to the purpose thereof.

"Food additives" mentioned herein refer to the food additives described in "Japan's Specifications and Standards for Food Additives, 8th Edition" as described above.

Examples of those other edible pigments include edible pigments such as red iron oxide, Food Red No. 2 Aluminum (AL) Lake, Food Red No. 3 Aluminum Lake, Food Red No. 40 Aluminum Lake, Food Yellow No. 4 Aluminum Lake, Food Yellow No. 5 Aluminum Lake, Food Green No. 3 Aluminum Lake, Food Blue No. 1 Aluminum Lake, titanium oxide, bamboo charcoal, and white charcoal.

Examples of commercial products of the edible pigments include edible pigments such as Red No. 3 AL Lake (DaiwaKasei Co., Ltd., food additive) and titanium oxide (Wako Pure Chemical Industries, Ltd., pharmaceutical grade).

(Average Particle Diameter of Specific Edible Pigments)

The average particle diameter of the specific edible pigments, which are contained in the ink composition C as materials to be dispersed, measured using a laser diffraction/scattering-type particle size distribution measurement apparatus and an optical path length variable cell is equal to or smaller than 500 nm.

The average particle diameter can be measured using a laser diffraction/scattering-type particle size distribution measurement apparatus LA-960 (trade name: HORIBA, Ltd.) and an optical path length variable cell (manufactured by HORIBA, Ltd.).

The average particle diameter of the specific edible pigments contained in the ink composition C is preferably equal to or smaller than 200 nm, more preferably within a range of equal to or greater than 50 nm and equal to or smaller than 170 nm, and even more preferably within a range of equal to or greater than 70 nm and equal to or smaller than 150 nm.

In a case where the average particle diameter of the specific edible pigments contained in the ink composition C is within the above range, the obtained ink composition is excellent in the dispersibility of the pigments, does not contain coarse particles, and has excellent jetting properties.

Furthermore, the particle diameter can be selected for the purpose of making the color of the specific edible pigments fall into a desired range.

For example, from the viewpoint of making the color of the black iron oxide pigment become close to black, the particle diameter can be set to within a range of equal to or greater than 200 nm and equal to or smaller than 400 nm, and is preferably within a range of equal to or greater than 250 nm and equal to or smaller than 350 nm.

At the time when the particle diameter of the specific edible pigments is measured by the aforementioned method, the content of coarse particles having a particle diameter equal to or greater than 500 nm with respect to the total amount (total content) of the specific edible pigments contained in the ink composition C is preferably less than 1 frequency. This is because in a case where the ink composition C, in which the average particle diameter is equal to or smaller than 500 nm and preferably 200 nm and the content of coarse particles in the ink composition C is less than 1 frequency, is used in an ink jet recording method, a jetting defect resulting from the existence of coarse particles is inhibited, and excellent jetting properties are maintained.

As the method for reducing the content of coarse particles, a method is exemplified in which vibration is applied to the specific dispersant, the specific edible pigments, and water at the time of manufacturing the ink composition as will be described later so as to prepare a mixture in advance and then a dispersion treatment is performed. According to this method, at least a portion of the surface of the specific edible pigment particles can be strongly coated with the specific dispersant, and the generation of coarse particles resulting from the reaggregation of fine pigment particles can be effectively inhibited.

The average particle diameter of the specific edible pigments is an average particle diameter of the specific edible pigments contained in the ink composition C, and refers to a particle diameter of the specific edible pigments in a state where a dispersant, which will be described later, adheres to at least a portion of the surface of the specific edible pigments.

(Measurement Method of Average Particle Diameter of Specific Edible Pigments)

As the average particle diameter of the specific edible pigments in the ink composition C, a value measured using a laser diffraction/scattering-type particle size distribution measurement apparatus and an optical path length variable cell is used.

In the related art, for an ink composition having a pigment concentration equal to or higher than 3% by mass, it is difficult to measure the particle size distribution thereof without diluting the ink composition. Therefore, by using an optical path length variable cell having a specific structure in combination, the inventors of the present invention have made it possible to measure the particle size distribution of the undiluted solution of the ink composition without diluting the ink composition having a high pigment concentration.

As described above, the optical path length variable cell is a cell which can appropriately adjust an optical path length of a sample solution by using a spacer and is developed by the inventors of the present invention. In a case where the optical path length variable cell is used, even though the ink composition having a high pigment concentration is not diluted, by adjusting the optical path length to be short, it is possible to obtain transmitted laser light in the cell with sufficient intensity and to accurately measure the particle size distribution.

In addition to the use of the optical path length variable cell, the use of a known laser diffraction/scattering-type particle size distribution measurement apparatus makes it possible to measure an average particle diameter and a particle size distribution of the specific edible pigments contained in the ink composition C. As the laser diffraction/scattering-type particle size distribution measurement apparatus, for example, Partica LA-960 (trade name) from HORIBA, Ltd. is used.

[Optical Path Length Variable Cell]

The constitution of the optical path length variable cell of the present disclosure and the measurement performed using the optical path length variable cell are as schematically described above with reference to drawings (FIG. 1 to FIG. 3).

In the ink composition C of the present disclosure, the specific edible pigments are dispersed by being mixed with the specific dispersant. Accordingly, the specific edible pigments are present by being dispersed in the pigment dispersion in a state where at least a portion of the surface of the edible pigments is coated with the specific dispersant.

Therefore, the fact that the average particle diameter of the specific edible pigments measured by the aforementioned measurement method is equal to or smaller than 500 nm shows that the specific dispersant in a quantity necessary for dispersing the specific edible pigments perfectly coats the surface of the specific edible pigments, the dispersibility of the specific edible pigments is excellent, and the generation of coarse particles of the specific edible pigments is inhibited.

The ink composition C may contain only two kinds of specific edible pigments or three or more kinds of specific edible pigments.

The content rate of the specific edible pigments in the ink composition C, that is, the total content rate of two or more kinds of the specific edible pigments contained in the ink composition C is 3% by mass to 20% by mass, preferably 3.5% by mass to 15% by mass, and more preferably 4% by mass to 10% by mass.

In a case where the content rate of the specific edible pigments is within the above range, at the time of forming an image by using the ink composition C, it is easy to obtain an image having an appropriate coloring density. Furthermore, the ink composition exhibits excellent jetting properties in a case where the ink composition is used in an ink jet recording method.

—Dispersant (Specific Dispersant) Containing at Least One of Amino Group or Quaternary Ammonium Group and Coats at Least Portion of Pigment—

As the dispersant used for dispersing the specific edible pigments, a dispersant having at least one of an amino group or a quaternary ammonium group is used. By coating at least a portion of the specific edible pigments described above, the dispersant contributes to the stable dispersion of the specific edible pigments in the ink composition C.

The specific dispersant is used in the orally administrable ink composition. Therefore, it is preferable to use at least one kind of dispersant selected from dispersants which can be orally administered as pharmaceutical additives.

Examples of the dispersants which can be orally administered as pharmaceutical additives include the dispersants described as orally administrable dispersants in "Dictionary of Pharmaceutical Additives 2007 (editor: IPEC JAPAN, $1^{st}$ printing issued on Jul. 25, 2007)", "Dictionary of Pharmaceutical Additives 2016 (editor: IPEC JAPAN, $1^{st}$ printing issued in February, 2016)", and the like.

Hereinafter, the specific edible pigments contained in the ink composition C will be described.

At least a portion of the surface of the specific edible pigments contained in the ink composition C is coated with the dispersant having at least one of an amino group or a quaternary ammonium group. As a result, the dispersion stability of the specific edible pigments becomes excellent, and jetting properties of the ink composition become excellent. This effect becomes more marked in a case where the specific edible pigments are lake pigments containing metal oxide particles or a metal.

It is considered that this is because the amino group and the quaternary ammonium group that the specific dispersant has electrostatically interact with the specific edible pigments or interact with a functional group contained in a metal oxide or a metal chelate by forming a hydrogen bond, and hence the specific dispersant may be easily adsorbed onto the surface of the specific edible pigments.

Particularly, it is considered that the quaternary ammonium group may have a strong adsorption force due to the electrostatic interaction with the surface of the metal oxide particles, a charge repulsion action may be performed between the particles of the specific edible pigments in which at least a portion of the surface thereof is coated with the specific dispersant having the quaternary ammonium group, and hence the dispersion stabilizing effect may be further improved. This effect becomes more marked in a case where iron oxide particles are used as the specific edible pigments.

As the specific dispersant, a compound appropriate for dispersing the specific edible pigments may be selected from dispersants having at least one of an amino group or a quaternary ammonium group. In the present specification, as the specific dispersant, not only the compounds known as general dispersants, but also polymer compounds used as, for example, coating agents for pharmaceutical products can be appropriately selected and used.

The amino group that the specific dispersant can contain means monovalent functional groups obtained in a case where one hydrogen atom is removed from ammonia, a primary amine, or a secondary amine. Any of these functional groups may be used.

The quaternary ammonium group that the specific dispersant can contain is preferably a quaternary ammonium cation or a quaternary ammonium salt.

The specific dispersant may be a copolymer of a plurality of monomers. That is, it is possible to use a copolymer of a monomer having at least one of an amino group or a quaternary ammonium group and a monomer containing none of the amino group and the quaternary ammonium group. In this case, examples of the monomer, which is a component of copolymerization and contains none of the amino group and the quaternary ammonium group, include a (meth)acrylic acid ester and the like. The specific dispersant may be a copolymer containing these monomers as components of copolymerization.

Specific examples of the monomers which can be contained in the specific dispersant will be shown below, but the specific dispersant is not limited to the following description.

Examples of the monomer having at least one of an amino group or a quaternary ammonium group include a salt of trimethylammonium ethyl acrylate or trimethylammonium ethyl methacrylate, a salt of triethylammonium ethyl acrylate or triethylammonium ethyl methacrylate, dimethylaminoethyl methacrylate, and the like.

Examples of the monomer containing none of the amino group and the quaternary ammonium group include a (meth)acrylic acid alkyl ester such as methyl (meth)acrylate, ethyl (meth)acrylate, n-propyl (meth)acrylate, or n-butyl (meth)acrylate, and the like.

Examples of the polymer dispersant having an amino group include an aminoalkyl methacrylate copolymer, gelatin, and the like.

As the aminoalkyl methacrylate copolymer, commercial products can be used. Examples of the commercial products include EUDRAGIT (registered trademark) E100 and EUDRAGIT EPO (methyl methacrylate/butyl methacrylate/dimethylaminoethyl methacrylate copolymers) from Evonik Nutrition & Care GmbH, and the like.

Examples of the gelatin include acid-treated gelatin, alkali-treated gelatin, and the like. As gelatin which can be used for dispersing particles, the alkali-treated gelatin is preferable. As the alkali-treated gelatin, commercial products may be used. Examples of the commercial products include alkali-treated gelatin from Nitta Gelatin Inc., and the like.

As the polymer dispersant having a quaternary ammonium group, a (meth)acrylic copolymer containing a quaternary ammonium group is preferable, and an alkyl (meth)acrylate copolymer containing a quaternary ammonium group (ammonioalkyl (meth)acrylate copolymer) is more preferable.

As the alkyl (meth)acrylate copolymer containing a quaternary ammonium group (ammonioalkyl (meth)acrylate copolymer), a copolymer is suitable which contains at least a structural unit derived from a (meth)acrylic acid alkyl ester and a structural unit derived from a (meth)acrylic acid alkyl ammonium salt, and a copolymer is more preferable which contains a structural unit derived from at least one monomer selected from methyl (meth)acrylate or ethyl (meth)acrylate and a structural unit derived from trimethylammonium ethyl (meth)acrylate chloride.

Specific examples of the alkyl (meth)acrylate copolymer containing a quaternary ammonium group include an ethyl acrylate/methyl methacrylate/trimethylammonium ethyl methacrylate chloride copolymer, and the like.

As the polymer dispersant having a quaternary ammonium group, commercial products may be used. Examples of the commercial products include EUDRAGIT (registered trademark) RLPO, EUDRAGIT RSPO, EUDRAGIT RL100, EUDRAGIT RL30D, EUDRAGIT RS100, and EUDRAGIT RS30D from Evonik Japan, and the like.

Among the polymer dispersants having a quaternary ammonium group, an ethyl acrylate/methyl methacrylate/trimethylammonium ethyl methacrylate chloride copolymer is particularly preferable.

It is preferable that the specific dispersant stays solid at ordinary temperature (25° C.), and the solubility thereof in 100 g of water at 40° C. is preferably equal to or lower than 3 g. At the time of performing the dispersion treatment on the particles, the specific dispersant is adsorbed onto the surface of the particles, and as a result, the dispersibility and the dispersion stability of the particles are obtained. In a case where the solubility of the specific dispersant in water is low, in the dispersion medium, it is easy to inhibit the specific dispersant from being dissociated from the particles and liberated to the dispersion medium containing water. Therefore, the dispersed particles are hardly reaggregated, and the dispersion stability is further improved. Although it is preferable that the solubility of the specific dispersant in water is low, the specific dispersant may be water-swellable and swell in water.

The ink composition C may contain only one kind of specific dispersant or two or more kinds of specific dispersants. Furthermore, in a case where two or more kinds of different specific edible pigments are dispersed, a mixture of two or more kinds of the different specific edible pigments may be dispersed using the specific dispersant so as to prepare a dispersion, or dispersions containing one kind of specific edible pigment may be prepared in advance and then incorporated into the ink composition C.

Particularly, from the viewpoint of dispersion stability at the time of long-term storage, it is preferable that two or more kinds of pigments contained in the ink composition C are dispersed using the same dispersant.

Herein, "two or more kinds of pigments are dispersed using the same dispersant" means that the dispersants used for dispersing two kinds of specific edible pigments are the "same" as each other.

The content rate of the specific dispersant in the ink composition C with respect to the total amount of the ink composition is preferably equal to or higher than 0.1% by mass and equal to or lower than 5% by mass, more preferably equal to or higher than 0.5% by mass and equal to or lower than 3% by mass, and even more preferably equal to or higher than 0.5% by mass and less than 2% by mass.

Within the aforementioned preferable range of content rate, regarding the content ratio between the specific edible pigments and the specific dispersant, provided that the content of the particles is E and the content of the dispersant is F, it is preferable that the content of the dispersant with respect to the content of the particles (F/E: mass ratio) is within a range satisfying Expression 1.

$$0.05 < F/E < 1.12 \qquad \text{Expression 1}$$

—Water—

The ink composition C contains water as a dispersion medium.

It is preferable that the ink composition C contains water because then the biocompatibility of the ink composition C is further improved, and the ink composition C becomes suitable to eat. As water, deionized water, pure water, ultrapure water, and the like can be used because these contain few impurities. Water is not limited to these as long as the purity thereof is equivalent to that of deionized water.

The content of water is not particularly limited. However, from the viewpoint of further improving the storage stability of the ink composition C, the content of water with respect to the total mass of the ink composition is preferably equal to or greater than 15% by mass and equal to or smaller than 88% by mass, more preferably equal to or greater than 20% by mass and equal to or smaller than 75% by mass, and even more preferably equal to or greater than 25% by mass and equal to or smaller than 55% by mass.

—Other Dispersion Media—

In view of further improving the moisture retaining properties of the ink composition, it is preferable that the ink composition C contains a high-boiling-point organic solvent.

Examples of the high-boiling-point organic solvent include an organic solvent having a boiling point equal to or higher than 150° C. Examples of the high-boiling-point solvent include glycerin, propylene glycol, dipropylene glycol monomethyl ether, and the like. Among these, edible alcohols such as propylene glycol and glycerin are preferable because these alcohols are suitable to eat.

In a case where the ink composition C contains the high-boiling-point organic solvent, the content rate of the high-boiling-point organic solvent with respect to the total mass of the ink composition C is preferably equal to or higher than 0.5% by mass and equal to or lower than 40% by mass, and more preferably equal to or higher than 5% by mass and equal to or lower than 20% by mass.

The ink composition C may contain only one kind of high-boiling-point solvent or two or more kinds of high-boiling-point solvents.

In the ink composition C containing water, the high-boiling-point solvent, and the like, the total content rate of the dispersion medium with respect to the total mass of the ink composition C is preferably equal to or higher than 16% by mass and equal to or lower than 89% by mass, more preferably equal to or higher than 8% by mass and equal to or lower than 50% by mass, and even more preferably equal to or higher than 10% by mass and equal to or lower than 30% by mass.

As long as the effects are not impaired, the ink composition C can contain various additives (hereinafter, referred to as other components in some cases) according to the purpose, in addition to the specific edible pigments, the specific dispersant, and the dispersion medium containing water.

Examples of those other components include a coloring material other than the specific edible pigments, a polymer component and a surfactant other than the specific dispersant, a chelating agent, a fungicide, an emulsion stabilizer, an antifading agent, an ultraviolet absorber, a preservative, a pH adjuster, a surface tension adjuster, an antifoaming agent, a viscosity adjuster, a dispersion stabilizer, and the like.

In a case where the ink composition is used for printing performed on a component to be orally administered, it is preferable that those other components are also selected from orally administrable compounds.

The coloring materials other than the specific edible pigments described above and other edible pigments described above that can be optionally incorporated into the ink composition are not particularly limited, and can be appropriately selected from synthetic food colorings and natural food colorings known in the related art. In order to make the ink composition orally administrable, edible coloring materials may be used.

As the synthetic food colorings and the natural food colorings which are coloring materials other than particles, among the coloring materials described in paragraphs [0013] and [0014] in JP2015-003883A, coloring materials which are not included in the specific edible pigments can be appropriately selected and used.

The polymer component other than the specific dispersant that the ink composition C can contain is not particularly limited.

As the polymer component, a natural resin is preferable. In order to make the ink composition orally administrable, as the polymer component, an edible polymer component may be selected. Examples of the natural resin include palms and the like. Examples of other resin components include hydroxypropyl cellulose, methyl cellulose, polyethylene glycol, beet saponin silanol, and the like. The polymer component other than the dispersant can be used, for example, for adjusting the viscosity of the ink composition.

In a case where the polymer component other than the specific dispersant is added, the content rate of the polymer component with respect to the total mass of the ink composition is preferably equal to or higher than 0.3% by mass and equal to or lower than 15% by mass.

The surfactant other than the specific dispersant can be used for adjusting the surface tension of the ink composition C to be within an appropriate range, and is useful for further improving the jetting properties of the ink composition C at the time of jetting the ink composition C by an ink jet method.

Examples of the surfactant other than the dispersant include succinic acid monoglyceride, soybean saponin, erythritol, a polyglycerin fatty acid ester, Quillaja saponin, barium chloride hydrate, a propylene glycol fatty acid ester, lecithin, enzyme-treated lecithin, a glycerin fatty acid ester, organic acid monoglyceride, a sucrose fatty acid ester, a sorbitan fatty acid ester, and the like.

Examples of the sorbitan fatty acid ester include polysorbates (polyoxyethylene ether of a sorbitan fatty acid ester) in which approximately 20 ethylene oxide molecules are condensed with a sorbitan fatty acid ester. Examples of the polysorbates of different fatty acids include polysorbate 20 (lauric acid ester), polysorbate 60 (stearic acid ester), polysorbate 80 (oleic acid ester), polysorbate 65 (stearic acid ester), and the like.

In a case where the surfactant is added, the content rate of the surfactant with respect to the total mass of the ink composition C is preferably equal to or higher than 0.01% by mass and equal to or lower than 3.0% by mass.

In a case where the ink composition C is used as eatables, the ink composition C may further contain the following edible additives.

Examples of the edible additives that the ink composition C may contain include a flavonoid compound, propylene glycol laurate, polyvinyl, a rosemary compound, propylene glycol dioleate, a glycerin diacetic acid ester, disodium hydrogen phosphate, stearyl monoglyceridyl, a citric acid ester, a tetrasodium pyrophosphate, AEROSIL (registered trademark: manufactured by Evonik Industries, fumed silica particles), sodium polyphosphate, guar gum, amylopectin, pectin, Kumarindo gum, xanthan gum, potassium metaphosphate, enzyme-treated soybean saponin, animal sterol, sodium carboxymethyl cellulose, citric acid, and the like.

These additives may be used singly, or two or more kinds of these additives may be used in combination.

The pH (25° C.) of the ink composition C is not particularly limited. However, from the viewpoint of further improving the dispersion stability of the particles, the pH is preferably equal to or lower than 9 and more preferably equal to or lower than 7, and preferably equal to or higher than 4 and more preferably equal to or higher than 5.

The pH of the ink composition C is a value measured by the measurement method described above.

<Manufacturing Method of Ink Composition C>

The manufacturing method of the ink composition C is not particularly limited. However, it is preferable that the ink composition C is manufactured by a manufacturing method of an ink composition (hereinafter, referred to as "manufacturing method C" as well) as a fifth embodiment of the present disclosure described below.

The manufacturing method C of the present disclosure is a manufacturing method of an ink composition for an ink jet, including a step of filling an airtight container with two or more kinds of edible pigments selected from an edible black iron oxide pigment, an edible iron sesquioxide pigment, an edible yellow iron sesquioxide pigment, and an edible Blue No. 2 Lake pigment, a dispersant which contains at least one of an amino group or a quaternary ammonium group and coats at least a portion of the pigments, and water and mixing together these components while vibrating the airtight container so as to obtain a mixture (hereinafter, referred to as "step (Y1)" as well) and a step of grinding at least a portion of the pigments contained in the obtained mixture and dispersing the pigments so as to obtain an ink composition (hereinafter, referred to as "step (Y2)" as well), in which the total mass of the pigments filling the airtight container with respect to the total mass of the materials filling the airtight container is 3% by mass to 20% by mass.

Hereinafter, the manufacturing method C of the ink composition of the present disclosure will be described in order of the steps.

—Step (Y1)—

In the step (Y1), an airtight container is filled with specific edible pigments, a specific dispersant, and water, these components are mixed together while the airtight container is being vibrated, thereby obtaining a mixture.

The total mass of two or more kinds of the specific edible pigments filling the airtight container with respect to the total mass of substances filling the airtight container is 3% by mass to 60% by mass, preferably 5% by mass to 50% by mass, and more preferably 10% by mass to 40% by mass.

In the step (Y1), at the time of filling the airtight container with the specific edible pigments, the specific dispersant, and water, the total mass of the specific edible pigments and the specific dispersant filling the airtight container with respect to the total mass of the substances filling the airtight container is preferably 4% by mass to 90% by mass, more preferably 6% by mass to 75% by mass, and even more preferably 12% by mass to 60% by mass.

In a case where the total content of the specific edible pigments and the specific dispersant in the airtight container is within the above range, the balance between solids and a liquid in the airtight container becomes excellent. Therefore, at the time of preparing a mixture which is not yet subjected to a dispersion treatment, the specific edible pigments and the specific dispersant are thoroughly mixed together and come into close contact with each other. As a result, in the following dispersion treatment, the specific dispersant in the vicinity of the specific edible pigments are easily adsorbed onto the surface of the specific edible pigments, and the dispersibility and the dispersion stability of the pigments in the obtained ink composition are further improved. Accordingly, it is possible to obtain an ink composition having excellent jetting properties.

Vibration is applied to the airtight container filled with the specific edible pigments, the specific dispersant, and water such that the substances filling the airtight container are mixed together. In this way, a mixture is prepared.

Details of each of the components filling the airtight container are as described above regarding the aforementioned ink composition C.

The airtight container used in the step Y1 is the same as the airtight container used in the step a2 in the aforementioned manufacturing method A. The matters described regarding the airtight container in the process of the step a2 in the manufacturing method A are also applied to the step Y1.

As described above, in the step (Y1), provided that the amount of the specific edible pigments filling the airtight container is E and the amount of the dispersant is F, it is preferable that the amount of the dispersant with respect to the amount of the specific edible pigments (F/E: mass ratio) satisfies Expression 1.

$$0.05 < F/E < 1.12 \qquad \text{Expression 1}$$

The content F of the specific dispersant contained in the ink composition C refers to the total amount of the specific dispersant, which coats the specific edible pigments, and the specific dispersant, which is free in the dispersion medium without being adsorbed onto the specific edible pigments, in the ink composition.

In a case where F/E in Expression 1 is equal to or higher than 0.05, the amount of the specific dispersant with respect to the amount of the specific edible pigments which are solid contents falls into an appropriate range. Therefore, at the time of performing a dispersion treatment on the prepared mixture, the dispersibility is further improved. The higher the mass ratio of the specific dispersant, the easier it is to reduce the particle diameter of the specific edible pigments dispersed, but the pigments tend not to be easily dispersed. Accordingly, it is preferable to keep F/E equal to or lower than 1.12. In this range, it is easy to disperse the pigments, and a mixture is prepared which makes the obtained ink composition exhibit further improved temporal stability of the dispersibility.

For the same reason as described above, F/E is more preferably within a range satisfying Expression 2, and even more preferably within a range satisfying Expression 3.

$$0.1 \leq F/E \leq 1 \qquad \text{Expression 2}$$

$$0.1 \leq F/E \leq 0.7 \qquad \text{Expression 3}$$

The order of putting the components into the container is not particularly limited. From the viewpoint of making it possible for the specific edible pigments and the specific dispersant to contact each other under better conditions, it is preferable to put the specific edible pigments first into the container, then put the specific dispersant into the container, and finally put water as a dispersion medium into the container.

In the step (Y1), the airtight container filled with the specific edible pigments, the specific dispersant, water, and other components that are incorporated as desired is vibrated, thereby preparing the mixture of the contents. In a case where the airtight container filled with the components are vibrated at a low frequency and a high acceleration prior to the dispersion treatment, the specific edible pigments and the dispersant are homogeneously mixed together in the airtight container. Furthermore, it is considered that by applying vibration such that the specific edible pigments and the dispersant come into closer contact with each other at a high frequency, the specific edible pigments in the obtained mixture may sufficiently contact the dispersant, and hence the dispersibility may be further improved.

At the time of vibrating the airtight container in the step (Y1), a frequency of the vibration applied to the airtight container is 30 Hz to 90 Hz, preferably 40 Hz to 80 Hz, and more preferably 50 Hz to 70 Hz.

Generally, in the case of mixing performed by the application of ultrasonic waves, the frequency is at least equal to or higher than 5 kHz and usually about 20 kHz. In the manufacturing method C of the present disclosure, by applying vibration at a lower frequency, the specific edible pigments are inhibited from being damaged by the application of vibration.

It is preferable that the frequency is equal to or higher than 30 Hz, because then the mixing is sufficiently performed. Furthermore, it is preferable that the frequency is equal to or lower than 90 Hz, because then marked heat production at the time of treatment is inhibited.

In the step (Y1), a vibration acceleration is equal to or higher than 98 m/s$^2$ and equal to or lower than 1,962 m/s$^2$, preferably equal to or higher than 294 m/s$^2$, more preferably equal to or higher than 490 m/s$^2$, and even more preferably equal to or higher than 784 m/s$^2$.

In the step (Y1), the acceleration is equal to or lower than 1,962 m/s$^2$, preferably equal to or lower than 1,471.0 m/s$^2$, and more preferably equal to or lower than 980.7 m/s$^2$.

It is preferable that the acceleration is equal to or higher than 98 m/s$^2$, because then mixing is excellently performed.

Furthermore, from the viewpoint of further improving the dispersibility of the specific edible pigments in the obtained ink composition C, the acceleration is preferably 294 m/s$^2$ to 1,471.0 m/s$^2$, more preferably 490 m/s$^2$ to 980.7 m/s$^2$, and even more preferably 784 m/s$^2$ to 980.7 m/s$^2$.

In the step (Y1), it is preferable to appropriately examine and adjust the conditions such as the frequency and the acceleration described above and a treatment time which will be described later according to the size, the specific gravity, and the hardness of the specific edible pigments to be used, the content of the specific dispersant, the content ratio (F/E: mass ratio) between the specific edible pigments and the dispersant.

For example, in a case where the pigments as materials to be dispersed are pigments which are damaged by impact and undergo the impairment of the high functionality thereof, it is preferable to set the acceleration to be within a range of 294 m/s$^2$ to 784 m/s$^2$. Furthermore, in a case where an aluminum (AL) lake pigment and the like which are more easily crushed are used as materials to be dispersed, because the particle diameter of the particles is originally micrometer-sized, it is preferable to additionally perform an operation of reducing the content (concentration) of the specific edible pigments filling the airtight container. In a case where the content is adjusted as described above, it is possible to inhibit the occurrence of an undesirable phenomenon such as hyperdispersion in the next treatment of dispersing the specific edible pigments.

In the step (Y1), the time for which the airtight container is vibrated is preferably 10 seconds to 5 minutes, more preferably 1 minute to 4 minutes, and even more preferably 2 minutes to 3 minutes.

Furthermore, regarding the temperature condition in the step (Y1), considering the temperature before the initiation of treatment (room temperature, more specifically, 23° C. to 28° C.), the temperature after the treatment is preferably lower than 40° C. In a case where the vibration treatment is performed under the aforementioned preferable temperature condition, it is also possible to inhibit the contents from being altered by heat.

As described above, in the step (Y1), the specific edible pigments, the specific dispersant, water, and other components that are incorporated as desired fill the airtight container and subjected to the vibration treatment under specific conditions. In this way, a homogeneous mixture containing the above components is obtained.

Those other components incorporated as desired may be incorporated at any time. Those other components may be incorporated during the step (Y1), the step (Y2) which will be described later, or after the step (Y2).

—Step (Y2)—

The mixture, which is obtained as described above in the step (Y1) and contains at least the specific edible pigments, the specific dispersant, and water, goes through a step (Y2) of grinding at least a portion of the specific edible pigments contained in the mixture and dispersing the specific edible pigments. In this way, an ink composition is obtained.

The grinding and dispersion of the specific edible pigments in the step (Y2) can be performed using a known device which can apply a shear force. Examples of the device which can apply a shear force include a ball mill, a beads mill, a stirring device having a stirring blade, and the like.

"Grinding at least a portion of the specific edible pigments and dispersing the specific edible pigments" in the step (Y2) includes both the operation of grinding at least a portion of primary particles and dispersing the ground substances and the operation of disintegrating aggregates of secondary particles and dispersing the disintegrated particles as primary particles.

Prior to the grinding and the dispersion treatment of the specific edible pigments, a step of diluting the mixture with a solvent such as water and stirring the diluted solution so as to prepare a crude dispersion liquid with a further reduced content of specific edible pigments may be performed.

In a case where the concentration of the specific edible pigments is reduced by adding a solvent after the step (Y1), the distance between the pigment particles can be increased as desired, and the adsorption of the specific dispersant onto the specific edible pigments can be promoted. Furthermore, the fluidity of the dispersion can be further improved, and the yield of the solution can be increased. In addition, it is possible to obtain advantages such as being able to inhibit the occurrence of aggregates resulting from drying (solvent evaporation) in the container and being able to easily restore excellent dispersibility of the mixture by shaking such as shaking by hand. Therefore, it is preferable to perform the step of diluting the mixture and applying vibration to the diluted mixture at a low pressure by means of shaking by hand or stirring the diluted mixture under a low stress so as to prepare a crude dispersion liquid.

The dilution can be performed by adding, for example, water used as a dispersion medium. The content of the specific edible pigments after dilution is preferably set to be an appropriate value according to the dispersion treatment method to be performed thereafter. For example, in a case where the specific edible pigments are ground and subjected to a dispersion treatment by using a beads mill or the like, the content rate of the specific edible pigments in the crude dispersion liquid can be set to be within a range of 1% by mass to 10% by mass.

In the step (Y2), by using the mixture obtained through the step (Y1) or the crude dispersion liquid obtained by diluting the mixture, the specific edible pigments are ground and subjected to a dispersion treatment in a dispersion medium containing water in the presence of the specific dispersant, thereby preparing an ink composition as a dispersion of the specific edible pigments in which at least a portion of the surface of the specific edible pigments is coated with the specific dispersant.

The dispersion condition can be adjusted by the type and the amount of the specific dispersant contained in the mixture or the ink composition and the dispersion method.

In the manufacturing method B of the ink composition of the present disclosure, by using the mixture that is sufficiently premixed, the specific edible pigments are dispersed in the presence of the specific dispersant. Therefore, it is possible to obtain an ink composition which is excellent in the dispersibility of the specific edible pigments and the temporal stability of the dispersibility and has excellent jetting properties. In the ink composition obtained by the aforementioned method, the specific dispersant strongly adheres to the surface of the specific edible pigments, and the specific dispersant is inhibited from being dissociated from the specific edible pigments even after the lapse of time and eluted into the dispersion medium. Accordingly, in a case where the ink composition is jetted by an ink jet recording method, the jetting properties and the temporal stability of jetting are further improved.

In the step (Y2), in the presence of the specific dispersant, the specific edible pigments are ground and dispersed in the dispersion medium containing water. By controlling the conditions of the dispersion treatment, an ink composition having further improved jetting properties is obtained.

The specific edible pigments can be dispersed by known methods, and examples thereof include a method of performing a dispersion treatment on the specific edible pigments by using dispersion media (dispersion medium).

That is, from the viewpoint of further improving the dispersibility of the specific edible pigments, it is preferable that the step (Y2) includes a step of grinding at least a portion of the specific edible pigments by using a media mill and dispersing the specific edible pigments.

Examples of the method using the media mill include methods using a beads mill, a ball mill, a tower mill, and the like.

Among these, the methods using a ball mill, a beads mill, and the like are preferable, and the method using a circulation-type beads mill or a ball mill is more preferable.

In a case where the media mill is used, the dispersion conditions can be appropriately regulated by adjusting a volume ratio between the dispersion liquid and the media, the type of the media, the particle diameter of the media, the dispersion time and the like or by controlling, as will be described later, the number of stages in a case where multistage dispersion is performed in which the dispersion treatment is performed plural times in stages.

The dispersion media used in the step (Y2) are a dispersion medium used for dispersing the specific edible pigments as objects to be dispersed. As the media, it is possible to use grains which are so-called beads having a particle diameter of about 0.03 mm to 2.0 mm. As the media, known dispersion media such as glass beads and zirconia beads can be appropriately selected. As described above, hereinafter, the dispersion media will be referred to as "beads" in some cases.

In a case where only ball mill dispersion using beads is performed without performing the aforementioned premixing which is a dispersion method of the related art, the container is rotated at a low rotation speed so as to grind the pigments by exploiting the impact applied when the beads are moved to the central portion from the wall surface of the container. In contrast, in the dispersion treatment in the manufacturing method C of the present disclosure, as will be described later, a technique is used in which the container is rotated at a relatively high rotation speed such that the specific edible pigments are mildly ground by micro-vibration of the beads in a state where the beads stick to the wall surface of the container by a centrifugal field.

The inventors of the present invention consider that by the use of this technique, the aggregation resulting from the collision between the specific edible pigments can be inhibited as far as possible, the specific edible pigments can be ground while the specific dispersant is being allowed to uniformly coat the surface of the specific edible pigments, and hence an ink composition containing few coarse particle components can be prepared.

In a case where the specific edible pigments are ground and dispersed using a mill in the step (Y2), the rotation speed may be appropriately selected according to the used device. For example, in a case where a ball mill is used, the rotation speed of the container can be set to be equal to or higher than 50 rpm (rotation/min) and equal to or lower than 2,000 rpm. The rotation speed is more preferably set to be equal to or higher than 100 rpm and equal to or lower than 400 rpm, and even more preferably set to be equal to or higher than 100 rpm and equal to or lower than 250 rpm. In the step (Y2), the rotation speed of the container refers to the rotation speed of the outer peripheral portion of the container.

In the step (Y2), not only the grinding and the dispersion treatment that are performed once, but also multistage dispersion in which a plurality of dispersion stages are combined may be carried out. In a case where the multistage dispersion is performed, it is preferable to perform dispersion plural times under different conditions, because then it is easy to adjust the average particle diameter of the specific edible pigments to be a desired value.

In a case where a dispersion is prepared by the multistage dispersion, an aspect is preferable which includes a first dispersion step of dispersing the specific edible pigments in water by using first dispersion media, and a second dispersion step of further dispersing the specific edible pigments, which have been dispersed by the first dispersion step, by using second dispersion media having a media diameter smaller than that of the first dispersion media. For example, in the initial dispersion step (first dispersion step), beads having a relatively large diameter can be used for performing dispersion, and in the following second dispersion step, the media diameter can be set to be smaller than that of the first dispersion media.

In a case where the multistage dispersion, in which the pigments are dispersed plural times under a plurality of different dispersion conditions, is performed in the step (Y2), for example, a method is suitably used in which two-stage dispersion of dispersing the pigments twice under two different dispersion conditions or three-stage dispersion of dispersing the pigments three times under three different dispersion conditions is performed.

In a case where the multistage dispersion is performed, it is possible to use a method in which large beads are used in the initial first dispersion step so as to form a dispersion, in which the particle diameter of the specific edible pigments as materials to be dispersed is not markedly reduced, and then the particle diameter is controlled in the following second dispersion step so as to form a dispersion in a stabilized dispersion state.

In a case where the two-stage dispersion is performed, the ratio of the media diameter of the first dispersion media used in the first dispersion step to the media diameter of the second dispersion media used in the second dispersion step is preferably equal to or higher than 500% and equal to or lower than 5,000%. It is preferable that the ratio is equal to or higher than 500%, because then the diameter does not become too small, and in cooperation with the dispersion action in the following second dispersion step, a dispersion having excellent dispersibility and excellent temporal stability of dispersion is obtained. Furthermore, it is preferable that the ratio is equal to or lower than 5,000%, because then the media diameter of the first dispersion media does not become too large, and accordingly, the dispersion in the initial first dispersion step tends to excellently proceed, and it is possible to inhibit the particle diameter of the pigments from becoming too small due to the excessively small media diameter of the second dispersion media.

From the viewpoint of easily controlling the particle diameter of the specific edible pigments to an appropriate particle diameter resulting in excellent dispersion stability, the ratio of the media diameter of the first dispersion media to the media diameter of the second dispersion media is more preferably equal to or higher than 500% and equal to or lower than 2,000%, and even more preferably equal to or higher than 500% and equal to or lower than 1,500%.

In a case where one-stage dispersion is performed in the step (Y2), the media diameter of the dispersion media used for dispersion is preferably equal to or greater than 0.1 mm and equal to or smaller than 2 mm, and more preferably within a range of equal to or greater than 0.3 mm and equal to or smaller than 1 mm.

In a case where two-stage dispersion is performed, the media diameter of the first dispersion media used for dispersion in the first dispersion step is preferably equal to or greater than 0.5 mm and equal to or smaller than 2 mm, and more preferably equal to or greater than 0.8 mm and equal to or smaller than 1.5 mm. The media diameter of the second dispersion media used for dispersion in the second dispersion step performed thereafter is preferably equal to or greater than 0.05 mm and equal to or smaller than 0.2 mm, more preferably equal to or greater than 0.08 mm and equal to or smaller than 0.15 mm, and even more preferably equal to or greater than 0.08 mm and equal to or smaller than 0.12 mm.

The dispersion time in the step (Y2) cannot be generalized because the optimal time varies with the content of the specific edible pigments in the mixture or the crude dispersion liquid, the type of the dispersant, the media diameter, and the like. However, the total dispersion time in the step (B) is preferably equal to or longer than 5 hours and equal to or shorter than 150 hours. In a case where the dispersion time is within the above range, the specific edible pigments have a small average particle diameter which is equal to or smaller than 500 nm. Accordingly, dispersion stability can be secured, and an ink composition having excellent jetting properties can be obtained with excellent productivity.

In a case where the two-stage dispersion is performed, the dispersion in the first dispersion step is performed preferably for a dispersion time equal to or longer than 5 hours and equal to or shorter than 120 hours, and the dispersion in the second dispersion step is performed preferably for a dispersion time equal to or longer than 1 hour and equal to or shorter than 80 hours. The dispersion in the first dispersion step is performed preferably for a dispersion time equal to or longer than 10 hours and equal to or shorter than 70 hours, and the dispersion in the second dispersion step is performed preferably for a dispersion time equal to or longer than 5 hours and equal to or shorter than 80 hours. The dispersion in the second dispersion step is performed more preferably for a dispersion time equal to or longer than 30 hours and equal to or shorter than 80 hours.

In a case where the one-stage dispersion is performed, the content of the specific edible pigments in the mixture or the crude dispersion liquid with respect to the total mass of the dispersion is preferably within a range of 0.1% by mass to 10% by mass, and more preferably within a range of 1% by mass to 5% by mass.

In a case where the two-stage dispersion is performed, in the first dispersion step, the content of the specific edible pigments with respect to the total mass of the dispersion is preferably within a range of equal to or greater than 0.1% by mass and equal to or smaller than 20% by mass, more preferably equal to or greater than 3% by mass and equal to or smaller than 10% by mass, and even more preferably equal to or greater than 3% by mass and equal to or smaller than 6% by mass. In the second dispersion step, the content of the specific edible pigments with respect to the total mass of the dispersion is preferably within a range of equal to or greater than 0.1% by mass and equal to or smaller than 3% by mass, more preferably within a range of equal to or greater than 1% by mass and equal to or smaller than 3% by mass, and even more preferably equal to or greater than 1% by mass and equal to or smaller than 2.5% by mass. The case where the content of the specific edible pigments in the second dispersion step is equal to or smaller than 3% by mass is particularly suitable for the dispersion stability of the specific edible pigments.

Furthermore, an aspect is particularly preferable in which the content of the specific edible pigments in the first dispersion step is set to be equal to or greater than 3% by mass and equal to or smaller than 10% by mass with respect to the total mass of the dispersion so as to perform dispersion, and the content of the specific edible pigments in the second dispersion step is set to be equal to or greater than 0.1% by mass and equal to or smaller than 3% by mass with respect to the total mass of the dispersion so as to perform dispersion.

In a case where the two-stage dispersion is performed, as described above, the final average particle diameter of the specific edible pigments having undergone the two-stage dispersion is within a range of equal to or greater than 90 nm and equal to or smaller than 500 nm. However, the average particle diameter of the particles at a point in time when the first dispersion has finished but the second dispersion is not yet started is preferably within a range of equal to or greater than 150 nm and equal to or smaller than 400 nm, and more preferably within a range of equal to or greater than 190 nm and equal to or smaller than 400 nm.

(Other Steps)

As long as the effects are not impaired, the manufacturing method C of an ink composition of the present disclosure may have other steps in addition to the step (Y1), the step (Y2), and the step of diluting the mixture that is additionally performed as desired.

For example, the manufacturing method C may have a step of performing a high pressure treatment on the mixture obtained through the step (A) or the dispersion obtained through the step (Y2).

In a case where the high pressure treatment is additionally performed in the manufacturing method C of the present disclosure, the generation of aggregates of the crushed fine particles is inhibited, and the adsorption of the dispersant onto the fine particles is promoted. Furthermore, the coating of the particles with the dispersant is further improved, and an effect of further stabilizing the dispersion of particles can be obtained.

The high pressure treatment is a treatment of applying a high pressure to the mixture or the dispersion so as to sterilize or react the materials to be treated or allow dispersion to proceed. The high pressure treatment in the manufacturing method C refers to a treatment of applying a pressure equal to or higher than 50 MPa.

The high pressure treatment in the manufacturing method C can be performed by known methods.

In order to perform the high pressure treatment in the manufacturing method C, the mixture or the dispersion is put into a container and treated by a high-pressure processing treatment device applying a hydrostatic pressure of 50 MPa to 100 MPa. The high pressure treatment is preferably performed for 10 hours to 36 hours preferably under a temperature condition of a liquid temperature of 50° C. to 90° C.

Examples of the high-pressure processing treatment device include an ultrahigh-pressure processing treatment device (MARUGOTO EKISU) manufactured by Toyo Koatsu Inc.

Meanwhile, in the manufacturing method C, a high pressure treatment using a high-pressure homogenizer or the like can be performed. In this case, the high pressure treatment using a high-pressure homogenizer or the like is a treatment of applying a high pressure to the mixture or the dispersion so as to more finely grind or disperse the specific edible pigments or to allow dispersion to further proceed.

The high-pressure homogenizer can apply a higher pressure compared to a stirring method. Therefore, the homogenizer can make the specific edible pigments fine. As the homogenizer, various devices are commercially available.

Examples of the high-pressure homogenizer include chamber-type high-pressure homogenizers such as MICROFLUIDIZER (manufactured by Microfluidics), NANOMIZER (manufactured by yoshida kikai co., ltd.), and STAR BURST (manufactured by SUGINO MACHINE LIMITED) and homogenizing valve-type high-pressure homogenizers such as a Gaulin-type homogenizer (manufactured by APV), a Lanier-type homogenizer (manufactured by Lanier Co., Ltd.), a high-pressure homogenizer (manufactured by Niro Soavi), a homogenizer (manufactured by SANWA Machinery Trading Co., Ltd.), a high-pressure homogenizer (manufactured by IZUMI FOOD MACHINERY), and an ultra-high-pressure homogenizer (manufactured by IKA).

In the manufacturing method C, regarding the emulsification condition using a high-pressure homogenizer, from the viewpoint of dispersibility (making fine pigments), the pressure is preferably equal to or higher than 100 MPa and more preferably equal to or higher than 150 MPa. In a case where a commercial device is used, from the viewpoint of pressure resistance, the upper limit of the pressure is preferably equal to or lower than 300 MPa. However, presumably, from the viewpoint of temperature rise, the upper limit of the pressure can be set to be equal to or lower than 400 MPa for dispersion performed in an aqueous medium.

In the manufacturing method C, the high pressure treatment performed as desired may be carried out once or twice or more.

The ink composition C obtained by the manufacturing method C of an ink composition of the present disclosure is an ink composition which is excellent in the dispersibility of the specific edible pigments as materials to be dispersed, inhibited from experiencing the change of viscosity with the lapse of time, and has excellent jetting properties. Therefore, the ink composition C is suitably used in various ink jet recording methods.

Particularly, even in a case where the ink composition C contains the specific edible pigments, which are materials to be dispersed, at a high concentration, the ink composition C exhibits excellent dispersion stability and is inhibited from experiencing the change of viscosity with the lapse of time. Therefore, the ink composition C is suitably used in an ink jet recording method as an ink composition having excellent jetting properties.

The ink composition C obtained by the manufacturing method C of an ink composition of the present disclosure is suitable as an ink jet ink for forming images on articles such as foods or pharmaceutical products (for example, solid preparations such as a tablet and a capsule) that will be orally ingested. In a case where an ink jet recording method is used for forming images, the images can be formed, for example, on the surface of a tablet by using an ink jet recording device in a non-contact manner. Therefore, the images can be stably recorded regardless of the formulation or the shape of the tablet.

Examples of the solid preparations, which are examples of recording media, include a plain tablet (uncoated tablet), a sugar-coated tablet, an enteric tablet, an orally disintegrating tablet, and the like. The examples also include pharmaceutical products such as a film-coated tablet in which a water-soluble surface layer is formed as the outermost surface of a tablet. Furthermore, the examples include not only the pharmaceutical products but also compositions made into a certain formulation as animal drugs, agricultural chemicals, fertilizers, hygiene items, and the like.

Examples of the coating layer of the film-coated tablet include hydroxypropyl cellulose, hydroxypropyl methyl cellulose, polyethylene glycol as a polymer, and the like.

<Ink Jet Recording Method>

The ink jet recording method in which the ink composition for an ink jet (ink composition C) of the present disclosure is used is not particularly limited. At the time of forming an image on a recording medium, even in a case where the ink composition C contains edible pigment as coloring materials at a high concentration, because the ink composition C has excellent jetting properties and uses pigments as coloring materials, it is possible to obtain an advantage of being capable of forming an image having excellent fastness.

The ink jet recording method in which the ink composition C of the present disclosure is used is not particularly limited. As the ink jet recording method in the present disclosure, it is possible to use any of known methods such as an electric charge control method of jetting an ink by using an electrostatic attraction force, a drop-on-demand method (pressure pulse method) of using a vibration pressure of a piezoelectric element, an acoustic ink jet method of jetting an ink by using a radiation pressure by means of converting an electric signal into an acoustic beam and irradiating the ink with the acoustic beam, and a thermal ink jet method of forming air bubbles by heating an ink and using the generated pressure.

The obtained ink composition C is filtered through a filter as desired and then used in an ink jet recording device. In this way, the ink composition C can form an image.

The amount of the ink composition for an ink jet (ink composition C) jetted to a recording medium is not particularly limited, and can be appropriately selected as necessary within a range of equal to or greater than 2 pl (picoliter; the same shall be applied hereinafter) and equal to or smaller than 100 pl.

Examples of the recording medium on which an image will be recorded include articles such as foods or pharmaceutical products (for example, solid preparations such as a tablet or a capsule).

After the image is formed, if necessary, a drying step may be performed. Specifically, the drying step can be performed by exposing the recording medium to dry air, warm air, or hot air. For drying, known heating means can be used.

According to the ink composition C of the present disclosure, as long as an image can be recorded on a recording medium in a non-contact manner by using an ink jet recording method, the forms of recording are not limited. The ink composition C can be used in commercial ink jet devices.

As the ink jet recording method, for example, an aspect may be adopted in which an image is recorded by an ink jet method by using the tablet printing device described in JP2013-121432A.

The ink composition C of the present disclosure has excellent jetting properties. Therefore, in the ink composition C, the viscosity increase and the generation of coarse particles as aggregates of pigments that are caused by the decrease in the dispersibility of the specific edible pigments with the lapse of time are inhibited. Accordingly, the ink composition C is suitable for ink jet recording.

According to the ink composition for an ink jet (ink composition C) of the present disclosure, even in a case where the ink composition contains the specific edible pigments at a high concentration, the jetting properties are excellent, and the occurrence of a jetting defect that may be caused with the lapse of time is inhibited. Therefore, by using the ink in a small amount, it is possible to form a high-density image having excellent fastness. Accordingly, the ink composition C can be suitably used for printing performed on foods or pharmaceutical products.

EXAMPLES

Hereinafter, the first embodiment described above will be more specifically explained based on examples. However, as long as the gist of the present invention is maintained, the present invention is not limited to the following examples.

[Preparation of Dispersion]

Example A1

—Step A—

Powder-like iron (III) oxide ($Fe_2O_3$) (trade name: iron sesquioxide, use: pharmaceutical grade, standard: Japanese Pharmaceutical Excipients, KISHI KASEI CO., LTD.) as an edible pigment (16 g), 4 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 180 g of water (ultrapure water) were mixed together by stirring, thereby obtaining a first mixture (step a1).

—Step B—

The first mixture (200 g) obtained by the step A and 2 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant were put into a bag made of PE, and the bag was sealed.

Then, while the mixture and the edible dispersant put into the bag were being heated at 70° C., by using an ultrahigh pressure treatment device (trade name: MARUGOTO EKISU, Toyo Koatsu Inc.), a hydrostatic pressure of 100 MPa was applied to the mixture and the edible dispersant for 24 hours, thereby obtaining a second mixture.

—Step C—

The second mixture (200 g) obtained by the step B was moved to a container (made of PP) having a volume of 1 L, and then 240 g of zirconia beads (trade name: YTZ (registered trademark) ball, bead size: 0.1 mmφ, NIKKATO CORPORATION) were added thereto.

Thereafter, the container containing the second mixture and the like was mounted on a ball mill mount (trade name: BMU-100, Ito Seisakusho Co., Ltd.), and a dispersion treatment was performed for 12 hours under the condition of a rotation speed of the container (rotation speed of the outer peripheral portion of the container) of 100 rpm. After the dispersion treatment, the zirconia beads were separated using filter cloth, thereby obtaining a dispersion of Example A1.

Example A2

A dispersion of Example A2 was obtained by performing the same operation as Example A1, except that in Example A1, the formulation of the dispersion was changed to the formulation described in the following Table 1.

Example A3

A dispersion of Example A3 was obtained by performing the same operation as Example A1, except that in Example A1, the formulation of the dispersion was changed to the formulation described in the following Table 1, and the treatment time in the step B was changed to "48 hours" from "24 hours".

Example A4

A dispersion of Example A4 was obtained by performing the same operation as Example A1, except that in Example A1, the treatment time in the step B was changed to "6 hours" from "24 hours".

Example A5

A dispersion of Example A5 was obtained by performing the same operation as Example A1, except that in Example A1, the formulation of the dispersion was changed to the formulation described in the following Table 1, and the treatment time in the step B was changed to "18 hours" from "24 hours".

Example A6

A dispersion of Example A6 was obtained by performing the same operation as Example A1, except that in Example A1, the formulation of the dispersion was changed to the formulation described in the following Table 1, and the treatment temperature in the step B was changed to "room temperature (23° C.)" from "70° C.".

Example A7

A dispersion of Example A7 was obtained by performing the same operation as Example A1, except that in Example A1, the formulation of the dispersion was changed to the formulation described in the following Table 1, and the treatment temperature in the step B was changed to "50° C." from "70° C.".

Example A8

A dispersion of Example A8 was obtained by performing the same operation as Example A1, except that in Example A1, the formulation of the dispersion was changed to the formulation described in the following Table 1.

Example A9

—Step A—

Powder-like iron (III) oxide ($Fe_2O_3$) (trade name: iron sesquioxide, use: pharmaceutical grade, standard: Japanese Pharmaceutical Excipients, KISHI KASEI CO., LTD.) as an edible pigment (60 g), 24 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 83 g of water (ultrapure water) filled a container (trade name: CJ-250, clear jar made of PP, volume: 250 mL, Nikko Hansen & Co., Ltd.) in this order.

By using a low-frequency resonant acoustic mixer (trade name: LabRAM-MIXER, Resodyn Acoustic Mixers, Inc.), the edible pigment, the edible dispersant, and water filling the container as above were mixed together by vibrating the container for 2 minutes under the conditions of a vibration frequency of 60 Hz and a vibration acceleration of 980.665 m/s² (100 G), thereby obtaining a first mixture (step a2).

From the first mixture obtained as above, 66 g of the mixture was moved to a container (made of PP) having a volume of 1 L. Thereafter, 134 g of ultrapure water was added thereto, and then 480 g of zirconia beads (bead size: 1.0 mmφ) were added thereto.

Subsequently, the container containing the mixture and the like was mounted on a ball mill mount (trade name: BMU-100, Ito Seisakusho Co., Ltd.), and a dispersion treatment was performed for 121 hours under the condition of a rotation speed of the container (rotation speed of the outer peripheral portion of the container) of 300 rpm (step a3). After the dispersion treatment, the zirconia beads were separated using filter cloth, thereby obtaining a second mixture.

—Step B—

The second mixture (200 g) obtained by the step A and 9.5 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant were put into a bag made of PE, and the bag was sealed.

Then, while the mixture and the edible dispersant put into the bag were being heated at 70° C., by using an ultrahigh pressure treatment device (trade name: MARUGOTO EKISU, Toyo Koatsu Inc.), a hydrostatic pressure of 100 MPa was applied to the mixture and the edible dispersant for 24 hours, thereby obtaining a third mixture.

—Step C—

The third mixture (200 g) obtained by the step B was moved to a container (made of PP) having a volume of 1 L, and then 240 g of zirconia beads (trade name: YTZ (registered trademark) ball, bead size: 0.1 mmφ, NIKKATO CORPORATION) were added thereto.

Thereafter, the container containing the third mixture and the like was mounted on a ball mill mount (trade name: BMU-100, Ito Seisakusho Co., Ltd.), and a dispersion treatment was performed for 12 hours under the condition of a rotation speed of the container (rotation speed of the outer peripheral portion of the container) of 100 rpm.

After the dispersion treatment, the zirconia beads were separated using filter cloth, thereby obtaining a dispersion of Example A9.

Example A10

A dispersion of Example A10 was obtained by performing the same operation as Example A1, except that in Example A1, the treatment pressure in the step B was changed to "50 MPa" from "100 MPa".

Example A11

A dispersion of Example A11 was obtained by performing the same operation as Example A1, except that in Example A1, the treatment pressure in the step B was changed to "30 MPa" from "100 MPa".

Comparative Example A1

A dispersion of Comparative Example A1 was obtained by performing the same operation as Example A3, except that in Example A3, the step B was not performed. Specifically, a step A and a step C described below were performed.

—Step A—

Powder-like iron (III) oxide ($Fe_2O_3$) (trade name: iron sesquioxide, use: pharmaceutical grade, standard: Japanese Pharmaceutical Excipients, KISHI KASEI CO., LTD.) as an edible pigment (24 g), 12 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 164 g of water (ultrapure water) were mixed together by stirring, thereby obtaining a first mixture (step a1).

—Step C—

The first mixture (200 g) obtained by the step A was moved to a container (made of PP) having a volume of 1 L, and then 240 g of zirconia beads (trade name: YTZ (registered trademark) ball, bead size: 0.1 mmφ, NIKKATO CORPORATION) were added thereto.

Thereafter, the container containing the first mixture and the like was mounted on a ball mill mount (trade name: BMU-100, Ito Seisakusho Co., Ltd.), and a dispersion treatment was performed for 12 hours under the condition of a rotation speed of the container (rotation speed of the outer peripheral portion of the container) of 100 rpm. After the dispersion treatment, the zirconia beads were separated using filter cloth, thereby obtaining a dispersion of Comparative Example A1.

Comparative Example A2

A dispersion of Comparative Example A2 was obtained by performing the same operation as Example A3, except that in Example A3, the step C was not performed. Specifically, the following step A and step B were performed.

—Step A—

Powder-like iron (III) oxide ($Fe_2O_3$) (trade name: iron sesquioxide, use: pharmaceutical grade, standard: Japanese Pharmaceutical Excipients, KISHI KASEI CO., LTD.) as an edible pigment (24 g), 6 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 170 g of water (ultrapure water) were mixed together by stirring, thereby obtaining a first mixture (step a1).

—Step B—

The first mixture (200 g) obtained by the step A and 6 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant were put into a bag made of PE, and the bag was sealed.

Then, while the mixture and the edible dispersant put into the bag were being heated at 70° C., by using an ultrahigh pressure treatment device (trade name: MARUGOTO EKISU, Toyo Koatsu Inc.), a hydrostatic pressure of 100 MPa was applied to the mixture and the edible dispersant for 24 hours, thereby obtaining a dispersion of Comparative Example A2.

Comparative Example A3

—Step A—

Powder-like iron (III) oxide ($Fe_2O_3$) (trade name: iron sesquioxide, use: pharmaceutical grade, standard: Japanese Pharmaceutical Excipients, KISHI KASEI CO., LTD.) as an edible pigment (24 g), 6 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 170 g of water (ultrapure water) filled a container (made of PP) having a volume of 1 L in this order. Then, 480 g of zirconia beads (bead size: 1.0 mmφ) were added thereto.

Thereafter, the container containing the mixture and the like was mounted on a ball mill mount (trade name: BMU-100, Ito Seisakusho Co., Ltd.), and a dispersion treatment was performed for 121 hours under the condition of a rotation speed of the container (rotation speed of the outer peripheral portion of the container) of 300 rpm (step a3).

After the dispersion treatment, the zirconia beads were separated using filter cloth, thereby obtaining a first mixture.

—Step B—

The first mixture (200 g) obtained by the step A and 6 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant were put into a bag made of PE, and the bag was sealed.

Then, while the mixture and the edible dispersant put into the bag were being heated at 70° C., by using an ultrahigh pressure treatment device (trade name: MARUGOTO EKISU, Toyo Koatsu Inc.), a hydrostatic pressure of 100 MPa was applied to the mixture and the edible dispersant for 24 hours, thereby obtaining a dispersion of Comparative Example A3.

[Measurement and Evaluation A1]

The dispersions of Example A1 to Example A11 and Comparative Example A1 to Comparative Example A3 obtained as above were measured and evaluated as below.

A1. Measurement of Average Particle Diameter

By using a laser diffraction/scattering-type particle size distribution measurement apparatus (trade name: Partica LA-960, HORIBA, Ltd.), each of the dispersions 1,000× diluted with ultrapure water filled a glass cell, and the average particle diameter of the dispersed particles contained in the dispersion was measured under the condition of an atmospheric temperature of 23° C. The results are shown in Table 1.

The average particle diameter measured is the average of the particle diameter of primary particles and the particle diameter of secondary particles formed by the aggregation of two or more particles.

A2. Filterability

By using a syringe equipped with MINISART (syringe filter unit, catalog No: SM17594K, material: cellulose acetate, pore size: 5.0 μm, H1-Tech Co., Ltd.), 50 mL of the dispersion was filtered as a test. The amount of the dispersion passing through the membrane of the syringe filter within 5 minutes (passing amount) was measured, and the filterability of the dispersion was evaluated according to the following evaluation standards. The results are shown in Table 1.

In a case where the evaluated result is "A" or "B", the dispersion is unproblematic for practical use.

—Evaluation Standards—

A: The passing amount was equal to or greater than 30 mL.

B: The passing amount was equal to or greater than 20 mL and less than 30 mL.

C: The passing amount was equal to or greater than 10 mL and less than 20 mL.

D: The passing amount was less than 10 mL.

A3. Ink Jetting Properties

Propylene glycol (40 g) was added to 100 g of the dispersion, and then 60 g of ultrapure water was added thereto. Thereafter, the mixture was stirred for 1 minute, thereby obtaining an ink composition. Subsequently, the obtained ink composition was filtered using a syringe equipped with MINISART (syringe filter unit, catalog No: SM17594K, material: cellulose acetate, pore size: 5.0 μm, Hi-Tech Co., Ltd.).

A small-amount ink jet tester (trade name: DIMATIX MATERIALS PRINTER DMP-2831, drop-on-demand piezoelectric method, number of nozzles: 16, Fujifilm Global Graphic System Co., Ltd.) was loaded with the ink composition having undergone filtering and left to stand for 10 minutes, and the ink composition was jetted (amount of liquid droplets=10 pL) from 16 jetting nozzles as a test. Then, the number of nozzles from which the ink composition was normally jetted (number of normal jetting nozzles) was counted, and the ink jetting properties were evaluated according to the following evaluation standards. The results are shown in Table 1.

In a case where the evaluation result is "A" or "B", the ink composition is unproblematic for practical use.

—Evaluation Standards—

A: The number of normal jetting nozzles among 16 nozzles was equal to or greater than 5.

B: The number of normal jetting nozzles among 16 nozzles was 4.

C: The number of normal jetting nozzles among 16 nozzles was 2 or 3.

D: The number of normal jetting nozzles among 16 nozzles was 0 or 1.

TABLE 1

| | | | Example A1 | Example A2 | Example A3 | Example A4 | Example A5 | Example A6 | Example A7 |
|---|---|---|---|---|---|---|---|---|---|
| Formulation | Edible pigment [% by mass] | Iron sesquioxide | 8 | 12 | 12 | 8 | 10 | 12 | 12 |
| | | Black iron oxide | — | — | — | — | — | — | — |
| | Edible dispersant | EUDRAGIT RLPO [% by mass] | 4 | 6.7 | 6 | 4 | 5 | 6 | 6 |
| | | Ratio to edible pigment | 0.50 | 0.56 | 0.50 | 0.50 | 0.50 | 0.50 | 0.50 |
| | | Water [% by mass] | 88 | 81.3 | 82 | 88 | 85 | 82 | 82 |
| | | Volume-based concentration of pigment [% by volume] | 1.5 | 2.3 | 2.3 | 1.5 | 1.9 | 2.3 | 2.3 |
| Manufacturing step | Step A | a1 Stirring and mixing | Performed | Performed | Performed | Performed | Performed | Performed | Performed |
| | | a2 Low frequency treatment | N/A | N/A | N/A | N/A | N/A | N/A | N/A |
| | | a3 Ball mill | N/A | N/A | N/A | N/A | N/A | N/A | N/A |
| | | Bead size [mmφ] | — | — | — | — | — | — | — |

TABLE 1-continued

|  |  |  |  |  |  |  |  |  |  |
|---|---|---|---|---|---|---|---|---|---|
|  | Step B | High pressure treatment | Treatment pressure [MPa] | 100 | 100 | 100 | 100 | 100 | 100 | 100 |
|  |  |  | Treatment time [hours] | 24 | 24 | 48 | 6 | 18 | 24 | 24 |
|  |  |  | Treatment temperature [° C.] | 70 | 70 | 70 | 70 | 70 | 23 | 50 |
|  | Step C | Ball mill | Bead size [mmφ] | 0.1 | 0.1 | 0.1 | 0.1 | 0.1 | 0.1 | 0.1 |
| Evaluation |  | Average particle diameter [μm] |  | 0.3 | 0.5 | 0.5 | 0.5 | 0.4 | 1.8 | 1.2 |
|  |  | Filterability |  | A | A | A | A | A | B | A |
|  |  | Ink jetting properties |  | A | A | A | B | A | B | B |

|  |  |  |  | Example A8 | Example A9 | Example A10 | Example A11 | Comparative Example A1 | Comparative Example A2 | Comparative Example A3 |
|---|---|---|---|---|---|---|---|---|---|---|
| Formulation [% by mass] | Edible pigment | Iron sesquioxide |  | — | 12 | 8 | 8 | 12 | 12 | 12 |
|  |  | Black iron oxide |  | 6 | — | — | — | — | — | — |
|  | Edible dispersant | EUDRAGIT RLPO [% by mass] |  | 7.2 | 9.6 | 4 | 4 | 6 | 6 | 6 |
|  |  | Ratio to edible pigment |  | — | 0.80 | 0.50 | 0.50 | 0.50 | 0.50 | 0.50 |
|  |  | Water [% by mass] |  | 86.8 | 78.4 | 88 | 88 | 82 | 82 | 82 |
|  |  | Volume-based concentration of pigment [% by volume] |  | 1.2 | 2.3 | 1.5 | 1.5 | 2.3 | 2.3 | 2.3 |
| Manufacturing step | Step A | a1 | Stirring and mixing | Performed | N/A | Performed | Performed | Performed | Performed | N/A |
|  |  | a2 | Low frequency treatment | N/A | Performed | N/A | N/A | N/A | N/A | N/A |
|  |  | a3 | Ball mill | N/A | Performed | N/A | N/A | N/A | N/A | Performed |
|  |  |  | Bead size [mmφ] | — | 1.0 | — | — | — | — | 1.0 |
|  | Step B | High pressure treatment | Treatment pressure [MPa] | 100 | 100 | 50 | 30 | — | 100 | 100 |
|  |  |  | Treatment time [hours] | 24 | 24 | 24 | 24 | — | 48 | 48 |
|  |  |  | Treatment temperature [° C.] | 70 | 70 | 70 | 70 | — | 70 | 70 |
|  | Step C | Ball mill | Bead size [mmφ] | 0.1 | 0.1 | 0.1 | 0.1 | 0.1 | — | — |
| Evaluation |  | Average particle diameter [μm] |  | 0.5 | 0.1 | 1.1 | 1.7 | 13.2 | 11.4 | 10.3 |
|  |  | Filterability |  | A | A | A | B | D | D | D |
|  |  | Ink jetting properties |  | A | A | B | B | D | D | D |

"-" described in the column of a component in Table 1 means that the example does not contain the component. Furthermore, "-" described in the column of a manufacturing step in Table 1 means that the corresponding item or condition does not exist.

Details of the components described in Table 1 are as below.

Edible Pigments:

Iron sesquioxide (trade name, IUPAC name: iron (III) oxide, Fe$_2$O$_3$, shape: powder shape, use: pharmaceutical grade, standard: Japanese Pharmaceutical Excipients, KISHI KASEI CO., LTD.)

Black iron oxide (trade name, IUPAC name: iron (II.III) oxide, Fe$_3$O$_4$, shape: powder shape, use: pharmaceutical grade, standard: Japanese Pharmaceutical Excipients, KISHI KASEI CO., LTD.)

Edible Dispersants:

EUDRAGIT (registered trademark) RLPO (trade name, resin having quaternary ammonium group, ethyl acrylate/ethyl methacrylate/trimethylammonium ethyl methacrylate chloride (=1/2/0.2 [molar ratio]) copolymer, Evonik Nutrition & Care GmbH)

As shown in Table 1, it was confirmed that compared to the dispersions obtained by the manufacturing methods of Comparative Example A1 to Comparative Example A3, the dispersions obtained by the manufacturing methods of Example A1 to Example A11 had a markedly smaller average particle diameter and better filterability and contained fewer coarse particles.

Furthermore, it was confirmed that compared to the dispersions obtained by the manufacturing methods of Comparative Example A1 to Comparative Example A3, the dispersions obtained by the manufacturing methods of Example A1 to Example A11 exhibited better ink jetting properties in a case where the dispersions were used in an ink jet recording ink.

Furthermore, the dispersion obtained by the manufacturing method of Example A9 in which the step A included the step a2 of performing a low frequency treatment and the step a3 of performing a dispersion treatment had a markedly smaller average particle diameter, compared to the manufacturing methods of other examples in which the step A did not include the step a2 and the step a3.

By the comparison between Example A3 and Comparative Example A1, it was understood that in a case where the step B was not performed, the average particle diameter was markedly increased, the filterability markedly deteriorated, and the ink jetting properties markedly deteriorated in a case where the ink composition was used in an ink jet recording ink.

By the comparison between Example A3 and Comparative Example A2, it was understood that in a case where the step C was not performed after the step B, the average particle diameter was markedly increased, the filterability markedly deteriorated, and the ink jetting properties markedly deteriorated in a case where the ink composition was used in an ink jet recording ink.

By the comparison between Example A3 and Comparative Example A3, it was understood that even though the dispersion treatment was not performed after the step B but performed before the step B, a dispersion containing few coarse particles was obtained.

Example A12

—Step A—

Powder-like iron (III) oxide ($Fe_2O_3$) (trade name: iron sesquioxide, use: pharmaceutical grade, standard: Japanese Pharmaceutical Excipients, KISHI KASEI CO., LTD.) as an edible pigment (60 g), 15 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 90 g of water (ultrapure water) filled a container (trade name: CJ-120, clear jar made of PP, volume: 120 mL, Nikko Hansen & Co., Ltd.) in this order.

By using a low-frequency resonant acoustic mixer (trade name: LabRAM-MIXER, Resodyn Acoustic Mixers, Inc.), the edible pigment, the edible dispersant, and water filling the container as above were mixed together by vibrating the container for 2 minutes under the conditions of a vibration frequency of 60 Hz and a vibration acceleration of 980.665 m/s$^2$ (100 G), thereby obtaining a first mixture (step a2).

The first mixture obtained as above was moved to a container (made of PP) having a volume of 1 L, and then 235 g of ultrapure water was added thereto. Thereafter, 700 g of zirconia beads (bead size: 0.5 mmφ) were added thereto.

Subsequently, the container containing the mixture and the like was mounted on a ball mill mount (trade name: BMU-100, Ito Seisakusho Co., Ltd.), and a dispersion treatment was performed for 66 hours under the condition of a rotation speed of the container (rotation speed of the outer peripheral portion of the container) of 200 rpm (step a3). Then, 25 g of EUDRAGIT RLPO (registered trademark) and 75 g of ultrapure water were added thereto, the container containing the mixture and the like was mounted on a ball mill mount (trade name: BMU-100, Ito Seisakusho Co., Ltd.), and a dispersion treatment was performed for 16 hours under the condition of a rotation speed of the container (rotation speed of the outer peripheral portion of the container) of 200 rpm.

At this point in time, the ratio of the content of EUDRAGIT RLPO as an edible dispersant to the content of $Fe_2O_3$ was 0.67.

After the dispersion treatment in the step a3 was finished, the zirconia beads were separated using a nylon mesh (opening: 77 μm, N-No. 200 HD, NBC Meshtec Inc.), and a portion of the EUDRAGIT RLPO as an edible dispersant was separated and removed (step E). At this point in time, the ratio of the content of EUDRAGIT RLPO as an edible dispersant to the content of $Fe_2O_3$ was investigated and found to be 0.2.

As described above, a second mixture was obtained.

In Table 2, "Initial formulation" refers to a formulation at a point in time when the step A has finished but a portion of the dispersant is not yet separated.

—Step B—

The second mixture (200 g) obtained through the step E was put into a bag made of PE, and the bag was sealed.

Then, while the mixture and the edible dispersant put into the bag were being heated at 70° C., by using an ultrahigh pressure treatment device (trade name: MARUGOTO EKISU, Toyo Koatsu Inc.), a hydrostatic pressure of 100 MPa was applied to the mixture and the edible dispersant for 24 hours, thereby obtaining a third mixture.

—Step C—

The third mixture (200 g) obtained by the step B was moved to a container (made of PP) having a volume of 1 L, and then 150 g of zirconia beads (trade name: YTZ (registered trademark) ball, bead size: 0.1 mmφ, NIKKATO CORPORATION) were added thereto.

Thereafter, the container containing the third mixture and the like was mounted on a ball mill mount (trade name: BMU-100, Ito Seisakusho Co., Ltd.), and a dispersion treatment was performed for 12 hours under the condition of a rotation speed of the container (rotation speed of the outer peripheral portion of the container) of 100 rpm.

After the dispersion treatment, the zirconia beads were separated using filter cloth, thereby obtaining a dispersion of Example A12.

Examples A13 and A14

Dispersions of Examples A13 and A14 were obtained by performing the same operation as Example A12, except that in Example A12, the formulation of the dispersion was changed to the formulation described in the following Table 2 by changing the amount of the dispersant secondly added and adjusting the shortfall by using ultrapure water.

Example A15

—Step A—

Powder-like iron (III) oxide ($Fe_2O_3$) (trade name: iron sesquioxide, use: pharmaceutical grade, standard: Japanese Pharmaceutical Excipients, KISHI KASEI CO., LTD.) as an edible pigment (60 g), 15 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 90 g of water (ultrapure water) filled a container (trade name: CJ-120, clear jar made of PP, volume: 120 mL, Nikko Hansen & Co., Ltd.) in this order.

By using a low-frequency resonant acoustic mixer (trade name: LabRAM-MIXER, Resodyn Acoustic Mixers, Inc.), the edible pigment, the edible dispersant, and water filling the container as above were mixed together by vibrating the container for 2 minutes under the conditions of a vibration frequency of 60 Hz and a vibration acceleration of 980.665 m/s$^2$ (100 G), thereby obtaining a first mixture (step a2).

The first mixture obtained as above was moved to a container (made of PP) having a volume of 1 L, and then 335 g of ultrapure water was added thereto. Thereafter, 700 g of zirconia beads (bead size: 0.5 mmφ) were added thereto.

Subsequently, the container containing the mixture and the like was mounted on a ball mill mount (trade name: BMU-100, Ito Seisakusho Co., Ltd.), and a dispersion treatment was performed for 90 hours under the condition of a rotation speed of the container (rotation speed of the outer peripheral portion of the container) of 200 rpm (step a3).

After the dispersion treatment, the zirconia beads were separated using a nylon mesh (opening: 435 μm, NB40, NBC Meshtec Inc.), thereby obtaining a second mixture.

In the present example, the edible dispersant was not removed in the step a1 to the step a3. Therefore, in the second mixture, the ratio of the content of the EUDRAGIE RLPO as an edible dispersant to the content of $Fe_2O_3$ was 0.25 as in the initial formulation.

—Step B—

The second mixture (200 g) obtained by the step A was put into a bag made of PE, and the bag was sealed.

Then, while the mixture and the edible dispersant put into the bag were being heated at 70° C., by using an ultrahigh pressure treatment device (trade name: MARUGOTO EKISU, Toyo Koatsu Inc.), a hydrostatic pressure of 100 MPa was applied to the mixture and the edible dispersant for 24 hours, thereby obtaining a third mixture.

—Step C—

The third mixture (200 g) obtained by the step B was moved to a container (made of PP) having a volume of 1 L, and then 150 g of zirconia beads (trade name: YTZ (registered trademark) ball, bead size: 0.1 mmφ, NIKKATO CORPORATION) were added thereto.

Thereafter, the container containing the third mixture and the like was mounted on a ball mill mount (trade name: BMU-100, Ito Seisakusho Co., Ltd.), and a dispersion treatment was performed for 12 hours under the condition of a rotation speed of the container (rotation speed of the outer peripheral portion of the container) of 100 rpm.

After the dispersion treatment, the zirconia beads were separated using filter cloth, thereby obtaining a dispersion of Example A15.

Example A16

—Step A—

Powder-like iron (III) oxide ($Fe_2O_3$) (trade name: iron sesquioxide, use: pharmaceutical grade, standard: Japanese Pharmaceutical Excipients, KISHI KASEI CO., LTD.) as an edible pigment (60 g), 15 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 90 g of water (ultrapure water) filled a container (trade name: CJ-120, clear jar made of PP, volume: 120 mL, Nikko Hansen & Co., Ltd.) in this order.

By using a low-frequency resonant acoustic mixer (trade name: LabRAM-MIXER, Resodyn Acoustic Mixers, Inc.), the edible pigment, the edible dispersant, and water filling the container as above were mixed together by vibrating the container for 2 minutes under the conditions of a vibration frequency of 60 Hz and a vibration acceleration of 980.665 m/s² (100 G), thereby obtaining a first mixture (step a2).

The first mixture obtained as above was moved to a container (made of PP) having a volume of 1 L, and then 335 g of ultrapure water was added thereto. Thereafter, 700 g of zirconia beads (bead size: 0.5 mmφ) were added thereto.

Subsequently, the container containing the mixture and the like was mounted on a ball mill mount (trade name: BMU-100, Ito Seisakusho Co., Ltd.), and a dispersion treatment was performed for 90 hours under the condition of a rotation speed of the container (rotation speed of the outer peripheral portion of the container) of 200 rpm (step a3).

After the dispersion treatment, the zirconia beads were separated using a nylon mesh (opening: 435 μm, NB40, NBC Meshtec Inc.), thereby obtaining a second mixture.

In the present example, the edible dispersant was not removed in the step a1 to the step a3. Therefore, in the second mixture, the ratio of the content of the EUDRAGIE RLPO as an edible dispersant to the content of $Fe_2O_3$ was 0.25 as in the initial formulation.

—Step B—

The second mixture (200 g) obtained by the step A was put into a bag made of PE, and the bag was sealed.

Then, while the mixture and the edible dispersant put into the bag were being heated at 70° C., by using an ultrahigh pressure treatment device (trade name: MARUGOTO EKISU, Toyo Koatsu Inc.), a hydrostatic pressure of 100 MPa was applied to the mixture and the edible dispersant for 24 hours, thereby obtaining a third mixture.

A 1:1 (based on volume) mixed solution of an aqueous citric acid ($C_6H_8O_7$) solution having a concentration of 1 mol/L and an aqueous trisodium citrate (TriNa citrate: $Na_3C_6H_5O_7$) solution having a concentration of 1 mol/L was added to 200 g of the third mixture obtained by the step B until the pH of the third mixture became 6 (step D).

—Step C—

The third mixture was moved to a container (made of PP) having a volume of 1 L, and then 150 g of zirconia beads (trade name: YTZ (registered trademark) ball, bead size: 0.1 mmφ, NIKKATO CORPORATION) were added thereto.

Thereafter, the container containing the third mixture and the like was mounted on a ball mill mount (trade name: BMU-100, Ito Seisakusho Co., Ltd.), and a dispersion treatment was performed for 12 hours under the condition of a rotation speed of the container (rotation speed of the outer peripheral portion of the container) of 100 rpm.

After the dispersion treatment, the zirconia beads were separated using filter cloth, thereby obtaining a dispersion of Example A16.

Example A17

A dispersion of Example A17 was obtained in the same manner as in Example A16, except that in Example A16, the mixed solution of the aqueous citric acid solution and the aqueous trisodium citrate solution added in the step D was replaced with a 10% by mass aqueous citric acid solution.

Examples A18 and A19

Dispersions of Examples A18 and A19 were obtained by performing the same operation as Example A12, except that in Example A12, the amount of the edible dispersant (EUDRAGIT RLPO) separated and removed in the step E by using meshes having different opening sizes (Example A18: opening size of 67 μm, Example A19: opening size of 108 μm) was changed such that the ratio of the content of the edible dispersant (EUDRAGIT RLPO) with respect to the content of $Fe_2O_3$ in the step B was changed to 0.17 and 0.40 respectively from 0.25 as shown in the following Table 2.

[Evaluation A2]

The dispersions of Example A12 to Example A19 obtained as above were evaluated in terms of the temporal stability described below.

A4. Temporal Change of Particle Diameter

The dispersion obtained in each of the examples was left to stand in an environment at 40° C. in a state of being put into a container (made of PP) having a volume of 1 L, and stored as it was for 14 days.

For both the dispersion before being stored for 14 days and the dispersion after being stored for 14 days, the average particle diameter was measured by the method described in "1. Measurement of average particle diameter" described above. Based on the measured value, the temporal change of the particle diameter was evaluated according to the following evaluation standards. The results of the measurement and the evaluation are shown in the following Table 2.

—Evaluation Standards—

A: The change in the particle diameter was less than 5 nm.

B: The change in the particle diameter was equal to or greater than 5 nm and less than 10 nm.

C: The change in the particle diameter was equal to or greater than 10 nm and less than 20 nm.

D: The change in the particle diameter was equal to or greater than 20 nm.

TABLE 2

| | | | | Example A12 | Example A13 | Example A14 | Example A15 |
|---|---|---|---|---|---|---|---|
| Initial formulation | Edible pigment [% by mass] | | Iron sesquioxide | 12 | 12 | 12 | 12 |
| | Edible dispersant | | EUDRAGIT RLPO [% by mass] | 8 | 6 | 5 | 3 |
| | | | Ratio P to edible pigment | 0.67 | 0.50 | 0.42 | 0.25 |
| | | | Water [% by mass] | 80 | 82 | 83 | 85 |
| Manufacturing step | Step A | a1 | Stirring and mixing | N/A | N/A | N/A | N/A |
| | | a2 | Low frequency treatment | Performed | Performed | Performed | Performed |
| | | a3 | Ball mill | Performed | Performed | Performed | Performed |
| | | | Bead size [mmφ] | 0.5 | 0.5 | 0.5 | 0.5 |
| | Step E [removing step] | Separation by filtration | Amount of EUDRAGIT RLPO separated by filtration | 5.6 | 3.6 | 2.6 | 0 |
| | Step B | High pressure treatment | Treatment pressure [MPa] | 100 | 100 | 100 | 100 |
| | | | Treatment time [hours] | 24 | 24 | 24 | 24 |
| | | | Treatment temperature [° C.] | 70 | 70 | 70 | 70 |
| | | | Ratio Q to edible pigment | 0.20 | 0.20 | 0.20 | 0.25 |
| | Step D [pH adjustment] | Addition of acid agent and buffer | Mixed solution of aqueous citric acid solution and aqueous triNa citrate solution | N/A | N/A | N/A | N/A |
| | | Addition of acid agent | 10% by mass aqueous citric acid solution | N/A | N/A | N/A | N/A |
| | Step C | Ball mill | Bead size [mmφ] | 0.1 | 0.1 | 0.1 | 0.1 |
| Evaluation | | | pH (25° C.) | 6.0 | 6.0 | 6.1 | 6.4 |
| | | | Expression I (0.25 < Ratio P < 1.2) | 0.67 | 0.50 | 0.42 | 0.25 |
| | | | Expression II (0.05 < Ratio Q < 0.40) | 0.20 | 0.20 | 0.20 | 0.25 |
| | Temporal change of particle diameter | | Average particle diameter immediately after dispersion [nm] | 90 | 90 | 90 | 100 |
| | | | Average particle diameter after 14 days of storage at 40° C. [nm] | 93 | 95 | 98 | 140 |
| | | | Evaluation | A | B | B | D |

| | | | | Example A16 | Example A17 | Example A18 | Example A19 |
|---|---|---|---|---|---|---|---|
| Initial formulation | Edible pigment [% by mass] | | Iron sesquioxide | 12 | 12 | 12 | 12 |
| | Edible dispersant | | EUDRAGIT RLPO [% by mass] | 3 | 3 | 8 | 8 |
| | | | Ratio P to edible pigment | 0.25 | 0.25 | 0.67 | 0.67 |
| | | | Water [% by mass] | 85 | 85 | 80 | 80 |
| Manufacturing step | Step A | a1 | Stirring and mixing | N/A | N/A | N/A | N/A |
| | | a2 | Low frequency treatment | Performed | Performed | Performed | Performed |
| | | a3 | Ball mill | Performed | Performed | Performed | Performed |
| | | | Bead size [mmφ] | 0.5 | 0.5 | 0.5 | 0.5 |
| | Step E [removing step] | Separation by filtration | Amount of EUDRAGIT RLPO separated by filtration | 0 | 0 | 6 | 3.2 |
| | Step B | High pressure treatment | Treatment pressure [MPa] | 100 | 100 | 100 | 100 |
| | | | Treatment time [hours] | 24 | 24 | 24 | 24 |
| | | | Treatment temperature [° C.] | 70 | 70 | 70 | 70 |
| | | | Ratio Q to edible pigment | 0.25 | 0.25 | 0.17 | 0.40 |
| | Step D [pH adjustment] | Addition of acid agent and buffer | Mixed solution of aqueous citric acid solution and aqueous triNa citrate solution | Performed (added until pH became 6) | N/A | N/A | N/A |
| | | Addition of acid agent | 10% by mass aqueous citric acid solution | N/A | Performed (added until pH became 6) | N/A | N/A |

TABLE 2-continued

| Step C Evaluation | Ball mill | Bead size [mmφ] | 0.1 | 0.1 | 0.1 | 0.1 |
|---|---|---|---|---|---|---|
| | | pH (25° C.) | 6.0 | 6.0 | 6.0 | 6.0 |
| | | Expression I (0.25 < Ratio P < 1.2) | 0.25 | 0.25 | 0.67 | 0.67 |
| | | Expression II (0.05 < Ratio Q < 0.40) | 0.25 | 0.25 | 0.17 | 0.40 |
| | Temporal change of particle diameter | Average particle diameter immediately after dispersion [nm] | 110 | 120 | 90 | 100 |
| | | Average particle diameter after 14 days of storage at 40° C. [nm] | 114 | 135 | 90 | 110 |
| | | Evaluation | A | C | A | C |

As shown in Table 2, unlike in Example A15 in which an excess of EUDRAGIT (edible dispersant) was used but the unnecessary dispersant was not removed before the step B, in Examples A12 to A14 in which 2% by mass or more of the edible dispersant was removed, the temporal change of the particle diameter of the dispersed particles in the dispersion after storage was markedly inhibited, and the temporal stability of the dispersion was markedly improved.

It is considered that this is because the dispersant was inhibited from being crosslinked and aggregated between the particles due to the presence of the unadsorbed dispersant in the system, and hence the finally obtained dispersion had a pH suitable for dispersion. Presumably, because the charged state of the dispersed particles tends to depend on the pH, the reduction in the pH might result in the increase in the charge repulsion force, and the dispersion stabilizing effect might be obtained.

Furthermore, in Examples A16 and A17 in which the pH was adjusted before the step B as a dispersion step, unlike in Example 15 in which the pH was not adjusted, the temporal change of the particle diameter of the dispersed particles in the dispersion after storage was markedly inhibited and the temporal stability of the dispersed particles was markedly improved as in Examples A12 to A14. In addition, as is evident from the comparison between Examples A16 and A17, the effect was stronger in a case where an acid agent and a salt of a weak acid were added than in a case where only an acid agent was added.

In the aspect including the step E (removing step) of removing a portion of the edible dispersant, the increase of the ion concentration in the dispersion was further inhibited. Therefore, in view of the effect of improving temporal stability of the dispersion, this aspect is better than the aspect including the step D (pH adjustment step) of adjusting the pH of the dispersion.

Hereinafter, the second and third embodiments described above will be more specifically described based on examples, but the present invention is not limited to the following examples as long as the gist of the present invention is maintained.

[Preparation of Pigment Dispersion]

Example B1

Powder-like iron (III) oxide ($Fe_2O_3$) (trade name: iron sesquioxide, use: pharmaceutical grade, standard: Japanese Pharmaceutical Excipients, KISHI KASEI CO., LTD.) as an edible pigment (60 g), 15 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 92 g of water (ultrapure water) filled a container (trade name: CJ-250, clear jar made of PP, volume: 250 mL, Nikko Hansen & Co., Ltd.) in this order, and the container was sealed.

—Step X1—

By using a low-frequency resonant acoustic mixer (trade name: LabRAM-MIXER, Resodyn Acoustic Mixers, Inc.), the edible pigment, the edible dispersant, and water filling the airtight container as above were mixed together by vibrating the airtight container for 2 minutes under the conditions of a vibration frequency of 60 Hz and a vibration acceleration of 980.665 m/s² (100 G), thereby obtaining a mixture (that is, a crude dispersion).

—Step X2—

From the mixture obtained by the step X1, 22 g of the mixture was moved to a container (made of PP) having a volume of 1 L. Thereafter, 178 g of ultrapure water was added thereto, and then 480 g of zirconia beads (bead size: 1.0 mmφ) were added thereto.

Subsequently, the container containing the mixture and the like was mounted on a ball mill mount (trade name: BMU-100, Ito Seisakusho Co., Ltd.), and a dispersion treatment was performed for 121 hours under the condition of a rotation speed of the container (rotation speed of the outer peripheral portion of the container) of 300 rpm.

After the dispersion treatment, the zirconia beads were separated using filter cloth, thereby obtaining a first dispersion.

—Step X3—

The first dispersion (200 g) obtained by the step X2 and 2.0 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant were put into a bag made of PE, and the bag was sealed.

Then, while the first dispersion and the edible dispersant put into the bag were being heated at 70° C., by using an ultrahigh pressure treatment device (trade name: MARUGOTO EKISU, Toyo Koatsu Inc.), a hydrostatic pressure of 100 MPa was applied to the dispersion and the edible dispersant for 24 hours, thereby obtaining a second dispersion.

—Step X4—

The second dispersion (200 g) obtained by the step X3 was moved to a container (made of PP) having a volume of 1 L, and then 240 g of zirconia beads (trade name: YTZ (registered trademark) ball, bead size: 0.1 mmφ, NIKKATO CORPORATION) were added thereto.

Thereafter, the container containing the second dispersion and the like was mounted on a ball mill mount (trade name: BMU-100, Ito Seisakusho Co., Ltd.), and a dispersion treatment was performed for 12 hours under the condition of a rotation speed of the container (rotation speed of the outer peripheral portion of the container) of 100 rpm.

After the dispersion treatment, the zirconia beads were separated using filter cloth, thereby obtaining a pigment dispersion of Example B1.

Example B2 to Example B5

Pigment dispersions of Example B2 to Example B5 were obtained by performing the same operation as Example B1, except that in Example B1, the formulation of the pigment dispersion was changed to the formulation described in the following Table 3.

Example B6

A pigment dispersion of Example B6 was obtained by performing the same operation as Example B2, except that in Example B2, the rotation speed of the container of the step D was changed to 50 rpm.

Comparative Example B1

A pigment dispersion of Comparative Example B1 was obtained by performing the same operation as Example B1, except that in Example B1, the formulation of the pigment dispersion was changed to the formulation described in the following Table 3, the step X1, the step X3, and the step X4 were not performed. Specifically, the following step X2 was performed.

—Step X2—

Powder-like iron (III) oxide ($Fe_2O_3$, trade name: iron sesquioxide, use: pharmaceutical grade, standard: Japanese Pharmaceutical Excipients, KISHI KASEI CO., LTD.) as an edible pigment (32 g), 8 g of EUDRAGIT (registered trademark) RLPO (resin having a quaternary ammonium group, ethyl acrylate:methyl methacrylate:trimethylammonium ethyl methacrylate chloride=1:2:0.2 [molar ratio], Evonik Nutrition & Care GmbH) as an edible dispersant, and 160 g of water (ultrapure water) filled a container (made of PP) having a volume of 1 L in this order, and then 480 g of zirconia beads (bead size: 1.0 mmφ) were added thereto.

Thereafter, the container containing the mixed solution and the like was mounted on a ball mill mount (trade name: BMU-100, Ito Seisakusho Co., Ltd.), and a dispersion treatment was performed for 121 hours under the condition of a rotation speed of the container (rotation speed of the outer peripheral portion of the container) of 300 rpm.

After the dispersion treatment, the zirconia beads were separated using filter cloth, thereby obtaining a pigment dispersion of Comparative Example B1.

Comparative Example B2

A pigment dispersion of Comparative Example B2 was obtained by performing the same operation as Comparative Example B1, except that in Comparative Example B1, the formulation of the pigment dispersion was changed to the formulation described in the following Table 3.

[Measurement and Evaluation B]

The pigment dispersions of Example B1 to Example B6, Comparative Example B1, and Comparative Example B2 obtained as above were measured and evaluated as below.

B1. Measurement of Particle Diameter ($D_{10}$, $D_{50}$, and $D_{90}$)

By using a laser diffraction/scattering-type particle size distribution measurement apparatus (trade name: Partica LA-960, HORIBA, Ltd.) and the aforementioned optical path length variable cell (thickness of spacer: 5 μm), the particle diameter of the dispersed particles contained in the pigment dispersion was measured under the condition of an atmospheric temperature of 23° C. Then, from the obtained particle size distribution, a particle diameter $D_{10}$ at which a volume-based cumulative detection frequency becomes 10%, a particle diameter $D_{50}$ at which a volume-based cumulative detection frequency becomes 50%, and a particle diameter $D_{90}$ at which a volume-based cumulative detection frequency becomes 90% were determined. Specifically, each of the pigment dispersions was injected through a sample inlet of the optical path length variable cell such that the cell was filled with the pigment dispersion, then the cell was mounted on the laser diffraction/scattering-type particle size distribution measurement apparatus, and the particle diameter was measured.

Because the viscosity of the pigment dispersions of Comparative Example B1 and Comparative Example B2 was too high, these dispersions could not fill the optical path length variable cell as undiluted solutions and could not be used for measurement. Therefore, these pigment dispersions were 1,000× diluted with ultrapure water and then used for measuring the particle diameter of the dispersed particles.

The values of $D_{50}$ and $(D_{90}-D_{10})/D_{50}$ are shown in the following Table 3.

B2. Measurement of Transmittance

By using a laser diffraction/scattering-type particle size distribution measurement apparatus (trade name: Partica LA-960, HORIBA, Ltd.) and the aforementioned optical path length variable cell (thickness of spacer: 5 μm), the transmittance of a semiconductor laser light (wavelength: 650 nm) was measured under the condition of an atmospheric temperature of 23° C. Specifically, each of the pigment dispersions was injected through a sample inlet of the optical path length variable cell such that the cell was filled with the pigment dispersion, then the cell was mounted on the laser diffraction/scattering-type particle size distribution measurement apparatus, and the transmittance was measured.

Because the viscosity of the pigment dispersions of Comparative Example B1 and Comparative Example B2 was too high, these dispersions could not fill the optical path length variable cell as undiluted solutions and could not be used for measurement. Therefore, these pigment dispersions were 1,000× diluted with ultrapure water and then used for measuring the transmittance.

The values of the measured transmittance are shown in the following Table 3.

B3. Measurement of Average Particle Diameter (Cumulant Average Diameter)

By using a zeta potential•particle diameter•molecular weight measurement apparatus (trade name: Zetasizer Nano ZS, manufactured by Malvern Panalytical Ltd.), the particle diameter of the dispersed particles contained in the pigment dispersion was measured by a dynamic light scattering method under the condition of an atmospheric temperature of 23° C. Then, from the measured value of particle diameter, an average particle diameter (Z-Average. (d.nm); cumulant average diameter) was determined which was a hydrodynamic diameter analyzed by a cumulant method. For measuring the particle diameter, the pigment dispersion was used after being diluted 100× with ultrapure water.

The values of the measured average particle diameter (cumulant average diameter) of the dispersed particles contained in the pigment dispersion are shown in the following Table 3.

B4. Measurement of Viscosity

By using a vibro viscometer (trade name: VM-10A, CBC Group), the viscosity of the just prepared pigment dispersion was measured. Specifically, the viscosity was measured by immersing a detection terminal of the vibro viscometer in the pigment dispersion at a liquid temperature of 23° C.

The values of the measured viscosity of the pigment dispersion are shown in the following Table 3.

B5. Dispersion Stability (1)

In a case where coarse particles, a dispersant (so-called free dispersant) which does not coat the edible pigment, and the like are present in the pigment dispersion, when vibration is applied to the pigment dispersion, the above components are aggregated, and the viscosity of the pigment dispersion can change. Therefore, as an acceleration test for evaluating the dispersion stability of the pigment dispersion, viscometry using a vibro viscometer was performed.

The detection terminal of the vibro viscometer (trade name: VM-10A, CBC Group) was immersed in the pigment dispersion at a liquid temperature of 23° C., and in a state of applying vibration to the pigment dispersion for 4 minutes, the viscosity of the pigment dispersion was measured. The value of viscosity measured 10 seconds after the application of vibration and the value of viscosity measured 4 minutes after the application of vibration were read, and based on Equation (A), a rate of viscosity change of the pigment dispersion was calculated. Thereafter, according to the following evaluation standards, the dispersion stability of the pigment dispersion (dispersion stability assessed based on the viscosity change caused by vibration) was evaluated. The results are shown in Table 3.

In a case where the evaluation result is "A" or "B", the pigment dispersion is unproblematic for practical use.

Rate of viscosity change (%)=(value of viscosity measured after 4 minutes)−(value of viscosity measured after 10 seconds)/(value of viscosity measured after 4 minutes)×100    Equation (A)

—Evaluation Standards—

A: The rate of viscosity change was less than 4%.

B: The rate of viscosity change was equal to or higher than 4% and less than 13%.

C: The rate of viscosity change was equal to or higher than 13% and less than 20%.

D: The rate of viscosity change was equal to or higher than 20%.

B6. Dispersion Stability (2)

By using a vibro viscometer (trade name: VM-10A, CBC Group), the viscosity of the just prepared pigment dispersion was measured. Specifically, the viscosity was measured by immersing a detection terminal of the vibro viscometer in the pigment dispersion at a liquid temperature of 23° C., and the obtained value of the measured viscosity was adopted as "value of initial viscosity measured".

Furthermore, as another system, 20 mL of the just prepared pigment dispersion was put into a container, the container was sealed, and then pigment dispersion was stored for 2 months at an atmospheric temperature of 40° C. The viscosity of the pigment dispersion after storage was measured by the same method as that described above, and the obtained value of the measured viscosity was adopted as "value of viscosity measured after lapse of time".

Then, by using the value of initial viscosity measured and the value of viscosity measured after lapse of time, a rate of viscosity change of the pigment dispersion caused by lapse of time was calculated based on Equation (B), and according to the following evaluation standards, the dispersion stability of the pigment dispersion (dispersion stability assessed based on the viscosity change caused by lapse of time) was evaluated. The results are shown in Table 3.

In a case where the evaluation result is "A" or "B", the pigment dispersion is unproblematic for practical use.

Rate of viscosity change caused by lapse of time (%)=|(value of viscosity measured after lapse of time)−(value of initial viscosity measured)|/(value of viscosity measured after lapse of time)×100    Equation (B)

—Evaluation Standards—

A: The rate of viscosity change was less than 5%.

B: The rate of viscosity change was equal to or higher than 5% and less than 10%.

C: The rate of viscosity change was equal to or higher than 10% and less than 20%.

D: The rate of viscosity change was equal to or higher than 20%.

B7. Filterability

By using a syringe equipped with MINISART (syringe filter unit, catalog No: SM17594K, material: cellulose acetate, pore size: 5.0 µm, Hi-Tech Co., Ltd.), 50 mL of the pigment dispersion was filtered as a test. The amount of the pigment dispersion passing through the membrane of the syringe filter within 5 minutes (passing amount) was measured, and the filterability of the pigment dispersion was evaluated according to the following evaluation standards. The results are shown in Table 3.

In a case where the evaluated result is "A" or "B", the pigment dispersion is unproblematic for practical use.

—Evaluation Standards—

A: The entirety of 50 mL of the pigment dispersion passed through the filter.

B: The passing amount was equal to or greater than 40 mL and less than 50 mL.

C: The passing amount was equal to or greater than 20 mL and less than 40 mL.

D: The passing amount was less than 20 mL.

B8. Ink Jetting Properties

Propylene glycol (40 g) was added to 100 g of the pigment dispersion, and then 60 g of ultrapure water was added thereto. Thereafter, the mixture was stirred for 1 minute, thereby obtaining an ink composition. Subsequently, the obtained ink composition was filtered using a syringe equipped with MINISART (syringe filter unit, catalog No: SM17594K, material: cellulose acetate, pore size: 5.0 µm, Hi-Tech Co., Ltd.). Each of ink compositions was used in an amount of 10 mL for the filtering test, and only the ink composition passing through the membrane of the syringe filter in an amount greater than 1 mL was subjected to the following operation.

A small-amount ink jet tester (trade name: DIMATIX MATERIALS PRINTER DMP-2831, drop-on-demand piezoelectric method, number of nozzles: 16, Fujifilm Global Graphic System Co., Ltd.) was loaded with the ink composition having undergone the filtering and left to stand for 10 minutes, and the ink composition was jetted (amount of liquid droplets=10 pL) from 16 jetting nozzles as a test. Then, the number of nozzles from which the ink composition was normally jetted (number of normal jetting nozzles) was counted, and the ink jetting properties were evaluated according to the following evaluation standards. The results are shown in Table 3.

In a case where the evaluation result is "A" or "B", the ink composition is unproblematic for practical use.

—Evaluation Standards—

A: The number of normal jetting nozzles among 16 nozzles was equal to or greater than 13.

B: The number of normal jetting nozzles among 16 nozzles was equal to or greater than 6 and equal to or smaller than 12.

C: The number of normal jetting nozzles among 16 nozzles was equal to or greater than 3 and equal to or smaller than 5.

D: The number of normal jetting nozzles among 16 nozzles was equal to or smaller than 2. Alternatively, because the filterability was poor, ink jetting properties could not be evaluated.

TABLE 3

| | | | Example B1 | Example B2 | Example B3 | Example B4 | Example B5 | Example B6 | Comparative Example B1 | Comparative Example B2 |
|---|---|---|---|---|---|---|---|---|---|---|
| Formulation | Edible pigment [% by mass] | Iron sesquioxide | 8 | 12 | — | — | — | 12 | 16 | 12 |
| | | Black iron oxide | — | — | 6 | — | — | — | — | — |
| | | Yellow iron sesquioxide | — | — | — | 10 | — | — | — | — |
| | | Food Blue No. 2 Aluminum Lake | — | — | — | — | 3 | — | — | — |
| | Edible dispersant [% by mass] | EUDRAGIT RLPO | 4 | 9.6 | 7.2 | 3.5 | 6 | 6 | 4 | 6 |
| | Water [% by mass] | | 88 | 78.4 | 86.8 | 86.5 | 91 | 82 | 80 | 82 |
| | Volume-based concentration of pigment [% by volume] | | 1.5 | 2.3 | 1.2 | 2.9 | 3.0 | 2.3 | 3.1 | 2.3 |
| Manufacturing step | Step X1 | | Low frequency treatment | Low frequency treatment | Low frequency treatment | Low frequency treatment | Low frequency treatment | Low frequency treatment | — | — |
| | Step X2 | | Ball mill | Ball mill | Ball mill | Ball mill | Ball mill | Ball mill | Ball mill | Ball mill |
| | Step X3 | | High pressure treatment | High pressure treatment | High pressure treatment | High pressure treatment | High pressure treatment | High pressure treatment | — | — |
| | Step X4 | | Ball mill | Ball mill | Ball mill | Ball mill | Ball mill | Ball mill | — | — |
| Evaluation | Value of $D_{50}$ | | 0.082 | 0.091 | 0.082 | 0.098 | 0.430 | 0.142 | — (2.5) | — (0.41) |
| | Value of $(D_{90} - D_{10})/D_{50}$ | | 0.39 | 0.19 | 0.32 | 0.56 | 0.92 | 0.84 | — (0.75) | — (1.21) |
| | Transmittance [%] | | 83 | 77 | 71 | 75 | 88 | 42 | — (86) | — (72) |
| | Z-Average [d · nm] | | 153 | 142 | 164 | 170 | 203 | 140 | 355 | 415 |
| | Viscosity [mPa · s] | | 4.8 | 1.7 | 2.6 | 1.7 | 5.3 | 4.9 | 5.8 | 7.2 |
| | Dispersion stability | Viscosity change caused by vibration | B | A | A | A | A | B | D | D |
| | | Viscosity change caused by lapse of time | B | A | A | A | A | B | D | D |
| | Filterability | | A | A | A | B | B | B | D | D |
| | Ink jetting properties | | A | A | A | A | B | B | D | D |

"—" described in the column of a component in Table 3 means that the example does not contain the component. Furthermore, "—" described in the column of a step means that the step was not performed.

In Table 3, "—" described in the columns of the value of $D_{50}$, the value of $(D_{90}-D_{10})/D_{50}$, and the evaluation of transmittance means that the pigment dispersion could not fill the optical path length variable cell as an undiluted solution, and the measurement could not be performed. The numerical value in a parenthesis is a value measured for the pigment dispersion diluted 1,000× with ultrapure water.

Details of the components described in Table 3 are as below.

<Edible Pigment>

Iron sesquioxide (trade name, IUPAC name: iron (III) oxide, $Fe_2O_3$, shape: powder shape, use: pharmaceutical grade, standard: Japanese Pharmaceutical Excipients, KISHI KASEI CO., LTD.)

Black iron oxide (trade name, IUPAC name: iron (II.III) oxide, $Fe_3O_4$, shape: powder shape, use: pharmaceutical grade, standard: Japanese Pharmaceutical Excipients, KISHI KASEI CO., LTD.)

Yellow iron sesquioxide (trade name, IUPAC name: iron (III) oxide•monohydrate, $Fe_2O_3.H_2O$, shape: powder shape, use: pharmaceutical grade, standard: Japanese Pharmaceutical Excipients, KISHI KASEI CO., LTD.)

Food Blue No. 2 Aluminum Lake (trade name, shape: powder shape, use: food additives, DaiwaKasei Co., Ltd., standard: food coloring)

<Edible Dispersant>

EUDRAGIT (registered trademark) RLPO (trade name, resin having quaternary ammonium group, ethyl acrylate/methyl methacrylate/trimethylammonium ethyl methacrylate chloride (=1/2/0.2 [molar ratio]) copolymer, Evonik Nutrition & Care GmbH)

As shown in Table 3, although the pigment dispersions of Example B1 to Example B6 had a high edible pigment concentration which was equal to or higher than 1.0% by volume, the pigment dispersions contained few coarse particles and exhibited excellent ink jetting properties in a case where the pigment dispersions were used in an ink jet recording ink.

Furthermore, the pigment dispersions of Example B1 to Example B6 had low viscosity and had excellent dispersion stability and excellent filterability. Therefore, these pigment dispersions had physical properties suitable for the pigment dispersions to be used for ink jet recording.

In contrast, because the viscosity of the pigment dispersions of Comparative Example B1 and Comparative Example B2 was too high, these pigment dispersions could not fill the optical path length variable cell as undiluted solutions. Therefore, the average particle diameter thereof was measured by a dynamic light scattering method after diluting the pigment dispersions. As a result, it was confirmed that the average particle diameter of the pigment dispersions of Comparative Example B1 and Comparative Example B2 was markedly larger than that of the pigment dispersions of Example B1 to Example B6.

In addition, the dispersion stability and the filterability of the pigment dispersions of Comparative Example B1 and Comparative Example B2 were poor. Therefore, the physical properties thereof were not suitable for the pigment dispersions to be used for ink jet recording.

In view of the manufacturing method, compared to the pigment dispersion (for example, Comparative Example 2) manufactured using the dispersion method of the related art using a ball mill, the pigment dispersion (for example, Example B2) manufactured by specific dispersion methods that were combined in a specific order was constituted with dispersed particles having a smaller particle diameter, contained fewer coarse particles, had a uniform particle diameter, and was excellent in all the physical properties, that is, viscosity, dispersion stability, filterability, and ink jetting properties, suitable for the pigment dispersion to be used for ink jet recording.

Hereinafter, the fourth and fifth embodiments described above will be more specifically described based on examples, but the present invention is not limited to the following examples as long as the gist of the present invention is maintained.

In the following examples, unless otherwise specified, "%" and "part" are based on mass. Furthermore, in the following examples, beads are used as dispersion media.

Preparation Example 1

Preparation of Black Pigment Dispersion Liquid (KM Dispersion Liquid)

(Preparation of Mixture)

Powder-like black iron oxide ($Fe_3O_4$; manufactured by KISHI KASEI CO., LTD., pharmaceutical grade: Japanese Pharmaceutical Excipients) (40 g), 10 g of EUDRAGIT (registered trademark) RLPO (resin having quaternary ammonium group, manufactured by Evonik Nutrition & Care GmbH, ethyl acrylate:methyl methacrylate:trimethylammonium ethyl methacrylate chloride=1/2/0.2 [molar ratio]) as a dispersant, and 61 g of ultrapure water as a dispersion medium were put into an airtight container (trade name: CJ-250, CLEAR JAR made of PP, volume: 250 mL, manufactured by Nikko Hansen & Co., Ltd., hereinafter, referred to as PP clear jar) in this order.

By using a low-frequency high-acceleration vibration device (manufactured by LabRAM-II•Resodyn Acoustic Mixers, Inc.: hereinafter, referred to as RAM device in some cases), a dispersion treatment was performed on the airtight container for 2 minutes at an acceleration of 980.7 m/s$^2$ and a frequency of 60 Hz, thereby obtaining a mixture.

Then, 56 g of ultrapure water and 90 g of zirconia beads (bead size: 1 mmφ•YTZ-1, manufactured by NIKKATO CORPORATION) were added to the obtained mixed solution. Thereafter, by using a low-frequency high-acceleration vibration device LabRAM-II (manufactured by LabRAM-II•Resodyn Acoustic Mixers, Inc.), a dispersion treatment was performed again for 1 minute at an acceleration of 785 m/s$^2$ and a frequency of 60 Hz, thereby obtaining a crude dispersion liquid.

(First Dispersion Step)

The obtained crude dispersion liquid (42 g) and 158 g of ultrapure water were put into a 1 L (liter) container (having projections on the outer wall thereof due to calibrations) made of polypropylene (PP). Then, 390 g of zirconia beads (bead size: 1 mmφ•YTZ-1, manufactured by NIKKATO CORPORATION) were further added thereto, and by using a ball mill (BMU-100, Ito Seisakusho Co., Ltd.), dispersion was performed for a dispersion time of 121 hours at a rotation speed of 426 rpm (rotation/min). Thereafter, the zirconia beads were separated using filter cloth, thereby obtaining a KM dispersion liquid (1).

(Second Dispersion Step)

EUDRAGIT RLPO (resin having quaternary ammonium group, manufactured by Evonik Nutrition & Care GmbH, ethyl acrylate:methyl methacrylate:trimethylammonium ethyl methacrylate chloride=1:2:0.2 [molar ratio]) (2.5 g) was added to the dispersion liquid (1) obtained by the first dispersion step. By using an ultrahigh-pressure processing treatment device (MARUGOTO EKISU, manufactured by Toyo Koatsu Inc.), the obtained liquid was treated under the conditions of a liquid temperature of 70° C., a pressure of 100 MPa, and a treatment time of 24 hours. Thereafter, a normal pressure-ultrahigh pressure treatment was repeated 10 times at a liquid temperature of 70° C. and a pressure of 1 MPa to 100 MPa, thereby obtaining a KM dispersion liquid (2).

(Third Dispersion Step)

The dispersion liquid (2) obtained by the second dispersion step was moved to a 500 ml container made of polypropylene (PP), 240 g of zirconia beads (bead size: 0.1 mmφ•YTZ-0.1, manufactured by NIKKATO CORPORATION) were added thereto. Then, by using a ball mill (BMU-100, Ito Seisakusho Co., Ltd.), dispersion was performed for a dispersion time of 12 hours at a rotation speed of 148 rpm. Thereafter, the zirconia beads were separated using filter cloth, thereby obtaining a KM dispersion liquid (3) appearing black.

(Evaluation of Dispersion Liquid)

<Measurement of Average Particle Diameter by Laser Diffraction/Scattering-Type Particle Size Distribution Measurement Apparatus>

By using a laser diffraction/scattering-type particle size distribution measurement apparatus: Partica LA-960 (trade name: HORIBA, Ltd.) and the optical path length variable cell (trade name: HORIBA, Ltd.) shown in FIG. 1 to FIG. 3 and setting the interval between a set of glass plates to be 5 µm by using the spacer, the prepared KM dispersion liquid (3) filled the cell without being diluted, and the average particle diameter (median diameter/D10 average diameter/D90 average diameter) was measured. The results are shown in the following Table 4.

Preparation Example 2

Preparation of Red Pigment Dispersion Liquid (RM Dispersion Liquid)

(Preparation of Mixture)

Powder-like iron sesquioxide ($Fe_2O_3$; manufactured by KISHI KASEI CO., LTD., pharmaceutical grade: Japanese Pharmaceutical Excipients) (40 g), 10 g of EUDRAGIT RLPO (resin having quaternary ammonium group, manufactured by Evonik Nutrition & Care GmbH, ethyl acrylate:methyl methacrylate:trimethylammonium ethyl methacrylate chloride=1/2/0.2 [molar ratio]), and 61 g of ultrapure water were put into a PP clear jar (airtight container: volume 250 ml) from Nikko Hansen & Co., Ltd. in this order.

By using a low-frequency high-acceleration vibration device (manufactured by LabRAM-II•Resodyn Acoustic Mixers, Inc.), a dispersion treatment was performed on the airtight container for 2 minutes at an acceleration of 980.7 $m/s^2$ and a frequency of 60 Hz, thereby obtaining a mixture.

Then, 56 g of ultrapure water and 90 g of zirconia beads (bead size: 1 mmφ•YTZ-1, manufactured by NIKKATO CORPORATION) were added to the obtained mixed solution. Thereafter, by using a low-frequency high-acceleration vibration device LabRAM-II (manufactured by LabRAM-II•Resodyn Acoustic Mixers, Inc.), a dispersion treatment was performed again for 1 minute at an acceleration of 785 $m/s^2$ and a frequency of 60 Hz, thereby obtaining a mixture.

(First Dispersion Step)

The obtained mixture (42 g) was moved to a 1 L container (having projections on the outer wall thereof due to calibrations) made of polypropylene (PP), and 158 g of ultrapure water was added thereto. Then, 390 g of zirconia beads (bead size: 1 mmφ•YTZ-1, manufactured by NIKKATO CORPORATION) were added thereto, and by using a ball mill (BMU-100: trade name, Ito Seisakusho Co., Ltd.), dispersion was performed for a dispersion time of 121 hours at a rotation speed of 426 rpm. Thereafter, the zirconia beads were separated using filter cloth, thereby obtaining an RM dispersion liquid (1).

(Second Dispersion Step)

EUDRAGIT RLPO (resin having quaternary ammonium group, manufactured by Evonik Nutrition & Care GmbH, ethyl acrylate:methyl methacrylate:trimethylammonium ethyl methacrylate chloride=1/2/0.2 [molar ratio]) (2.5 g) was added to the obtained RM dispersion liquid (1). By using an ultrahigh-pressure processing treatment device (MARUGOTO EKIS: trade name, manufactured by Toyo Koatsu Inc.), the obtained liquid was treated under the conditions of a liquid temperature of 70° C., a pressure of 100 MPa, and a treatment time of 24 hours. Thereafter, a normal pressure-ultrahigh pressure treatment was repeated 10 times at a liquid temperature of 70° C. and a pressure of 1 MPa to 100 MPa, thereby obtaining an RM dispersion liquid (2).

(Third Dispersion Step)

The obtained RM dispersion liquid (2) (500 ml) was moved to a 1 L container made of polypropylene (PP), 240 g of zirconia beads (bead size: 0.1 mmφ•YTZ-0.1, manufactured by NIKKATO CORPORATION) were added thereto. Then, by using a ball mill (BMU-100, Ito Seisakusho Co., Ltd.), dispersion was performed for a dispersion time of 12 hours at a rotation speed of 148 rpm. Thereafter, the zirconia beads were separated using filter cloth, thereby obtaining an RM dispersion liquid (3).

Preparation Example 3

Preparation of Blue Pigment Dispersion Liquid (BM Dispersion Liquid)

A blue pigment dispersion liquid (BM dispersion liquid (3)) was obtained in the same manner as in Preparation Example 1, except that in Preparation Example 1, the powder-like black iron oxide pigment used as an edible pigment was changed to a Blue No. 2 Lake pigment (for BM dispersion liquid).

Preparation Example 4

Preparation of Yellow Pigment Dispersion Liquid (YM Dispersion Liquid)

A yellow pigment dispersion liquid (YM dispersion liquid (3)) was obtained in the same manner as in Preparation Example 2, except that in Preparation Example 2, the powder-like iron sesquioxide pigment used as an edible pigment was changed to a yellow iron sesquioxide pigment (for YM dispersion liquid).

(Evaluation of Dispersion Liquid)

By the same method as that used for the KM dispersion liquid obtained in Preparation Example 1, for each of the RM dispersion liquid (3) obtained in Preparation Example 2, the BM dispersion liquid (3) obtained in Preparation Example 3, and the YM dispersion liquid (3) obtained in Preparation Example 4, the average particle diameter and the proportion (frequency) of coarse particles were measured using a laser diffraction/scattering-type particle size distribution measurement apparatus and an optical path length variable cell. In the following Table 4 to Table 8, the proportion of coarse particles represents "frequency".

The results are shown in the following Table 4. In Table 4, the finally obtained dispersion liquids are described as KM, RM, BM, and YM showing the color.

TABLE 4

| Pigment dispersion liquid | | KM | RM | BM | YM |
|---|---|---|---|---|---|
| Edible pigment | Black iron oxide pigment | 6% | | | |
| | Iron sesquioxide pigment | | 12% | | |
| | Yellow iron sesquioxide pigment | | | | 12% |
| | Blue No. 2 Lake pigment | | | 6% | |
| Dispersant | EUDRAGIT RLPO | 4.80% | 9.60% | 4.80% | 9.60% |
| Water | Ultrapure water | Balance | Balance | Balance | Balance |
| | Total | 100% | 100% | 100% | 100% |
| Evaluation of dispersion liquid | Average particle diameter (nm) | 100 | 100 | 100 | 100 |
| | Proportion of coarse particles (frequency) | 1> | 1> | 1> | 1> |

From the results in Table 4, it is understood that the dispersion liquids of the edible pigments obtained in preparation examples are dispersion liquids which contain particles having a small average particle diameter, contain extremely few coarse particles, and are excellent in the dispersibility of the edible pigments.

The pigment dispersion liquid RM was dispersed at a pigment concentration of 21%. As a result, due to the increase in viscosity of the dispersion, a homogeneous dispersion was not obtained.

<Preparation of Pigment Dispersion Liquid>

Pigment dispersion liquids were obtained in the same manner as in the above preparation examples, except that in the preparation examples of the above dispersion liquids, the treatment time in the mixture preparation step and the first dispersion step was changed as shown in the following Table 5 to Table 8. For the obtained pigment dispersion liquids, the average particle diameter and the proportion (frequency) of coarse particles were measured in the same manner as in Preparation Example 1.

The results are shown in the following Table 5 to Table 8.

All of the dispersion liquids KM1, KM2, KM3, and KM4 have the same composition as the KM dispersion liquid.

All of the dispersion liquids RM1, RM2, RM3, and RM4 have the same composition as the RM dispersion liquid. All of the dispersion liquids BM1, BM2, BM3, and BM4 have the same composition as the BM dispersion liquid. All of the dispersion liquids YM1, YM2, YM3, and YM4 have the same composition as the YM dispersion liquid.

TABLE 5

| Pigment dispersion liquid | | KM | KM1 | KM2 | KM3 | KM4 | KM5 | KM6 |
|---|---|---|---|---|---|---|---|---|
| Dispersion condition (treatment time) | Mixture preparation step | 2 minutes/1 minute | 2 minutes/1 minute | 2 minutes/1 minute | 2 minutes/1 minute | 2 minutes/1 minute | 2 minutes/0 minutes | 2 minutes/0 minutes |
| | First dispersion step | 121 hours | 82 hours | 63 hours | 42 hours | 20 hours | 121 hours | 121 hours |
| Evaluation of dispersion liquid | Average particle diameter (nm) | 100 | 200 | 300 | 400 | 600 | 100 | 200 |
| | Proportion of coarse particles (frequency) | 1> | 1> | 1> | 5 | 80 | 5 | 5 |

TABLE 6

| Pigment dispersion liquid | | RM | RM1 | RM2 | RM3 | RM4 | RM5 | RM6 |
|---|---|---|---|---|---|---|---|---|
| Dispersion condition (treatment time) | Mixture preparation step | 2 minutes/1 minute | 2 minutes/1 minute | 2 minutes/1 minute | 2 minutes/1 minute | 2 minutes/1 minute | 2 minutes/0 minutes | 2 minutes/0 minutes |
| | First dispersion step | 121 hours | 82 hours | 63 hours | 42 hours | 20 hours | 121 hours | 121 hours |
| Evaluation of dispersion liquid | Average particle diameter (nm) | 100 | 200 | 300 | 400 | 600 | 100 | 200 |
| | Proportion of coarse particles (frequency) | 1> | 1> | 1> | 5 | 80 | 5 | 5 |

TABLE 7

| Pigment dispersion liquid | | BM | BM1 | BM2 | BM3 | BM4 | BM5 | BM6 |
|---|---|---|---|---|---|---|---|---|
| Dispersion condition (treatment time) | Mixture preparation step | 2 minutes/1 minute | 2 minutes/1 minute | 2 minutes/1 minute | 2 minutes/1 minute | 2 minutes/1 minute | 2 minutes/0 minutes | 2 minutes/0 minutes |
| | First dispersion step | 121 hours | 82 hours | 63 hours | 42 hours | 20 hours | 121 hours | 121 hours |
| Evaluation of dispersion liquid | Average particle diameter (nm) | 100 | 200 | 300 | 400 | 600 | 100 | 200 |
| | Proportion of coarse particles (frequency) | 1> | 1> | 1> | 5 | 80 | 5 | 5 |

TABLE 8

| Pigment dispersion liquid | | YM | YM1 | YM2 | YM3 | YM4 | YM5 | YM6 |
|---|---|---|---|---|---|---|---|---|
| Dispersion condition (treatment time) | Mixture preparation step | 2 minutes/1 minute | 2 minutes/1 minute | 2 minutes/1 minute | 2 minutes/1 minute | 2 minutes/1 minute | 2 minutes/0 minutes | 2 minutes/0 minutes |
| | First dispersion step | 121 hours | 82 hours | 63 hours | 42 hours | 20 hours | 121 hours | 121 hours |
| Evaluation of dispersion liquid | Average particle diameter (nm) | 100 | 200 | 300 | 400 | 600 | 100 | 200 |
| | Proportion of coarse particles (frequency) | 1> | 1> | 1> | 2 | 80 | 5 | 5 |

From the results in Table 5 to Table 8, it is understood that even though the pigment dispersion liquids have the same formulation, by adjusting the treatment time in the mixture preparation step and the first dispersion step, it is possible to prepare a pigment dispersion liquid having a desired particle diameter. For example, as described for KM4, it is understood that in a case where the time of the first dispersion step is shortened, the particle diameter and the number of coarse particles increase, and in a case where the time of the mixture preparation step is shortened, the particle size decreases, but the number of coarse particles increases.

In Table 5 to Table 8 described above, KM4, RM4, BM4, and YM4 are dispersion liquids as controls having a particle diameter out of the range of the particle diameter of the ink composition of the present disclosure.

Example C1-1 to Example C4-7, Comparative Example C1-5, Comparative Example C2-5, Comparative Example C3-5, and Comparative Example C4-5

Manufacturing of Ink Composition

Among the edible pigment dispersion liquids obtained in the preparation examples, two kinds of different pigment dispersion liquids were mixed together such that the pigment concentration in an ink composition became ½ of the pigment concentration (content of the pigment) in the dispersion liquids, and propylene glycol was incorporated into the mixture such that the amount of propylene glycol became 20% with respect to the total amount of an ink composition. This mixture was stirred for 30 minutes at ordinary temperature (25° C.) by using a stirring device with a stirrer and filtered through a filter having a pore size of 5 μm, thereby obtaining an ink composition.

The type and content of pigment dispersion liquids contained in the ink composition and the content ratio between the edible pigments are shown in Table 9 to Table 12.

(Evaluation of Jetting Properties of Ink Composition)

By using an ink jet recording device (DIMATIX MATERIALS PRINTER DMP-2831, manufactured by FUJIFILM Dimatix Inc.), the obtained ink composition was jetted to a plain tablet as a recording medium, and the jetting properties thereof were evaluated according to the following standards.

A solid image was visually observed, and whether or not a streak occurred in the image due to a jetting defect was checked and evaluated according to the following standards so as to evaluate the jetting properties.

—Evaluation Standards—

1: No streak caused by a jetting defect could be visually observed in the solid image.

2: A streak caused by a jetting defect could be visually observed in the solid image, but the level of the streak was unproblematic for practical use.

3: The ink composition could not be jetted.

TABLE 9

| Ink composition | | Example C1-1 K1I | Example C1-2 K1I1 | Example C1-3 K1I2 | Example C1-4 K1I3 | Comparative Example C1-5 K1I4 | Example C1-6 K1I5 | Example C1-7 K1I6 |
|---|---|---|---|---|---|---|---|---|
| Pigment dispersion (I) | Type | KM | KM1 | KM2 | KM3 | KM4 | KM5 | KM6 |
| | Content rate (%) | 10 | 10 | 10 | 10 | 10 | 10 | 10 |
| Pigment dispersion (II) | Type | BM | BM1 | BM2 | BM3 | BM4 | BM5 | BM6 |
| | Content rate (%) | 50 | 50 | 50 | 50 | 50 | 50 | 50 |
| High-boiling-point solvent | Propylene glycol | 20 | 20 | 20 | 20 | 20 | 20 | 20 |
| Dispersion medium | Water | Balance | Balance | Balance | Balance | Balance | Balance | Balance |
| | Total | 100 | 100 | 100 | 100 | 100 | 100 | 100 |
| Content ratio between pigments | Black iron oxide pigment/Blue No. 2 Lake pigment | 1/5 | 1/5 | 1/5 | 1/5 | 1/5 | 1/5 | 1/5 |
| Evaluation of ink composition | Jetting properties | 1 | 1 | 2 | 2 | 3 | 2 | 2 |

TABLE 10

| Ink composition | | Example C2-1 K2I | Example C2-2 K2I1 | Example C2-3 K2I2 | Example C2-4 K2I3 | Comparative Example C2-5 K2I4 | Example C2-6 K2I5 | Example C2-7 K2I6 |
|---|---|---|---|---|---|---|---|---|
| Pigment dispersion (I) | Type | RM | RM1 | RM2 | RM3 | RM4 | RM5 | RM6 |
| | Content rate (%) | 5 | 5 | 5 | 5 | 5 | 5 | 5 |
| Pigment dispersion (II) | Type | BM | BM1 | BM2 | BM3 | BM4 | BM5 | BM6 |
| | Content rate (%) | 50 | 50 | 50 | 50 | 50 | 50 | 50 |
| High-boiling-point solvent | Propylene glycol | 20 | 20 | 20 | 20 | 20 | 20 | 20 |
| Dispersion medium | Water | Balance | Balance | Balance | Balance | Balance | Balance | Balance |
| | Total | 100 | 100 | 100 | 100 | 100 | 100 | 100 |
| Content ratio between pigments | Iron sesquioxide pigment/Blue No. 2 Lake pigment | 1/5 | 1/5 | 1/5 | 1/5 | 1/5 | 1/5 | 1/5 |
| Evaluation of ink composition | Jetting properties | 1 | 1 | 2 | 2 | 3 | 2 | 2 |

TABLE 11

| Ink composition | | Example C3-1 GI | Example C3-2 GI1 | Example C3-3 GI2 | Example C3-4 GI3 | Comparative Example C3-5 GI4 | Example C3-6 GI5 | Example C3-7 GI6 |
|---|---|---|---|---|---|---|---|---|
| Pigment dispersion (I) | Type | YM | YM1 | YM2 | YM3 | YM4 | YM5 | YM6 |
| | Content rate (%) | 8.3 | 8.3 | 8.3 | 8.3 | 8.3 | 8.3 | 8.3 |
| Pigment dispersion (II) | Type | BM | BM1 | BM2 | BM3 | BM4 | BM5 | BM6 |
| | Content rate (%) | 50 | 50 | 50 | 50 | 50 | 50 | 50 |
| High-boiling-point solvent | Propylene glycol | 20 | 20 | 20 | 20 | 20 | 20 | 20 |
| Dispersion medium | Water | Balance | Balance | Balance | Balance | Balance | Balance | Balance |
| | Total | 100 | 100 | 100 | 100 | 100 | 100 | 100 |
| Content ratio between pigments | Yellow iron sesquioxide pigment/Blue No. 2 Lake pigment | 1/3 | 1/3 | 1/3 | 1/3 | 1/3 | 1/3 | 1/3 |
| Evaluation of ink composition | Jetting properties | 1 | 1 | 2 | 2 | 3 | 2 | 2 |

TABLE 12

| Ink composition | | Example C4-1 OI | Example C4-2 OI1 | Example C4-3 OI2 | Example C4-4 OI3 | Comparative Example C4-5 OI4 | Example C4-6 OI5 | Example C4-7 OI6 |
|---|---|---|---|---|---|---|---|---|
| Pigment dispersion (I) | Type | RM | RM1 | RM2 | RM3 | RM4 | RM5 | RM6 |
| | Content rate (%) | 16.7 | 16.7 | 16.7 | 16.7 | 16.7 | 16.7 | 16.7 |
| Pigment dispersion (II) | Type | YM | YM1 | YM2 | YM3 | YM4 | YM5 | YM6 |
| | Content rate (%) | 50 | 50 | 50 | 50 | 50 | 50 | 50 |
| High-boiling-point solvent | Propylene glycol | 20 | 20 | 20 | 20 | 20 | 20 | 20 |
| Dispersion medium | Water | Balance | Balance | Balance | Balance | Balance | Balance | Balance |
| | Total | 100 | 100 | 100 | 100 | 100 | 100 | 100 |
| Content ratio between pigments | Iron sesquioxide pigment/Yellow iron sesquioxide pigment | 1/3 | 1/3 | 1/3 | 1/3 | 1/3 | 1/3 | 1/3 |
| Evaluation of ink composition | Jetting properties | 1 | 1 | 2 | 2 | 3 | 2 | 2 |

As is evident from the results in Table 9 to Table 12, all of the ink compositions of the examples had excellent jetting properties. In contrast, in Comparative Example C1-5, Comparative Example C2-5, Comparative Example C3-5, and Comparative Example C4-5 in which the average particle diameter in the dispersion was greater than 500 nm, the ink compositions could not be jetted.

Example C1-8 to Example C1-14

Ink compositions K1I7 (Example C1-8) to K1I13 (Example C1-14) were prepared in the same manner as in K1I, except that the content ratio between the black iron oxide pigment and the Blue No. 2 Lake pigment as specific edible pigments contained in the ink composition of Example C1-1 (K1I) was changed to the ratio shown in the following Table 10.

TABLE 13

| Ink composition | | Example C1-8 K1I7 | Example C1-9 K1I8 | Example C1-10 K1I9 | Example C1-11 K1I10 | Example C1-12 K1I11 | Example C1-1 K1I | Example C1-13 K1I12 | Example C1-14 K1I13 |
|---|---|---|---|---|---|---|---|---|---|
| Content ratio between pigments | Black iron oxide pigment/Blue No. 2 Lake pigment | 2/1 | 1/1 | 2/3 | 2/5 | 2/7 | 1/5 | 1/10 | 1/20 |
| Evaluation of performance/image | Jetting properties | 1 | 1 | 1 | 1 | 1 | 1 | 1 | 1 |
| | Evaluation of tint | B | B | A | A | A | A | A | B |
| | a* | 30.9 | 24.5 | 19 | 10.4 | 5.2 | 0.6 | −6.8 | −10.4 |
| | b* | 36.2 | 34.7 | 36.1 | 28.3 | 21.1 | 13.4 | −10 | −34.2 |
| | Evaluation of image quality | 1 | 1 | 1 | 1 | 1 | 1 | 1 | 1 |
| | Light fastness (ΔE) | 0 | 0 | 0 | 0 | 0 | 0 | 0 | 0 |

Example C2-8 to Example C2-14

Ink compositions K2I7 to K2I13 were prepared in the same manner as in K2I, except that the content ratio between the iron sesquioxide pigment and the Blue No. 2 Lake pigment as edible pigments contained in the ink composition K2I of an example was changed to the ratio shown in the following Table 14.

TABLE 14

| Ink composition | | Example C2-8 K2I7 | Example C2-9 K2I8 | Example C2-10 K2I9 | Example C2-11 K2I10 | Example C2-12 K2I11 | Example C2-1 K2I | Example C2-13 K2I12 | Example C2-14 K2I13 |
|---|---|---|---|---|---|---|---|---|---|
| Content ratio between pigments | Iron sesquioxide pigment/Blue No. 2 Lake pigment | 2/1 | 1/1 | 2/3 | 2/5 | 2/7 | 1/5 | 1/10 | 1/20 |
| Evaluation of performance/image | Jetting properties | 1 | 1 | 1 | 1 | 1 | 1 | 1 | 1 |
| | Evaluation of tint | B | B | A | A | A | A | A | B |
| | a* | 34.5 | 28.1 | 22.1 | 14.2 | 9.8 | 3.4 | −3.4 | −10.4 |
| | b* | 33.5 | 32.1 | 29.4 | 25.6 | 21.8 | 13.2 | 4.6 | −34.2 |
| | Evaluation of image quality | 1 | 1 | 1 | 1 | 1 | 1 | 1 | 1 |
| | Light fastness (ΔE) | 0 | 0 | 0 | 0 | 0 | 0 | 0 | 0 |

Example C3-8 to Example C3-13

Ink compositions GI7 to GI12 were prepared in the same manner as in GI1, except that the ratio between the yellow iron sesquioxide pigment and the Blue No. 2 Lake pigment as edible pigments contained in the ink composition GI1 was changed to the ratio shown in the following Table 15.

TABLE 15

| Ink composition | | Example C3-8 GI7 | Example C3-9 GI8 | Example C3-1 GI | Example C3-10 GI9 | Example C3-11 GI10 | Example C3-12 GI11 | Example C3-13 GI12 |
|---|---|---|---|---|---|---|---|---|
| Content ratio between pigments | Iron sesquioxide pigment/Blue No. 2 Lake pigment | 2/1 | 1/1 | 2/3 | 2/5 | 2/7 | 1/5 | 1/10 |
| Evaluation of performance/image | Jetting properties | 1 | 1 | 1 | 1 | 1 | 1 | 1 |
| | Evaluation of tint | B | B | A | A | A | A | B |
| | a* | −1 | −6.2 | −10 | −12.1 | −14.5 | −14.3 | −10.4 |
| | b* | 34 | 23.5 | 13 | 1.7 | −4.9 | −12.4 | −34.2 |
| | Evaluation of image quality | 1 | 1 | 1 | 1 | 1 | 1 | 1 |
| | Light fastness (ΔE) | 0 | 0 | 0 | 0 | 0 | 0 | 0 |

Example C4-8 to Example C4-12

Ink compositions OI7 to OI11 were prepared in the same manner as in OI1, except that the content ratio between the iron sesquioxide pigment and the yellow iron sesquioxide pigment as edible pigments contained in the ink composition OI1 was changed to the ratio shown in the following Table 16.

TABLE 16

| Ink composition | | Example C4-8 OI7 | Example C4-9 OI8 | Example C4-1 OI | Example C4-10 OI9 | Example C4-11 OI10 | Example C4-12 OI11 |
|---|---|---|---|---|---|---|---|
| Content ratio between pigments | Iron sesquioxide pigment/yellow iron sesquioxide pigment | 1/1 | 1/2 | 1/3 | 1/5 | 1/7 | 1/10 |
| Evaluation of performance/image | Jetting properties | 1 | 1 | 1 | 1 | 1 | 1 |
| | Evaluation of tint | B | A | A | A | B | B |
| | a* | 34.4 | 30.4 | 33.8 | 28.7 | 27.9 | 26.8 |
| | b* | 34.1 | 40.1 | 41.9 | 47.6 | 51.6 | 52 |
| | Evaluation of image quality | 1 | 1 | 1 | 1 | 1 | 1 |
| | Light fastness (ΔE) | 0 | 0 | 0 | 0 | 0 | 0 |

<Evaluation of Ink Composition>

The obtained ink compositions were evaluated as below, and the results are described in Table 13 to Table 16. The evaluation results of K1I11 (Example C1-1), K2I (Example C2-1), GI (Example C3-1), and OI (Example C4-1) are also described in the tables.

(Preparation of Tablets with Printed Materials)

By using DIMATIX•MATERIALS PRINTER DMP-2831 (manufactured by FUJIFILM Dimatix Inc.), the following images were formed on plain tablets and film-coated tablets. As drawing conditions, a liquid droplet size was set to be 10 pl, and an image density was set to be 1,200 dpi×1,200 dpi, and the image was formed in a drawing environment of 23° C. and 50%.

Image 1 Solid image of 100 dot %

Image 2 Letters "FUJIFILM"

The formed images were evaluated according to the following standards, and the results are also described in the above Table 13 to Table 16.

(Evaluation of Tint)

The tint was visually observed.

The solid image was observed by 5 people. For the K1 and K2 inks, the image that appeared black was evaluated as A, and the image that did not appear black was evaluated as B.

For the G ink, the image that appeared green was evaluated as A, and the image that did not appear green was evaluated as B.

For the O ink, the image that appeared orange was evaluated as A, and the image that did not appear orange was evaluated as B.

Furthermore, the ab value of the obtained solid image was measured using a fluorescent spectrodensitometer FD-5 (trade name: Konica Minolta, Inc.).

(Evaluation of Light Fastness)

By using a fluorescent light fastness tester (fluorescent light fading tester LST-300, manufactured by TOYO RIKAKIKAI CO., LTD.), the solid image was irradiated with light such that the cumulative amount of light became 1,200,000 Lx in total. After the irradiation, Lab of the solid image was measured using FD-5 (manufactured by Konica Minolta, Inc.), and ΔE before and after the irradiation was calculated. In this evaluation, the smaller the numerical value of ΔE, the better the light fastness.

(Evaluation of Image Quality)

Image 2: an image of 4 pt letters "FUJIFILM" was visually observed and evaluated according to the following standards.

—Evaluation Standards—

1: Bleeding did not occur, and the letters were clearly observed.

2: Although bleeding was observed, the letters were readable.

3: Serious bleeding occurred, and the letters were unreadable.

(Evaluation of Jetting Properties)

By visually observing the solid image, whether or not a streak (image disruption) resulting from a jetting defect occurred was checked, and the jetting properties were evaluated according to the following standards.

—Evaluation Standards—

1: No streak resulting from a jetting defect could be visually observed in the solid image.

2: Although a streak resulting from a jetting defect could be visually observed in the solid image, the level of the streak was unproblematic for practical use.

3: The ink composition could not be jetted.

The ink composition was evaluated as described above.

From the results shown in the tables, it is understood that in order to improve the jetting properties, the average particle diameter specified for the ink composition of the present disclosure needs to be equal to or smaller than 500 nm.

Furthermore, in order to obtain excellent image quality by reducing streaks and the like in the obtained image, the proportion of coarse particles which have a particle size equal to or smaller than 200 nm and equal to or greater than 500 nm is preferably equal to or lower than 1%.

Regarding the color of the ink composition, in a case where black iron oxide pigment was used alone, brown can be reproduced; in a case where iron sesquioxide pigment is used alone, red can be reproduced; in a case where the Blue No. 2 Lake pigment is used, blue can be reproduced; and in a case where the yellow iron sesquioxide pigment is used, only yellow can be reproduced.

In addition, it is understood that for reproducing black, the black iron oxide pigment needs to be used; in a case where the ratio of iron sesquioxide pigment/Blue No. 2 Lake pigment is 2/3 to 1/10, black can be excellently expressed; in a case where the ratio of yellow iron sesquioxide pigment/Blue No. 2 Lake pigment is 2/3 to 1/5, green can be excellently expressed; and in a case where the ratio of iron sesquioxide pigment/yellow iron sesquioxide pigment is 1/2 to 1/5, orange can be excellently expressed.

The entirety of the disclosures in JP2016-195142 field on Sep. 30, 2016, JP2016-195143 filed on Sep. 30, 2016, JP2016-195144 filed on Sep. 30, 2016, and JP2017-068885 filed on Mar. 30, 2017 are incorporated into the present specification by reference.

All the documents, patent applications, and technical standards described in the present specification are incorporated into the present specification by reference as if each of the documents, the patent applications, and the technical standards is specifically and independently described and incorporated into the present specification by reference.

What is claimed is:

1. A manufacturing method of a dispersion comprising:
   a step A of preparing a mixture containing an edible pigment, an edible dispersant, and water;
   a step B of applying a hydrostatic pressure equal to or higher than 30 MPa to the mixture; and
   a step C of performing a dispersion treatment on the mixture to which the hydrostatic pressure is applied.

2. The manufacturing method of a dispersion according to claim 1,
   wherein the step B is a step of applying a hydrostatic pressure equal to or higher than 100 MPa to the mixture for 6 hours or longer.

3. The manufacturing method of a dispersion according to claim 1,
   wherein the step B is a step of applying a hydrostatic pressure equal to or higher than 100 MPa to the mixture for 15 hours or longer while applying heat equal to or higher than 70° C. to the mixture.

4. The manufacturing method of a dispersion according to claim 1,
   wherein the step C is a step of performing a dispersion treatment on the mixture, to which the hydrostatic pressure is applied, by using a media mill.

5. The manufacturing method of a dispersion according to claim 1,
   wherein the step B is a step of applying the hydrostatic pressure to the mixture by using a cold isostatic pressing method.

6. The manufacturing method of a dispersion according to claim 1,
   wherein the step A includes a step of mixing together the edible pigment, the edible dispersant, and water filling an airtight container by vibrating the airtight container under conditions that a vibration frequency is within a range of 50 Hz to 70 Hz and a vibration acceleration is within a range of 98 m/s$^2$ to 1,962 m/s$^2$ so as to obtain the mixture.

7. The manufacturing method of a dispersion according to claim 1,
   wherein the edible pigment is at least one kind of pigment selected from the group consisting of black iron oxide, iron (III) oxide, yellow iron sesquioxide, and Food Blue No. 2 Aluminum Lake.

8. The manufacturing method of a dispersion according to claim 1, further comprising:
   a step D of adjusting a pH at 25° C. of a dispersion obtained after the step C to be equal to or lower than 6.3.

9. The manufacturing method of a dispersion according to claim 8,
   wherein the step D is a step of adjusting the pH of the dispersion by using salts of an acid and a weak acid.

10. The manufacturing method of a dispersion according to claim 1, further comprising:
    a step E of removing a portion of the edible dispersant at a point in time when the step A is not yet finished or at a point in time when the step A has finished but the step B is not yet started.

11. The manufacturing method of a dispersion according to claim 10,
    wherein the step A is a step of obtaining the mixture by mixing together the edible pigment, the edible dispersant, and water and includes a step a2 of mixing together the edible pigment, the edible dispersant, and water filling the airtight container by vibrating the airtight container under conditions that a vibration frequency is within a range of 50 Hz to 70 Hz and a vibration acceleration is within a range of 98 m/s$^2$ to 1,962 m/s² so as to obtain the mixture and a step a3 of performing a dispersion treatment on the mixture obtained by the step a2, and the step E is performed midway through the step a3 or performed at a point in time when the step a3 has finished but the step B is not yet started.

12. The manufacturing method of a dispersion according to claim 1, wherein in the step A, a ratio P of a content of the edible dispersant to a content of the edible pigment satisfies Expression I based on mass, and after the step A, a ratio Q of the content of the edible dispersant to the content of the edible pigment satisfies Expression II based on mass.

$$0.25 < \text{Ratio } P < 1.2 \quad \text{Expression I}$$

$$0.05 < \text{Ratio } Q < 0.40 \quad \text{Expression II}$$

13. The manufacturing method of a dispersion according to claim 1, wherein the edible dispersant is an alkyl (meth)acrylate copolymer containing a quaternary ammonium group.

* * * * *